US007648237B2

(12) United States Patent
Kigawa et al.

(10) Patent No.: US 7,648,237 B2
(45) Date of Patent: Jan. 19, 2010

(54) DEVICE FOR INSTALLING SUCTION JIG FOR EYEGLASS LENS AND METHOD FOR DETERMINING SUCTION JIG INSTALLATION POSITION

(75) Inventors: Tsutomu Kigawa, Tokyo (JP); Kazuo Kitamura, Tokyo (JP); Nobuo Kochi, Tokyo (JP); Takahiro Watanabe, Tokyo (JP); Yoshimasa Ogawa, Tokyo (JP)

(73) Assignee: Topcon Corporation, Tokyo (JP)

( * ) Notice: Subject to any disclaimer, the term of this patent is extended or adjusted under 35 U.S.C. 154(b) by 216 days.

(21) Appl. No.: 10/594,318

(22) PCT Filed: Mar. 24, 2005

(86) PCT No.: PCT/JP2005/005346

§ 371 (c)(1),
(2), (4) Date: Nov. 29, 2007

(87) PCT Pub. No.: WO2005/098521

PCT Pub. Date: Oct. 20, 2005

(65) Prior Publication Data

US 2008/0204654 A1      Aug. 28, 2008

(30) Foreign Application Priority Data

| Mar. 31, 2004 | (JP) | 2004-105141 |
| Mar. 31, 2004 | (JP) | 2004-105518 |
| Mar. 31, 2004 | (JP) | 2004-105884 |
| Mar. 31, 2004 | (JP) | 2004-106168 |
| Mar. 31, 2004 | (JP) | 2004-106553 |
| Mar. 23, 2005 | (JP) | 2005-083007 |
| Mar. 23, 2005 | (JP) | 2005-083008 |
| Mar. 23, 2005 | (JP) | 2005-083009 |
| Mar. 23, 2005 | (JP) | 2005-083010 |
| Mar. 23, 2005 | (JP) | 2005-083060 |

(51) Int. Cl.
*G02C 13/00* (2006.01)
(52) U.S. Cl. ............... 351/178; 351/158; 351/177; 81/3.5; 451/42
(58) Field of Classification Search ............. 351/177, 351/178
See application file for complete search history.

(56) References Cited

U.S. PATENT DOCUMENTS

| 7,158,222 B2 * | 1/2007 | Taguchi et al. ............ 356/127 |
| 7,267,436 B2 * | 9/2007 | Ito et al. ................... 351/177 |
| 2001/0035937 A1 * | 11/2001 | Mizuno .................... 351/177 |
| 2007/0188698 A1 * | 8/2007 | Mosse et al. .............. 351/159 |

* cited by examiner

*Primary Examiner*—Jordan M. Schwartz
(74) *Attorney, Agent, or Firm*—Kubovcik & Kubovcik

(57) ABSTRACT

An automatic suction device for an eyeglass lens and a method for determining suction jig installation position, capable of recognizing that a frame exchange lens holder is being installed on a placement table, making transition to installation work of a frame exchange mode, and avoiding an erroneous contact between the frame exchange frame and a lens holding frame. The kind of holding means placed on the placement table is determined from an image of the inside of an opening (141), which image is taken by a CCD camera (105), and the installation position of a suction jig (121) at an eyeglass lens (L) placed on a frame exchange lens holder (300) is obtained.

8 Claims, 69 Drawing Sheets

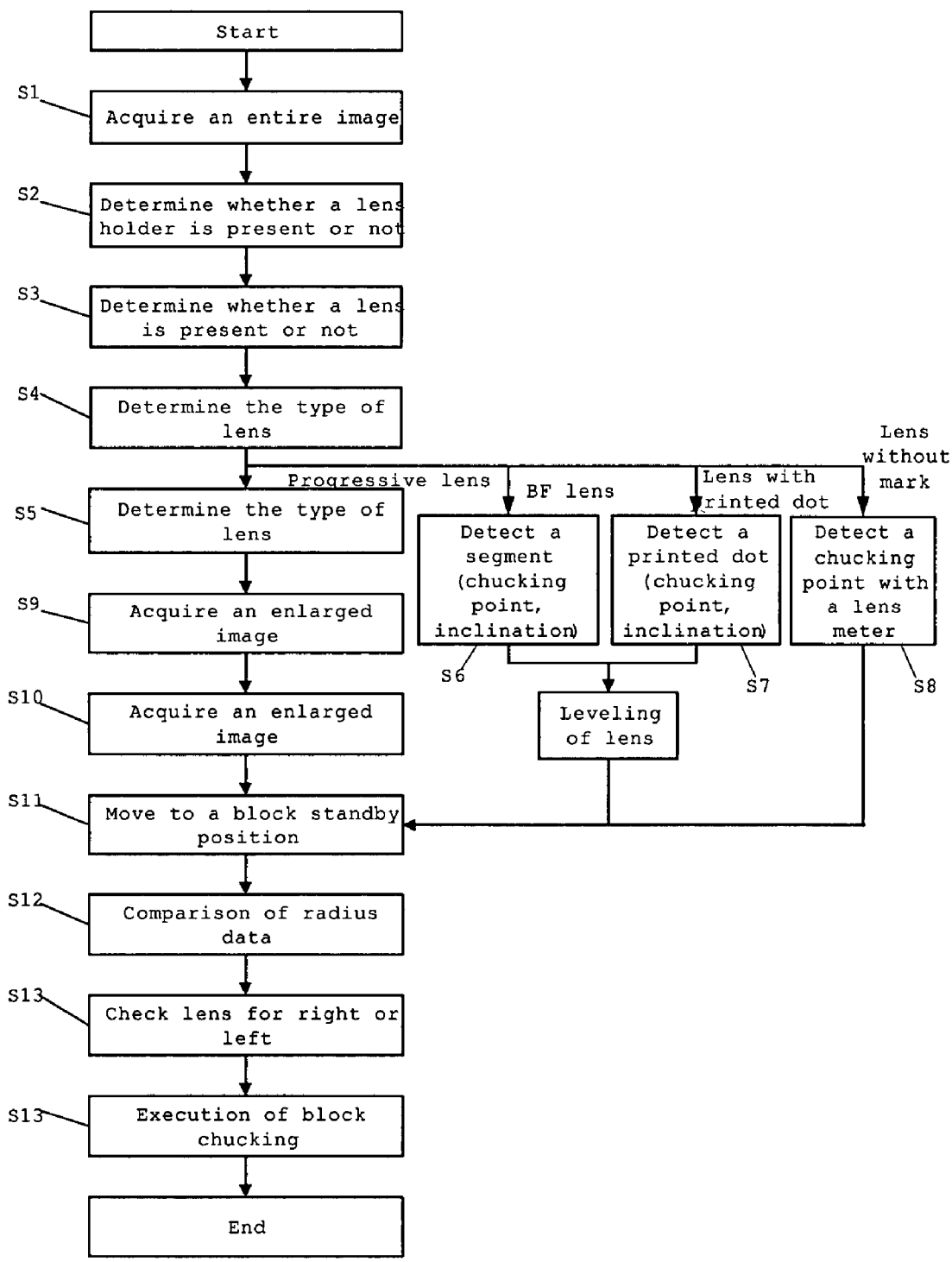

[fig2]
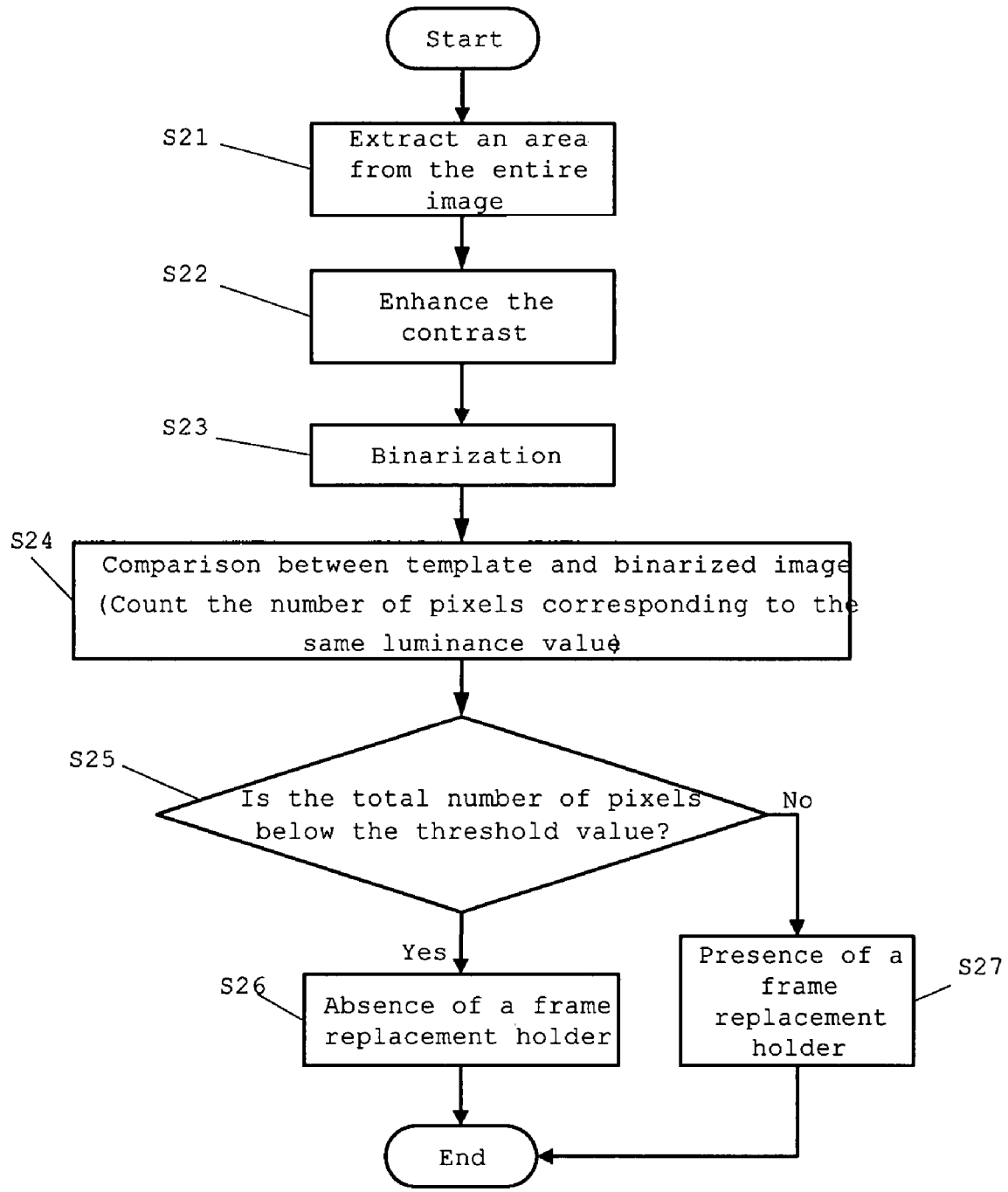

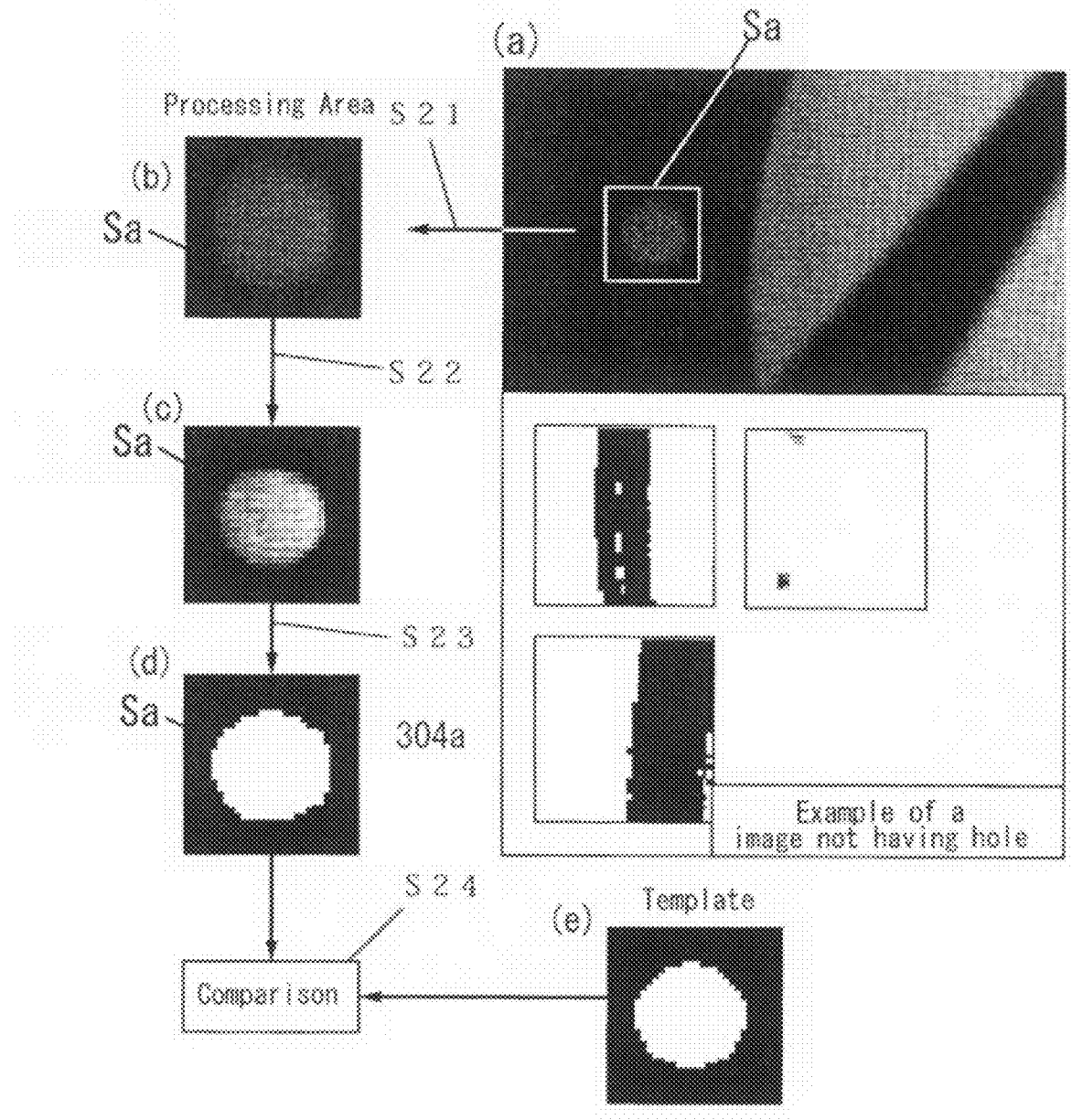

[fig4]
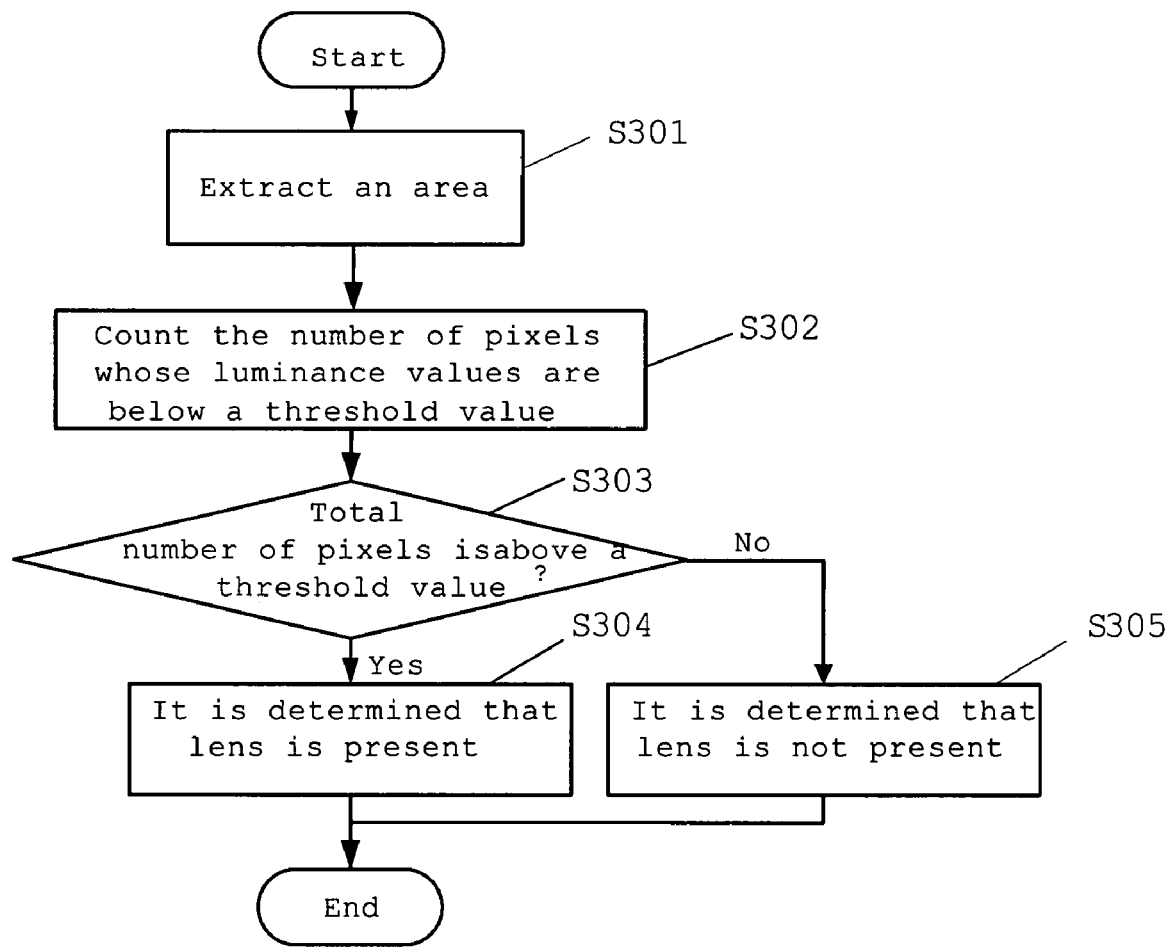

[fig5]
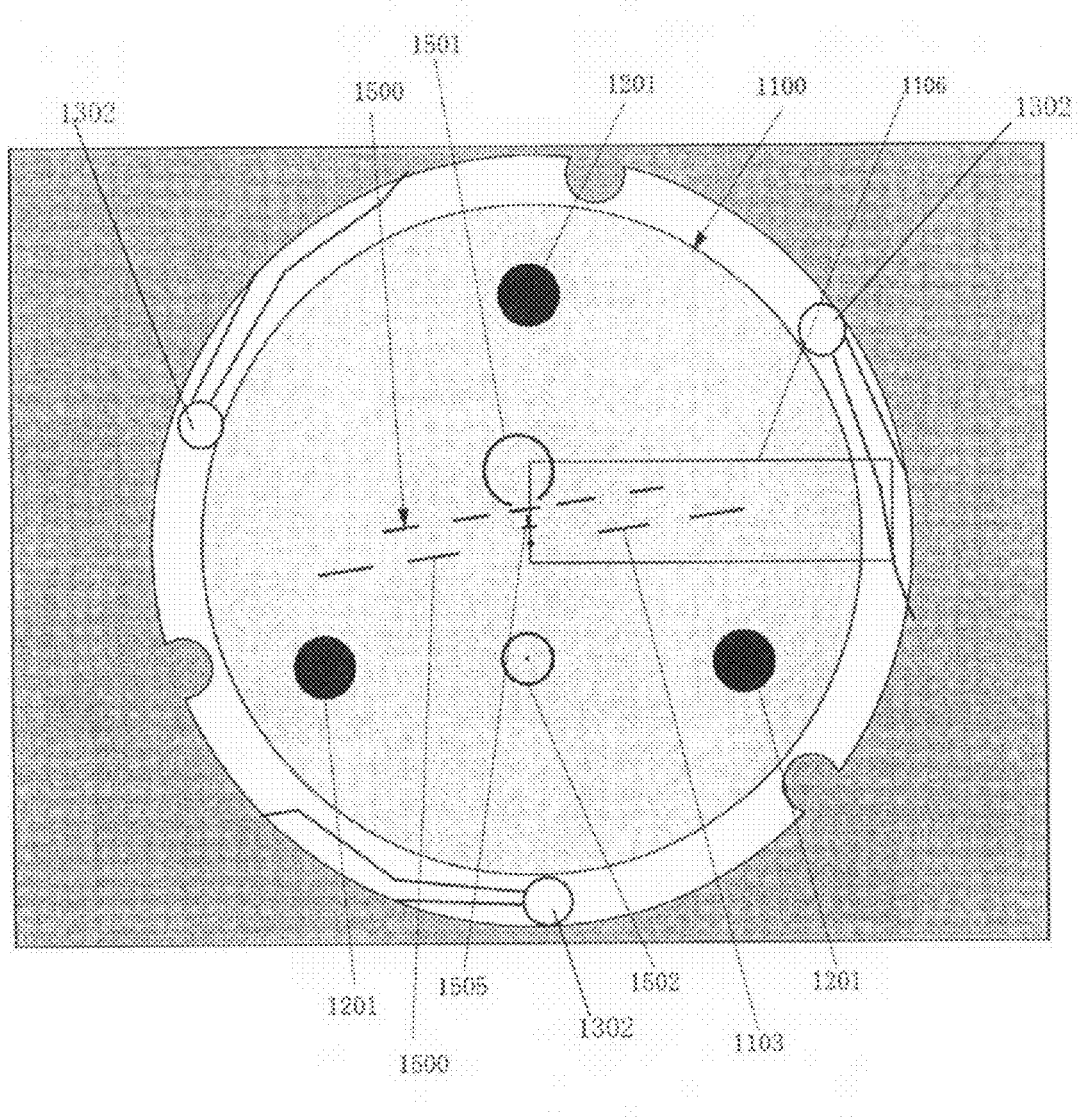

[fig6]
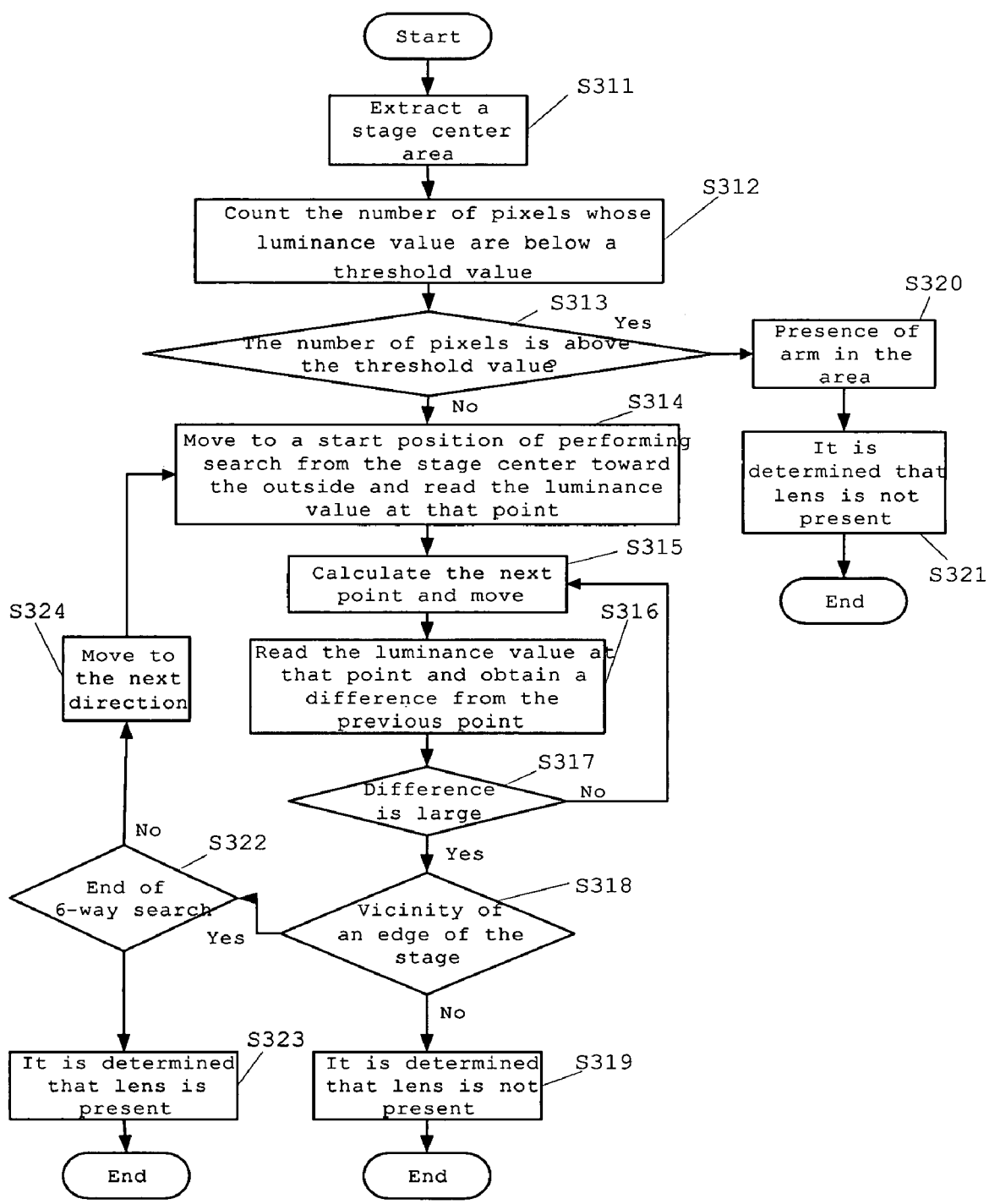

[fig7]
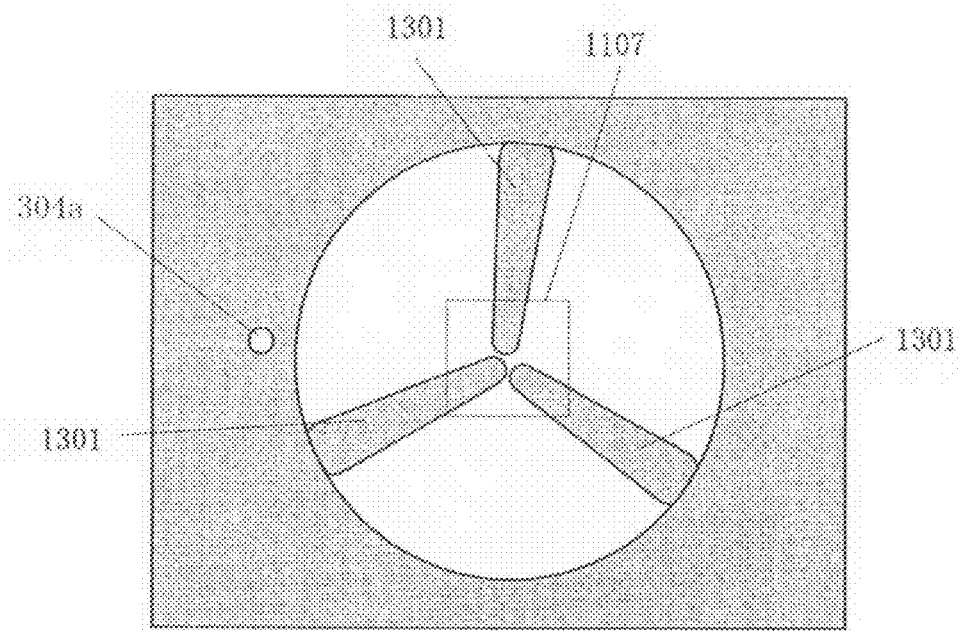

[fig8]
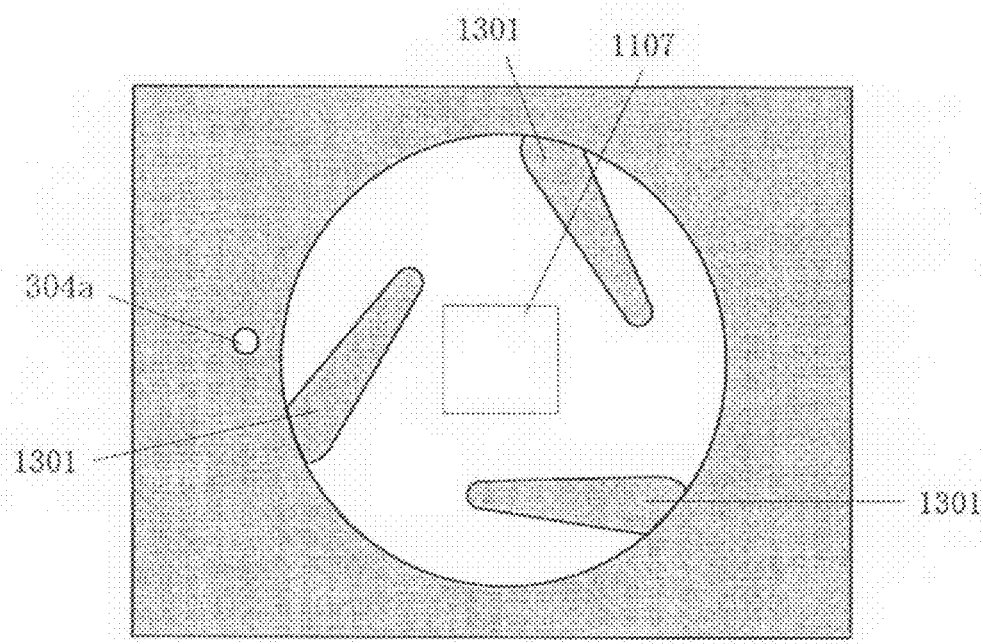

[fig9]
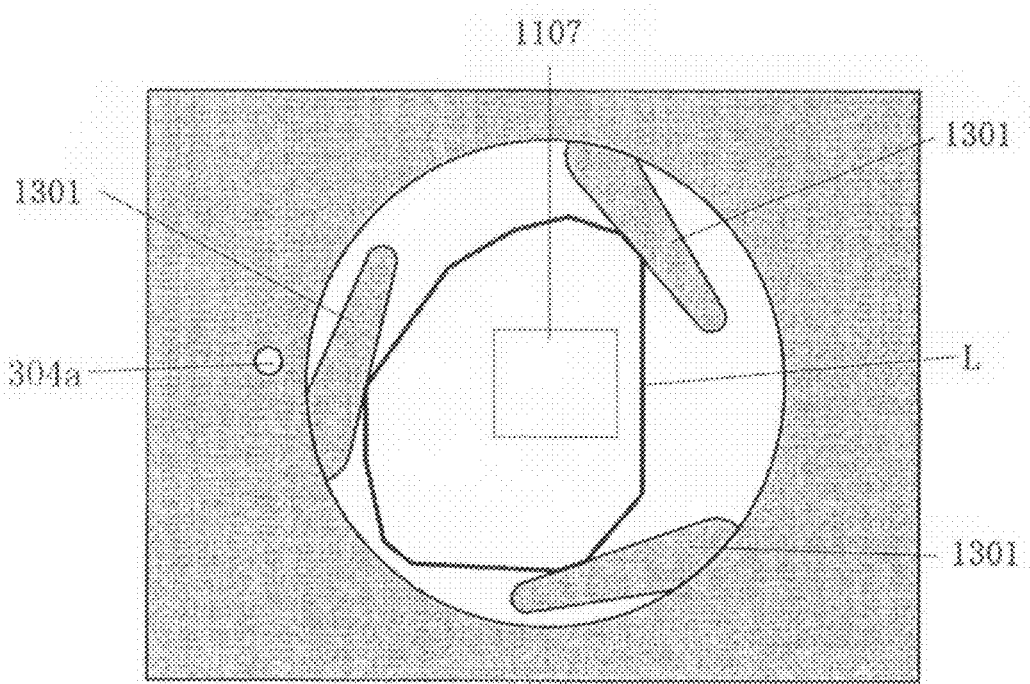

[fig10]
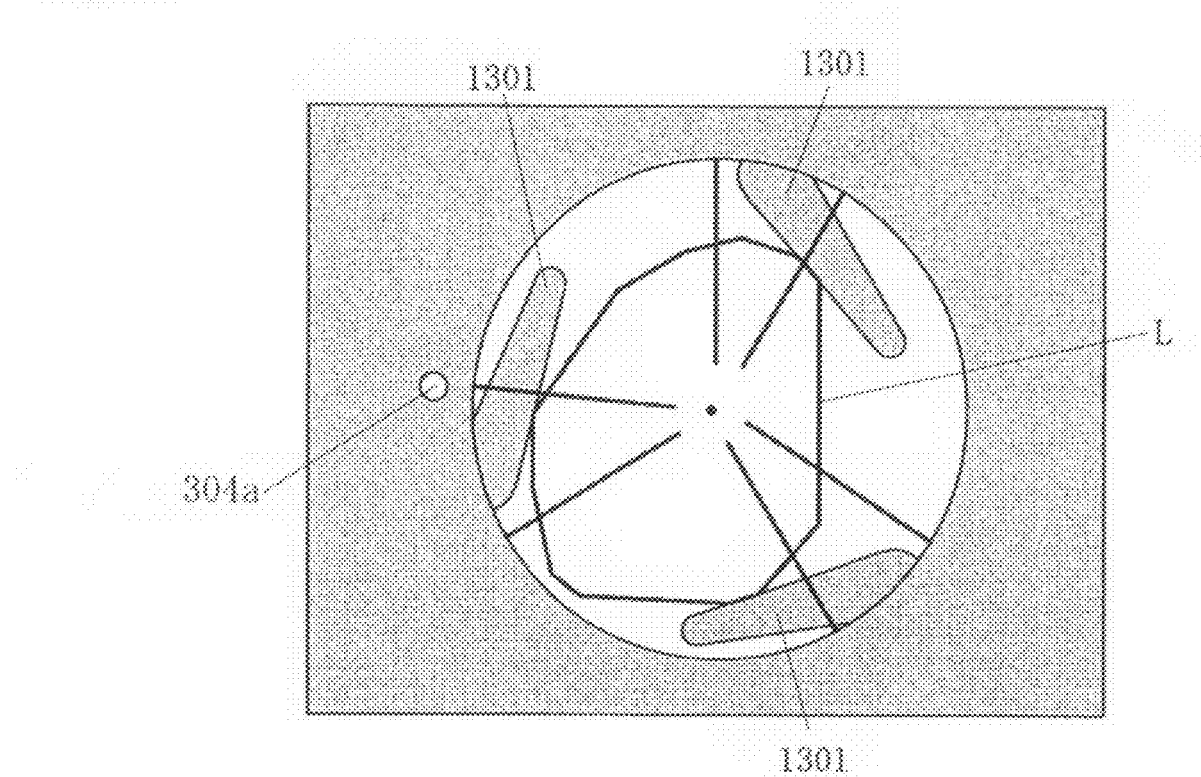

[fig11]
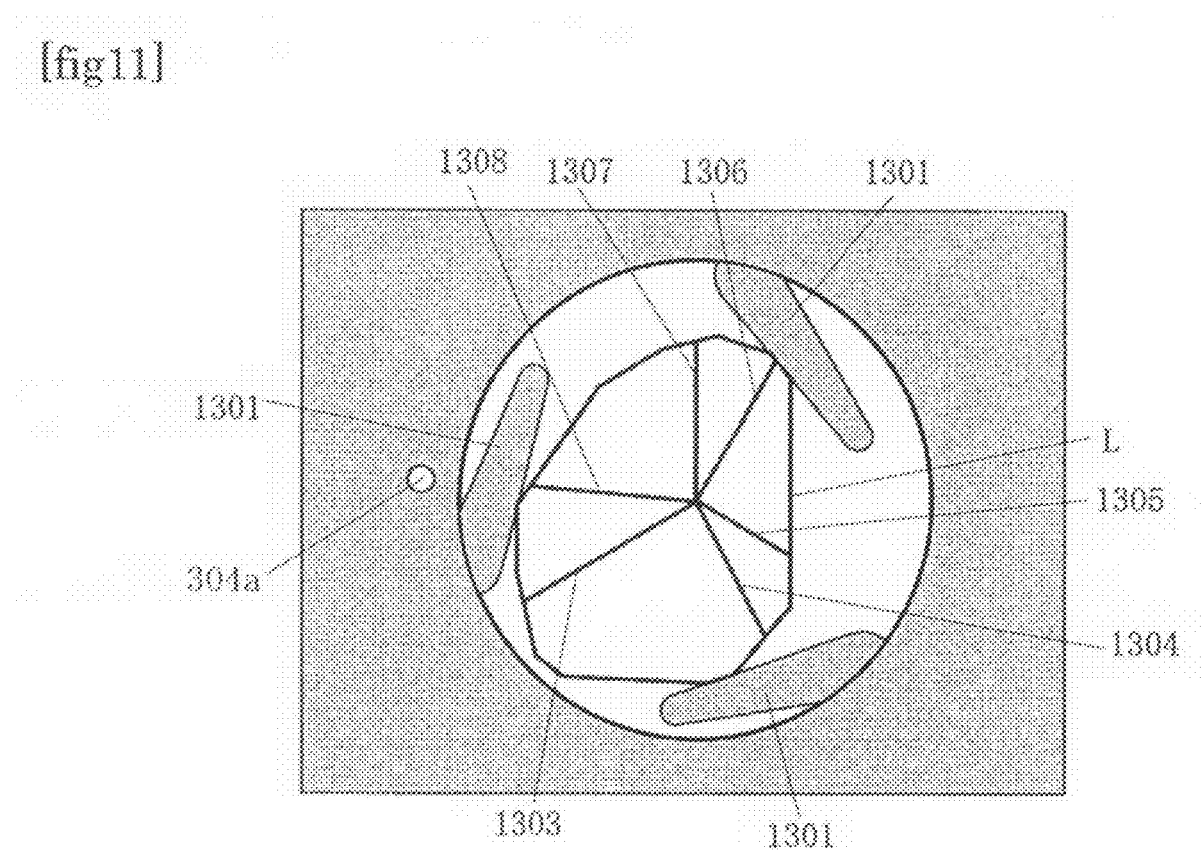

[fig12]
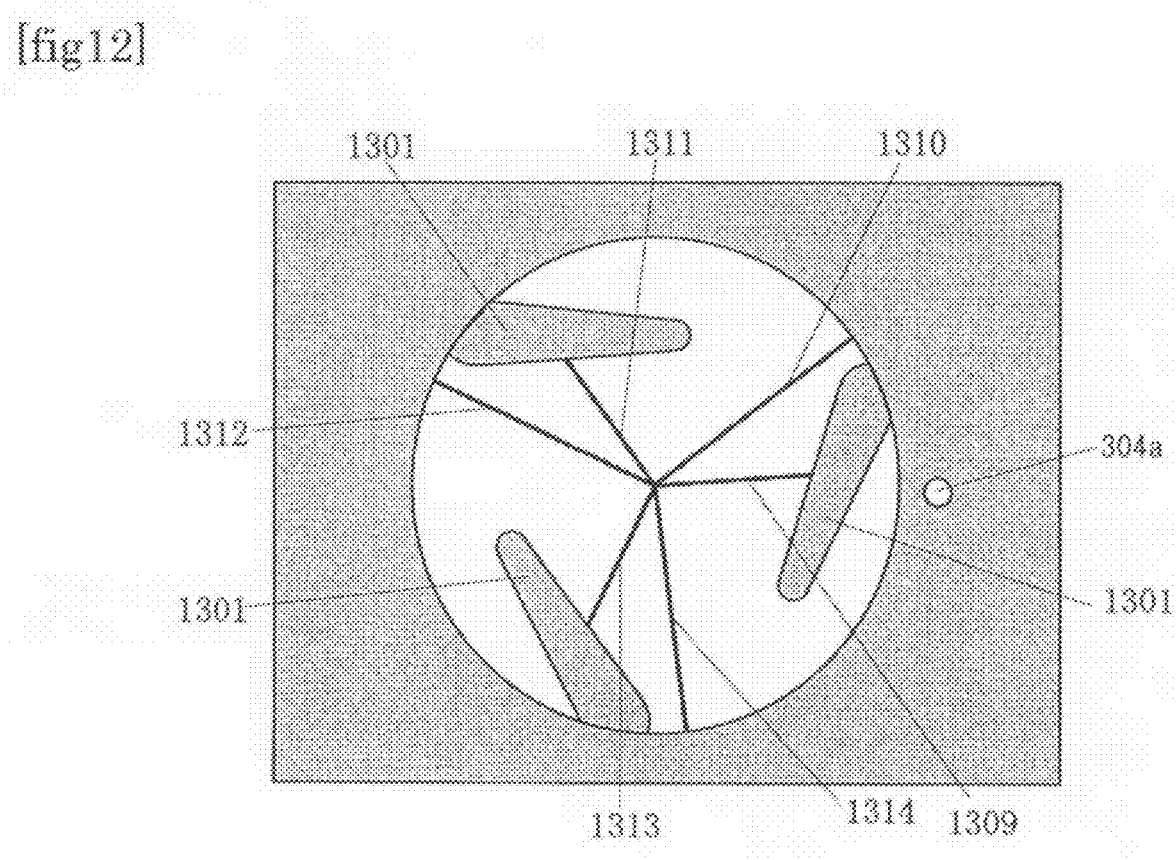

[fig13]
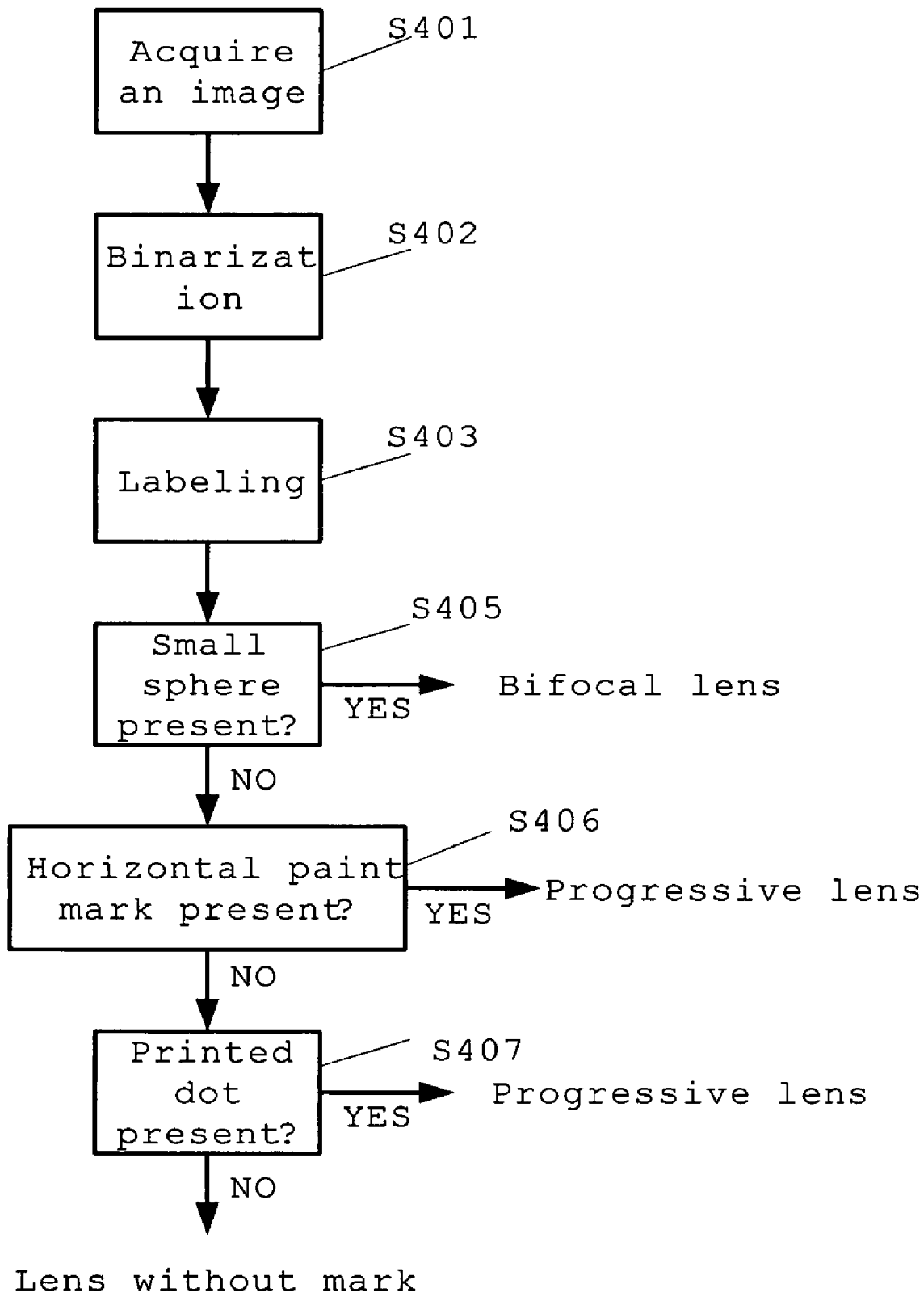

[fig14]
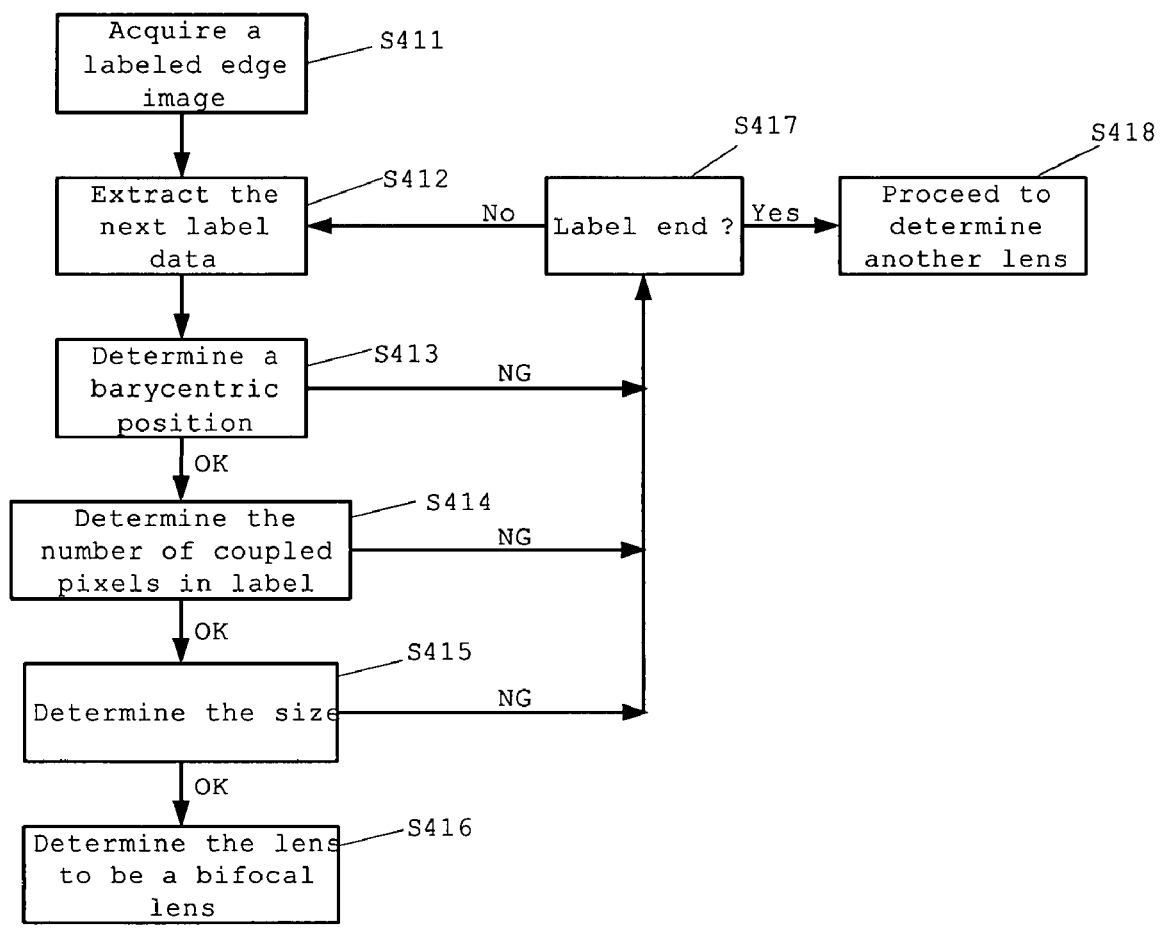

[fig15]
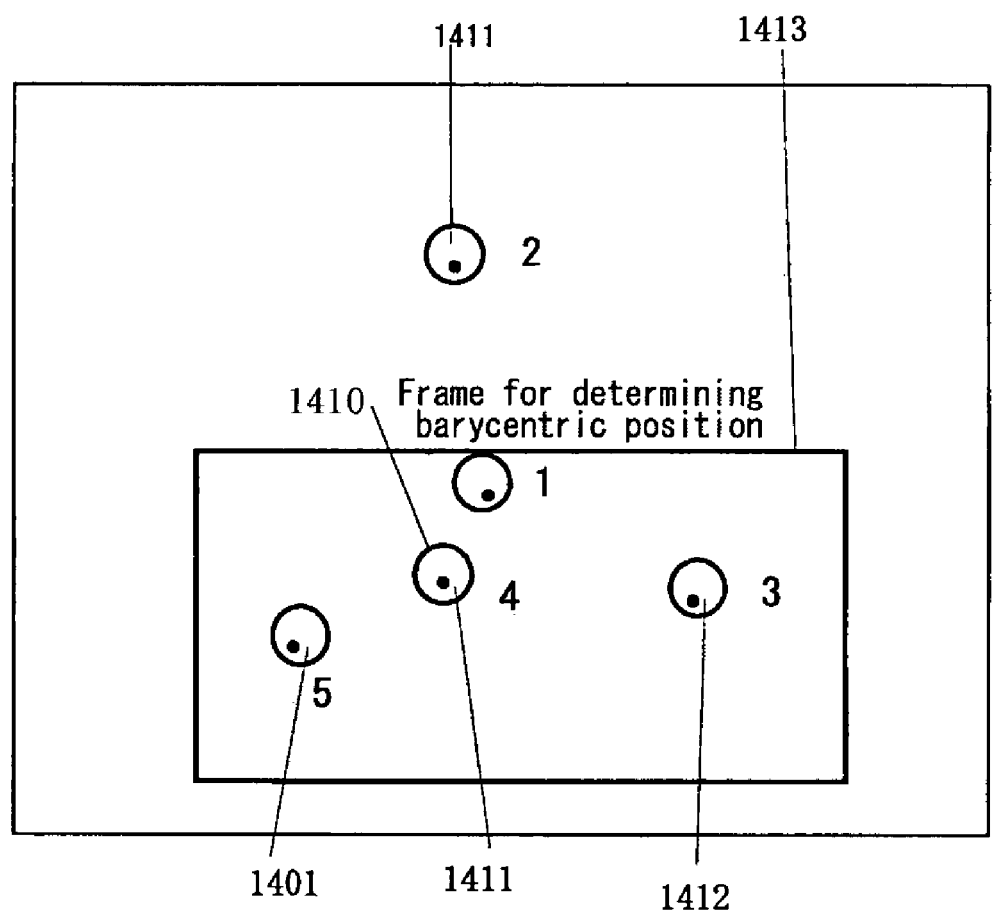

[fig16]
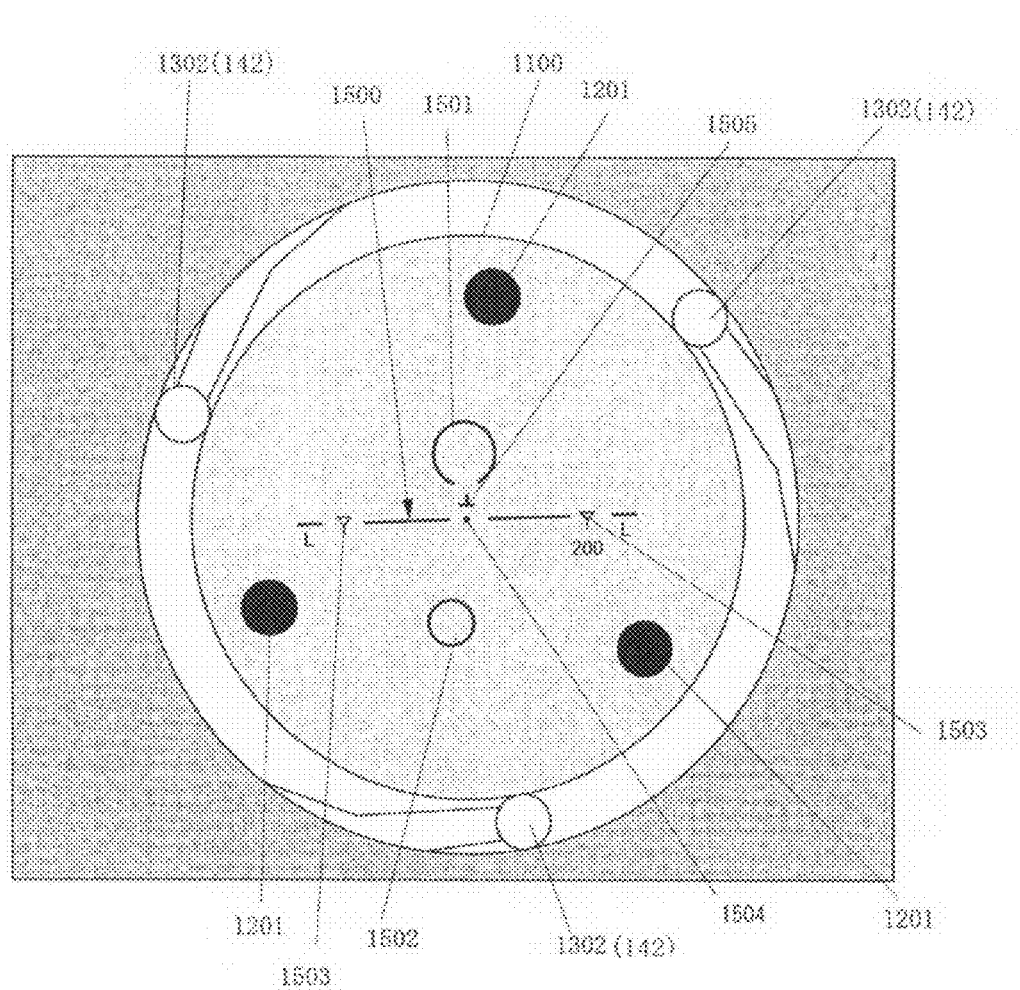

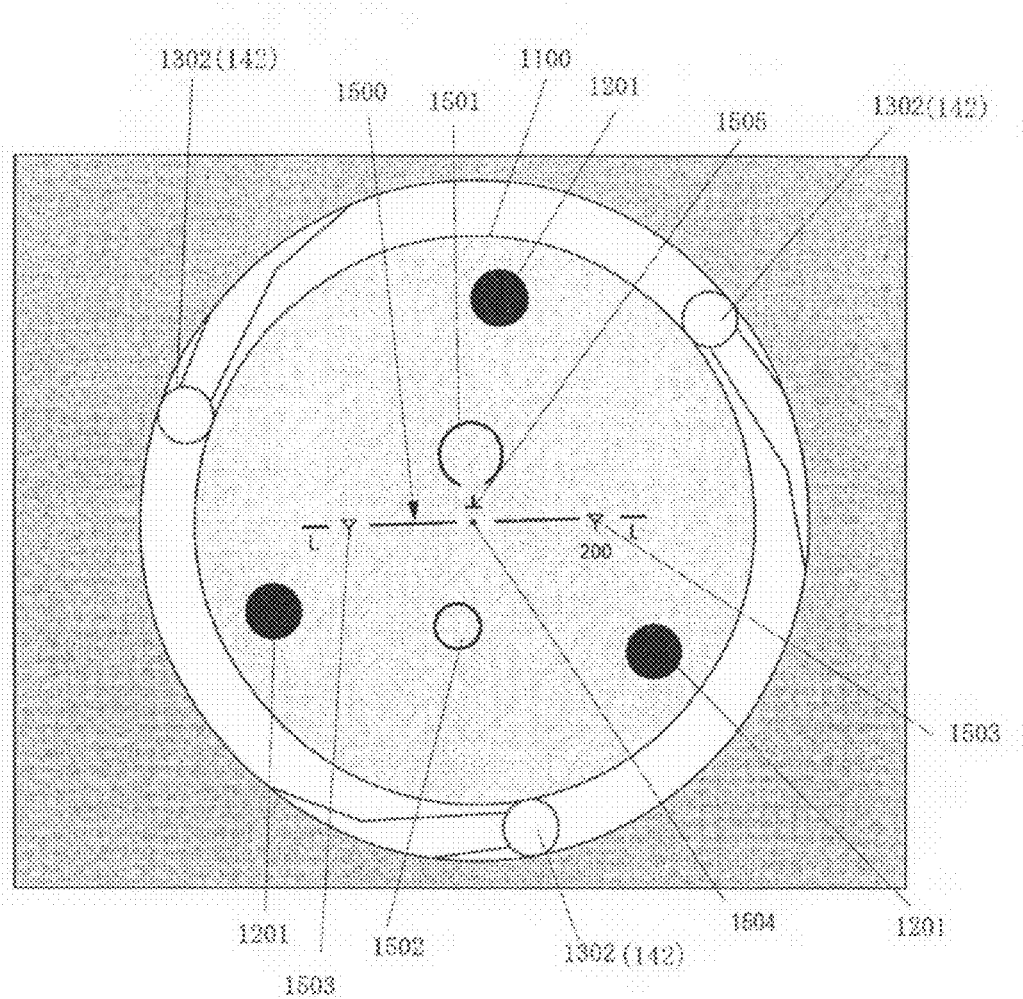
[fig17]

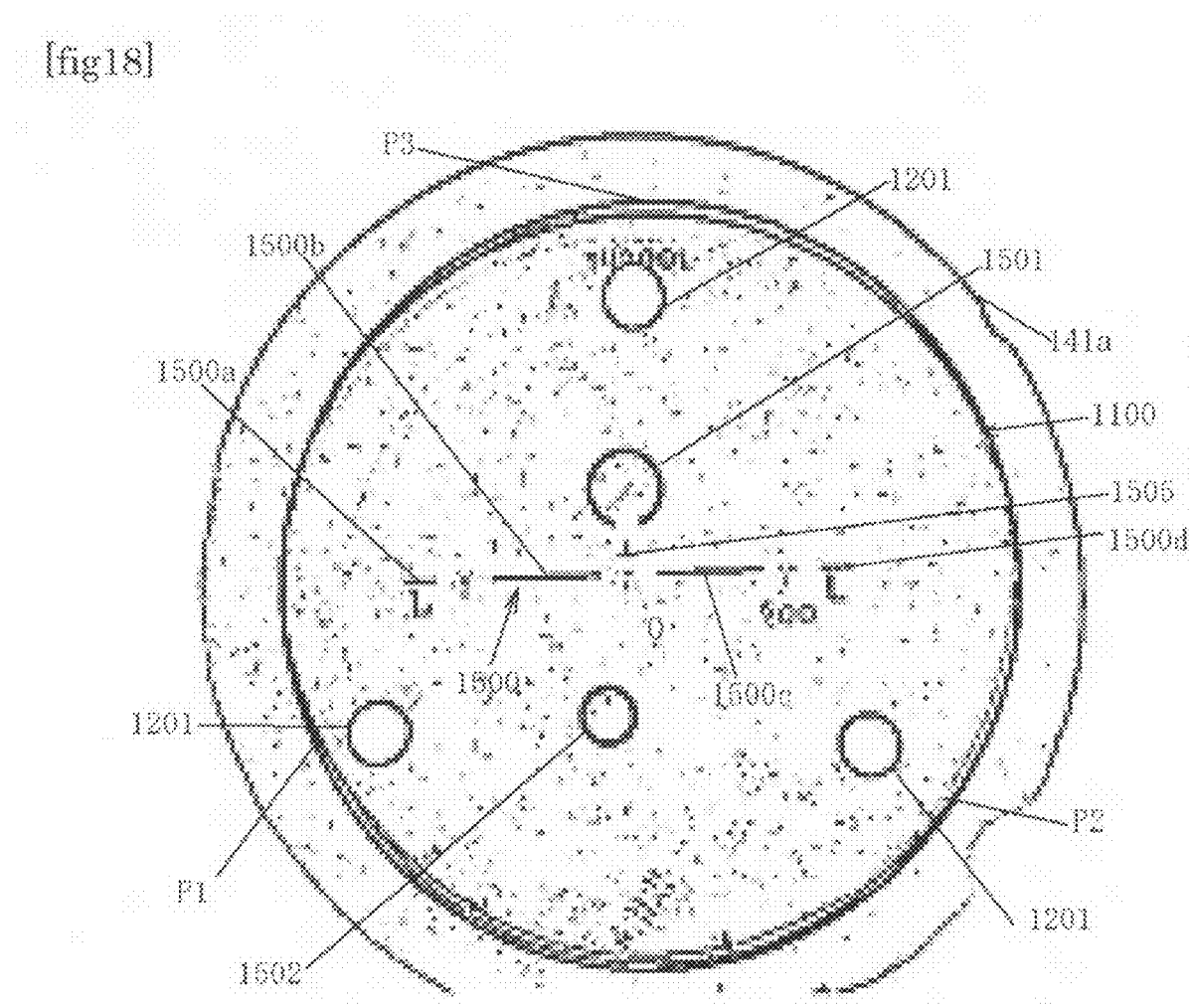
[fig18]

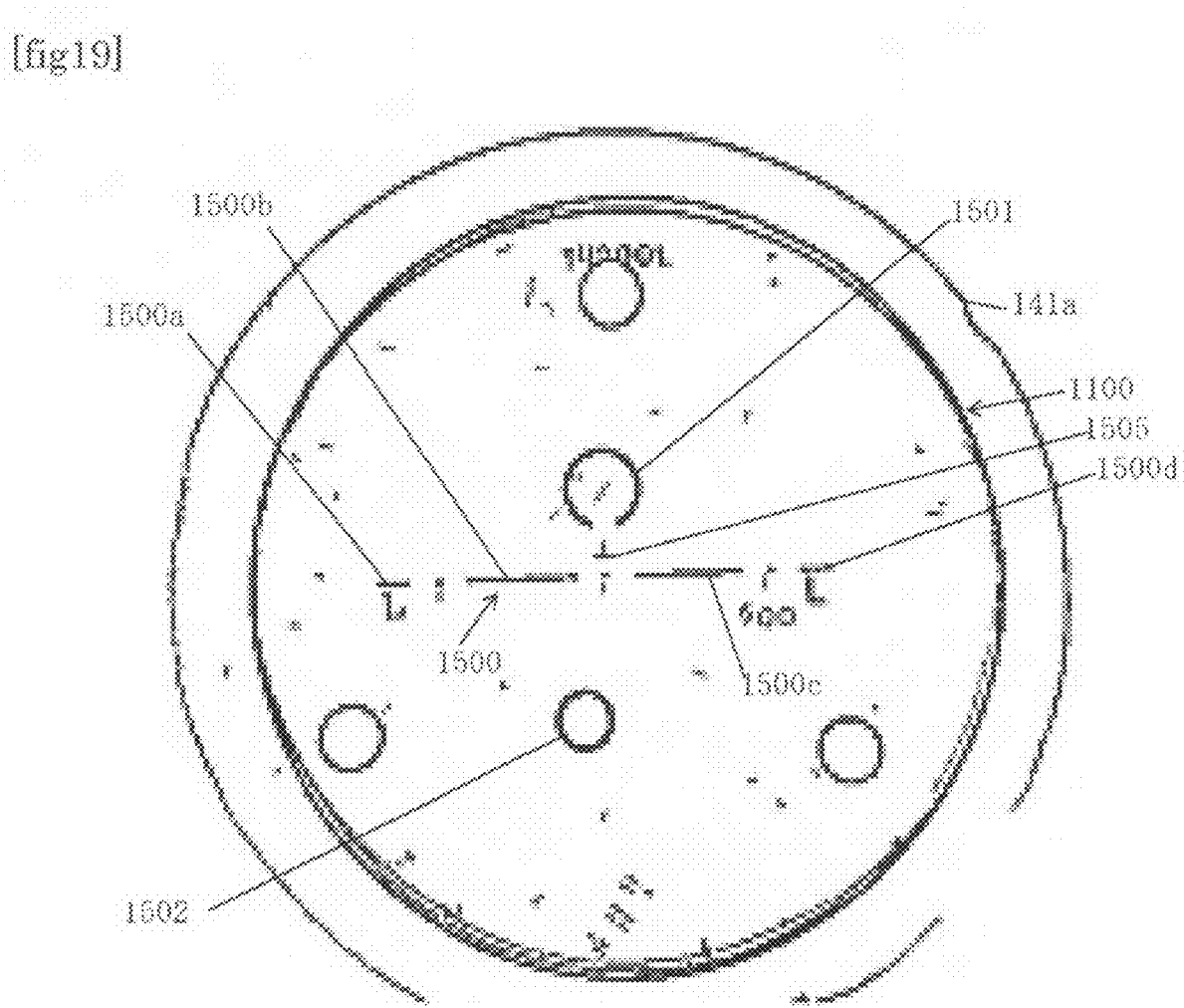
[fig19]

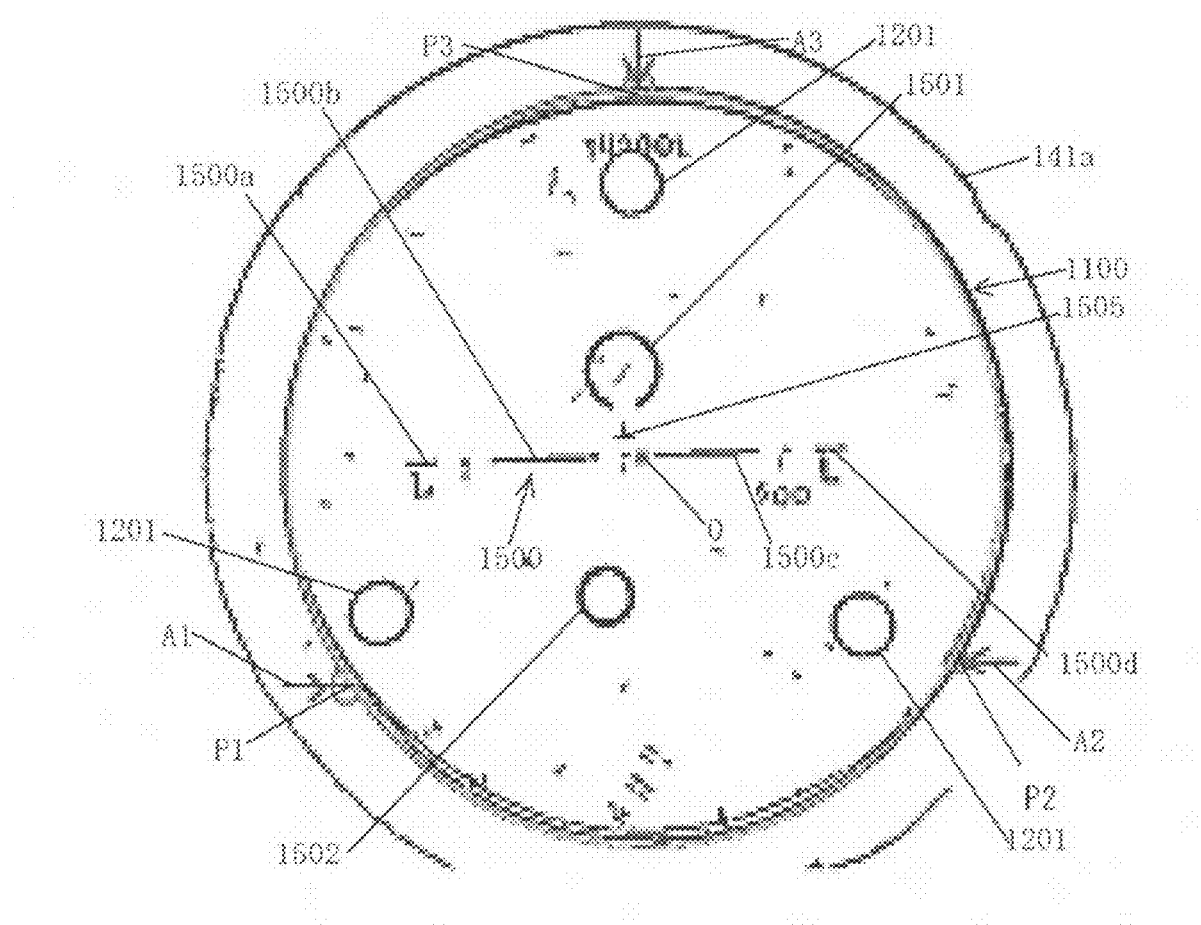
[fig20]

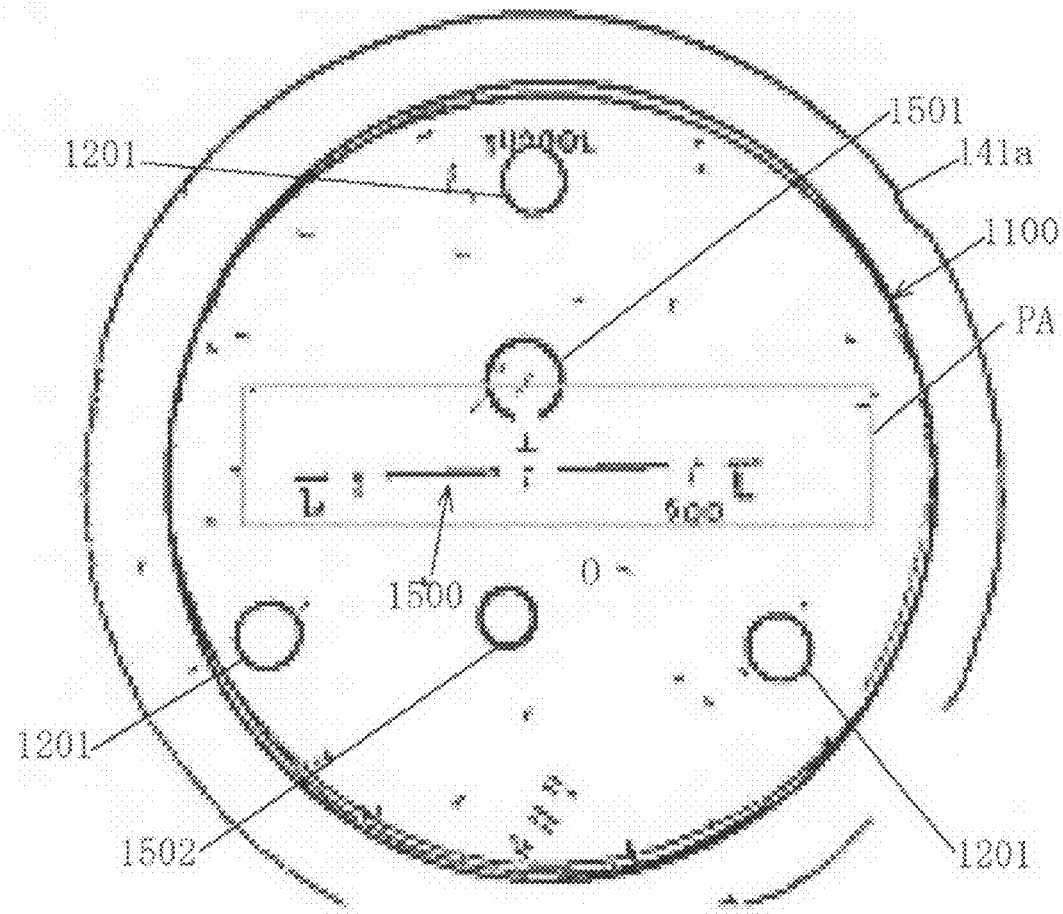
[fig21]

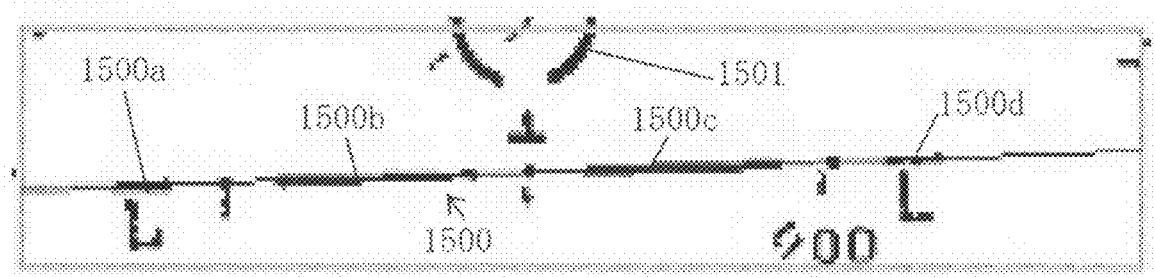
[fig22]

[fig23]
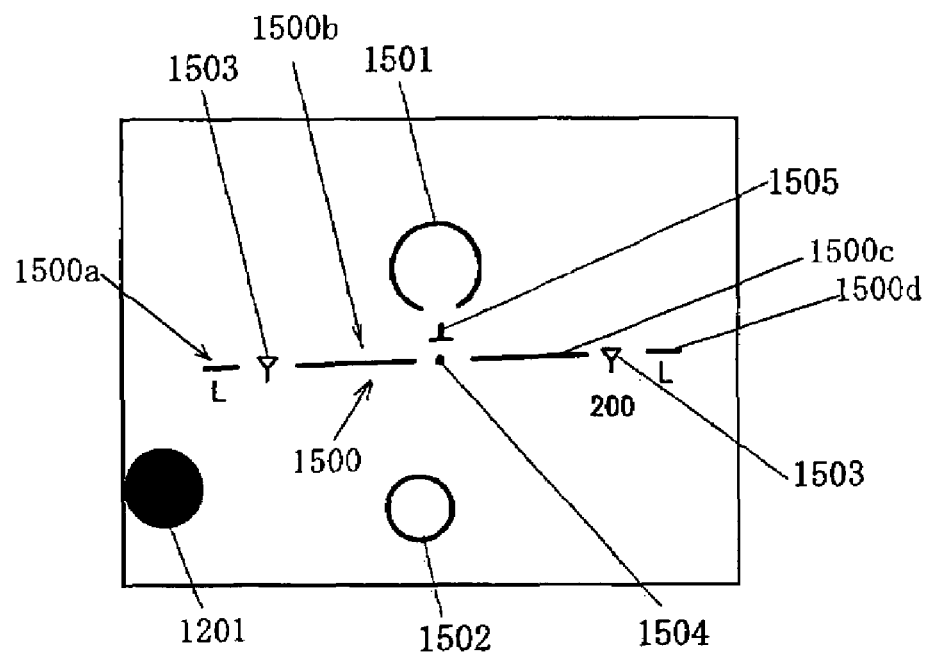

[fig24]
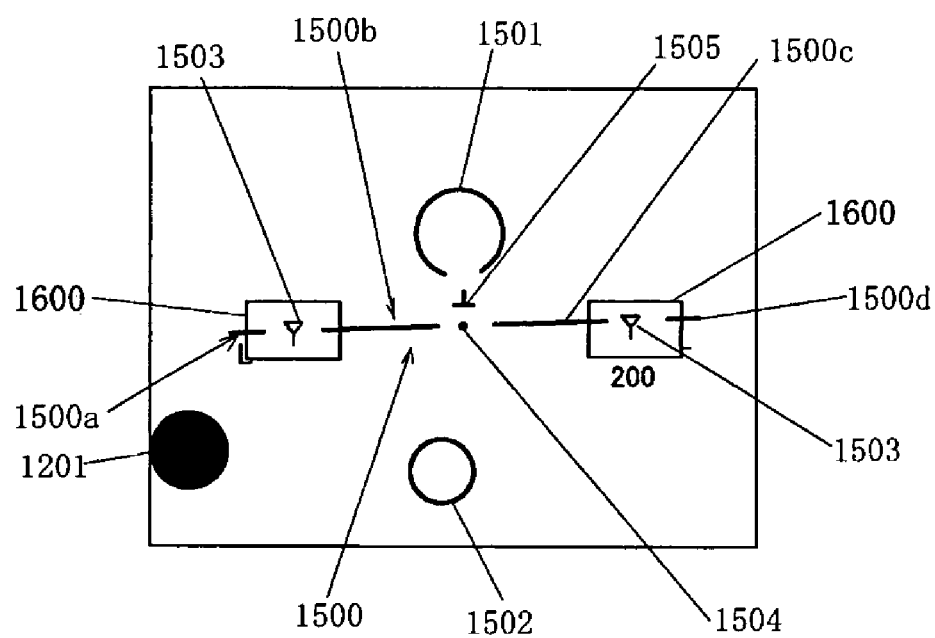

[fig25]
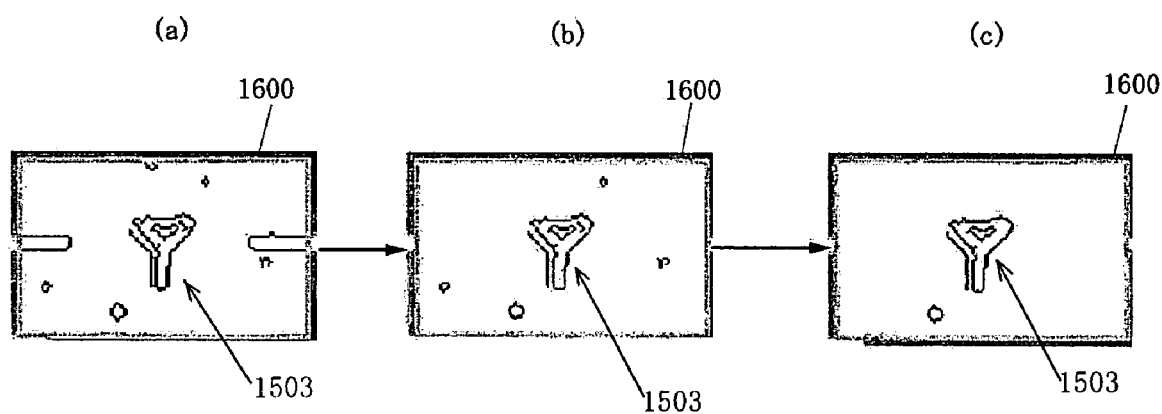

[fig26]
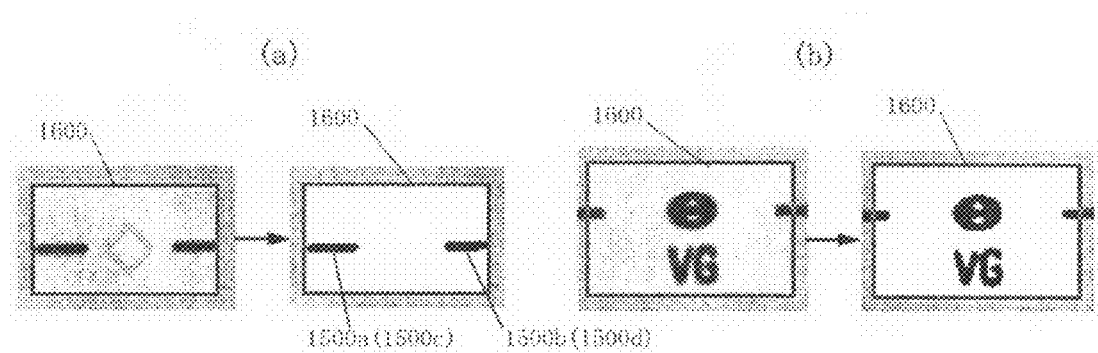

[fig27]
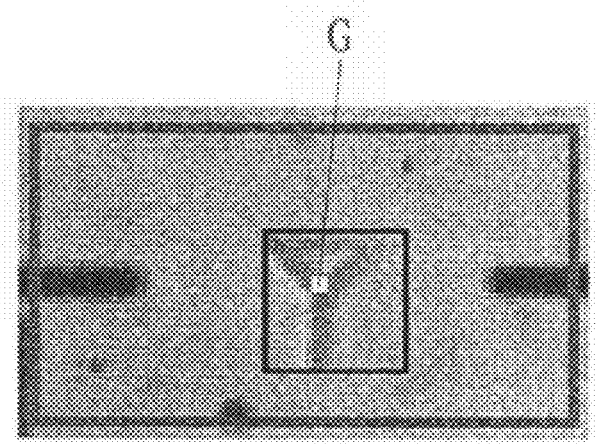
(a)
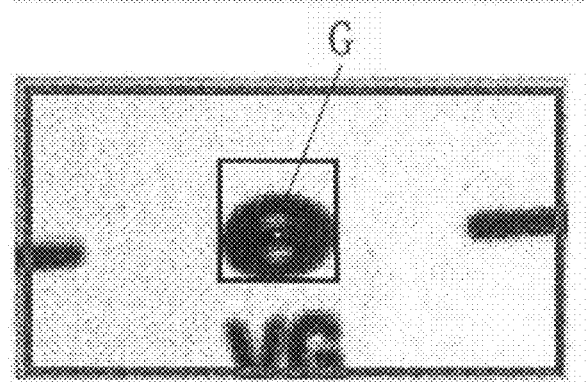
(b)

[fig28]
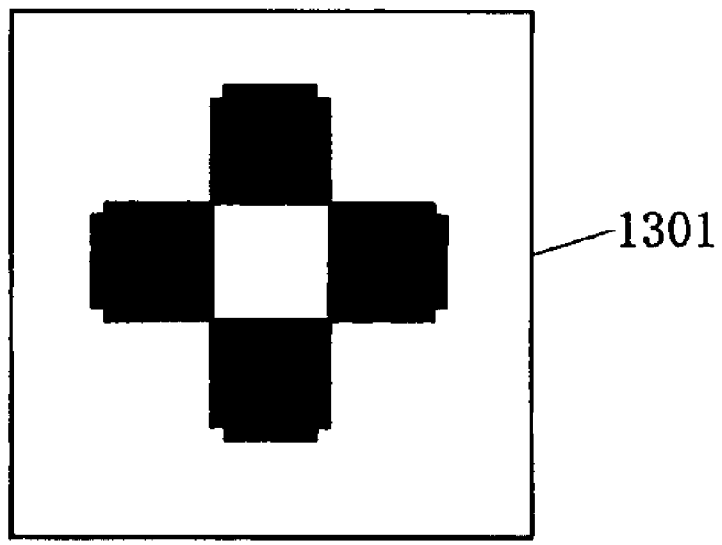

[fig29]
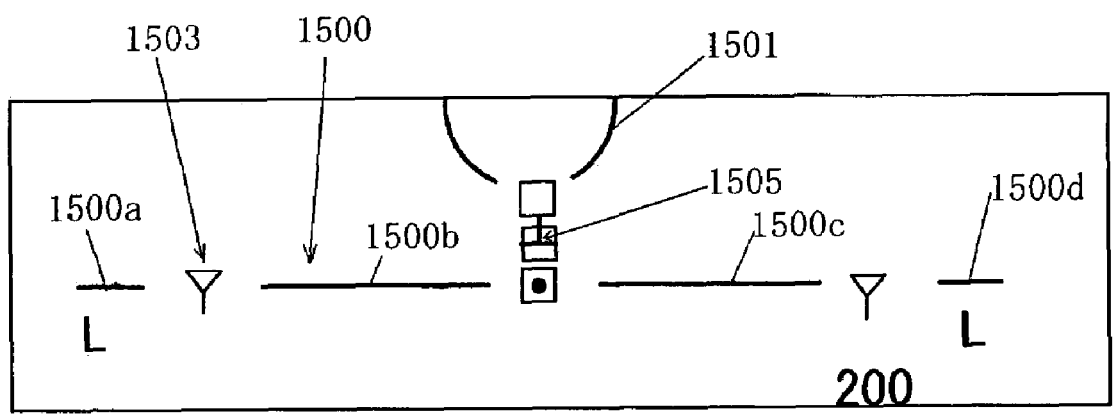

[fig30]
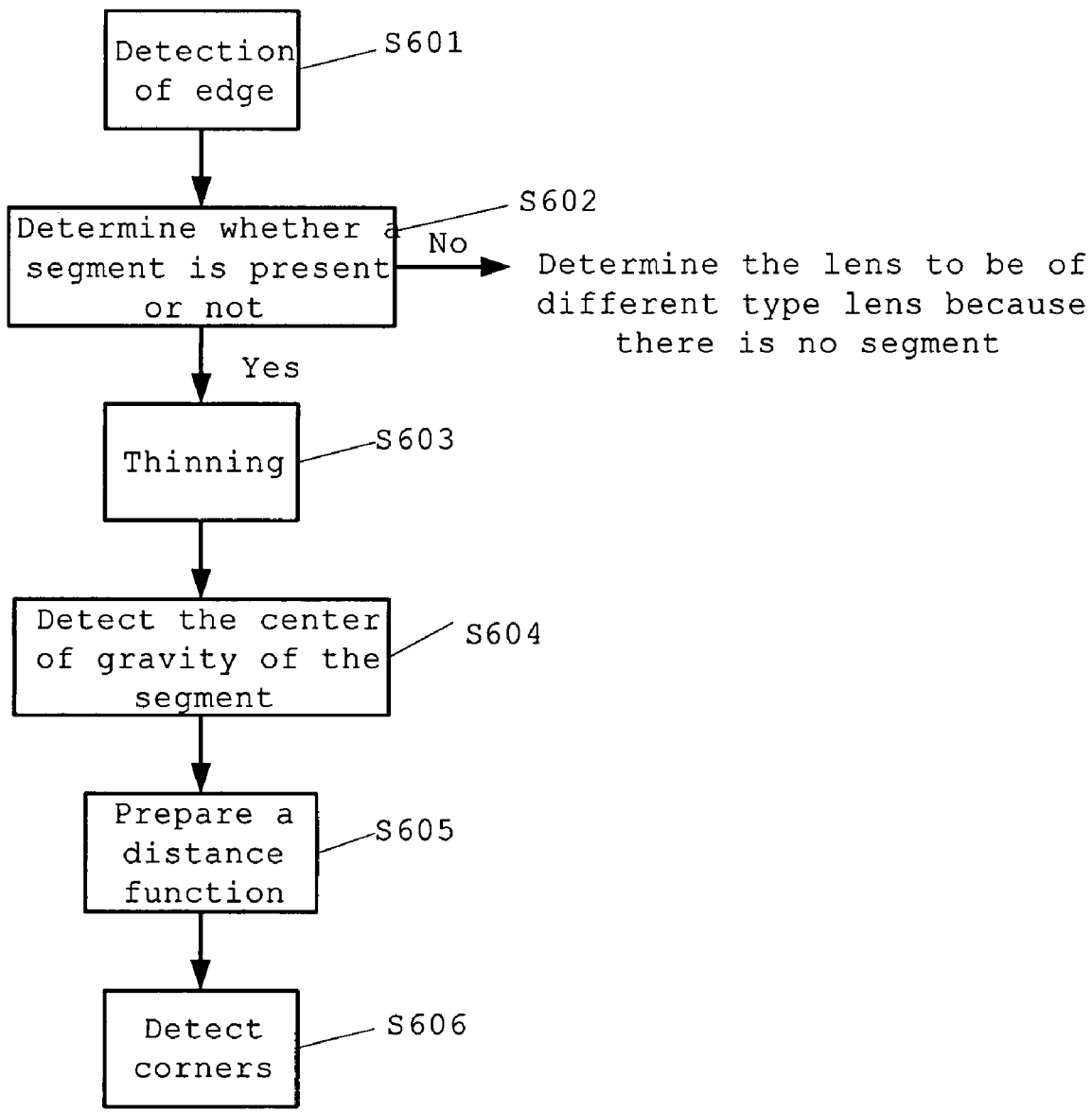

[fig31]
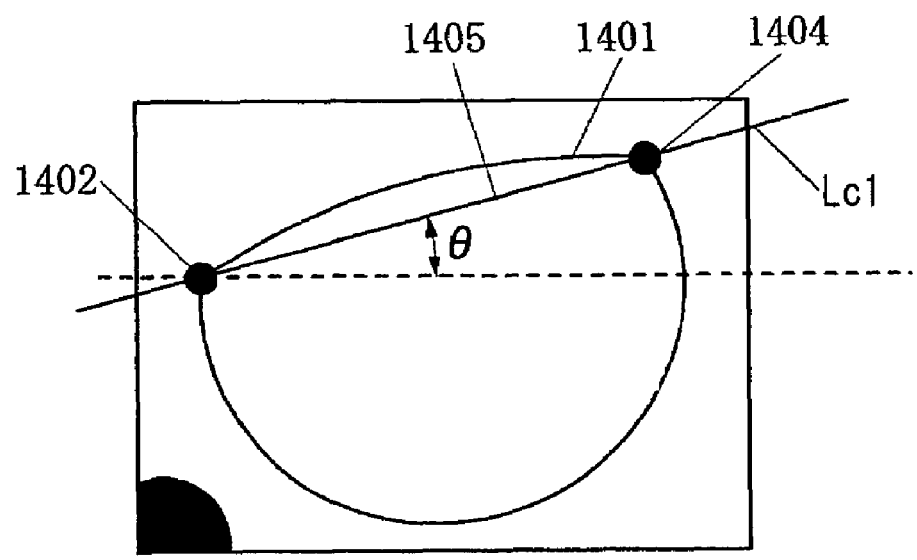

[fig32]
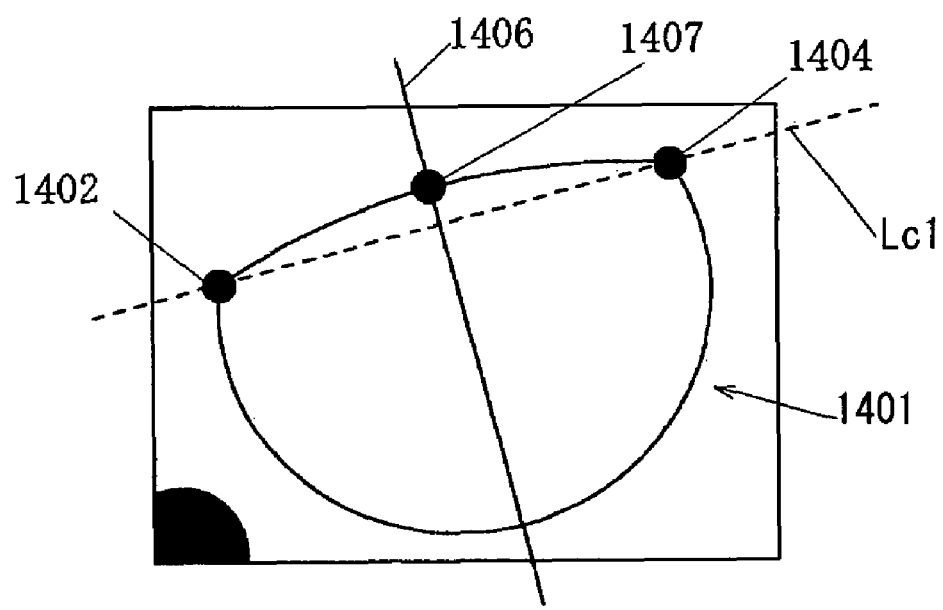

[fig33]
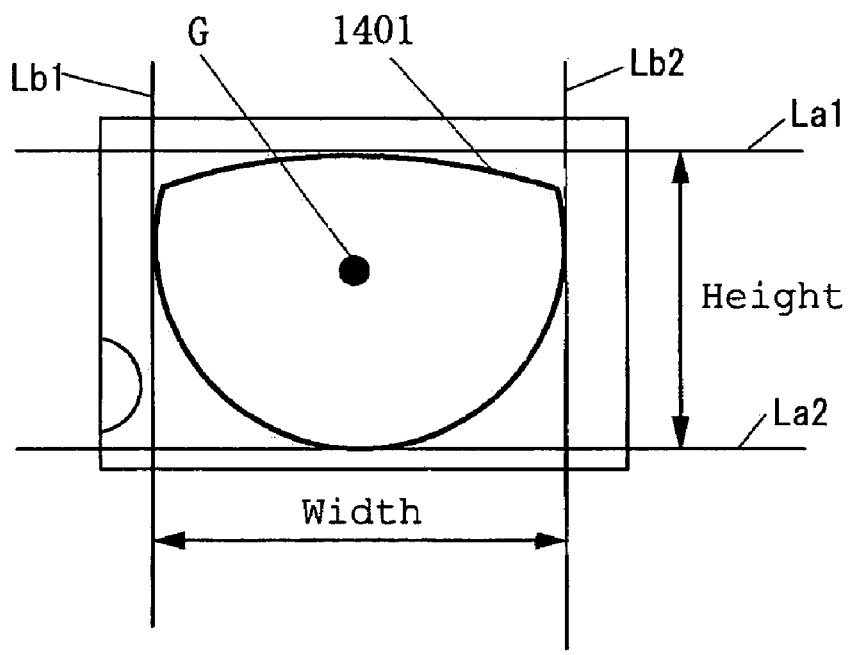

[fig34]
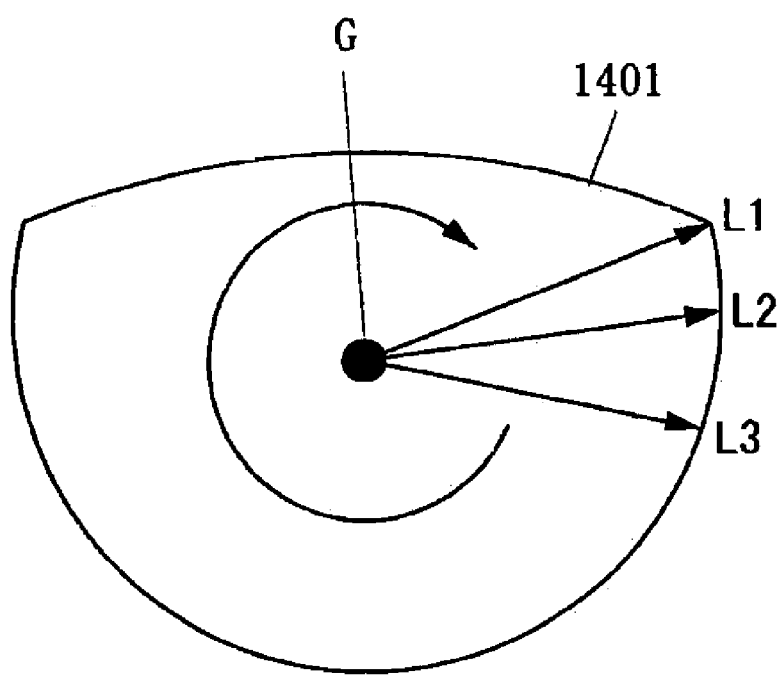

[fig35]
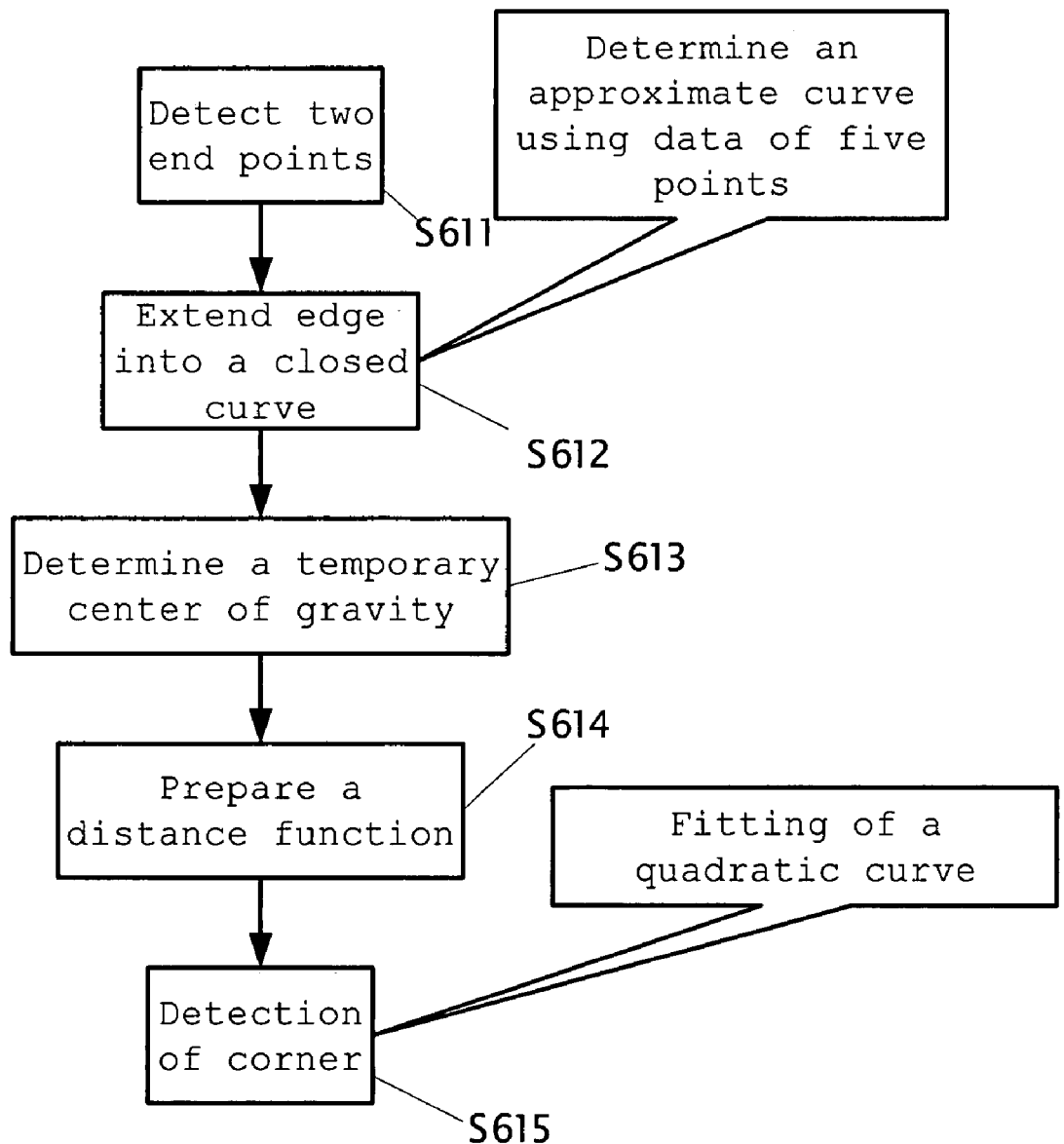

[fig36]
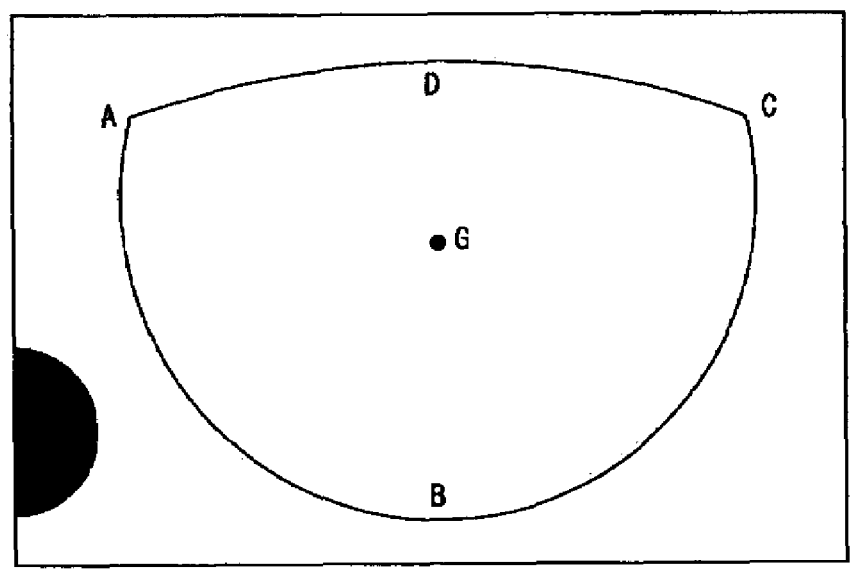

[fig37]
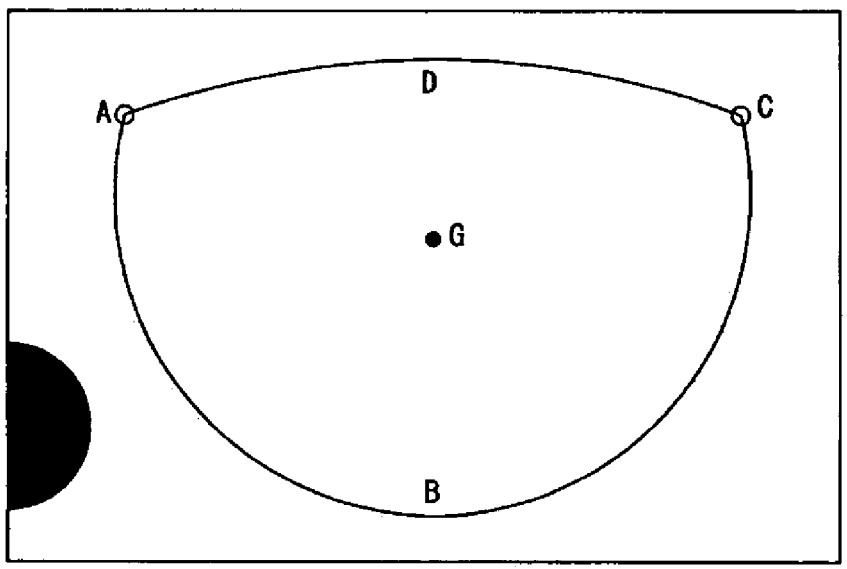

[fig38]
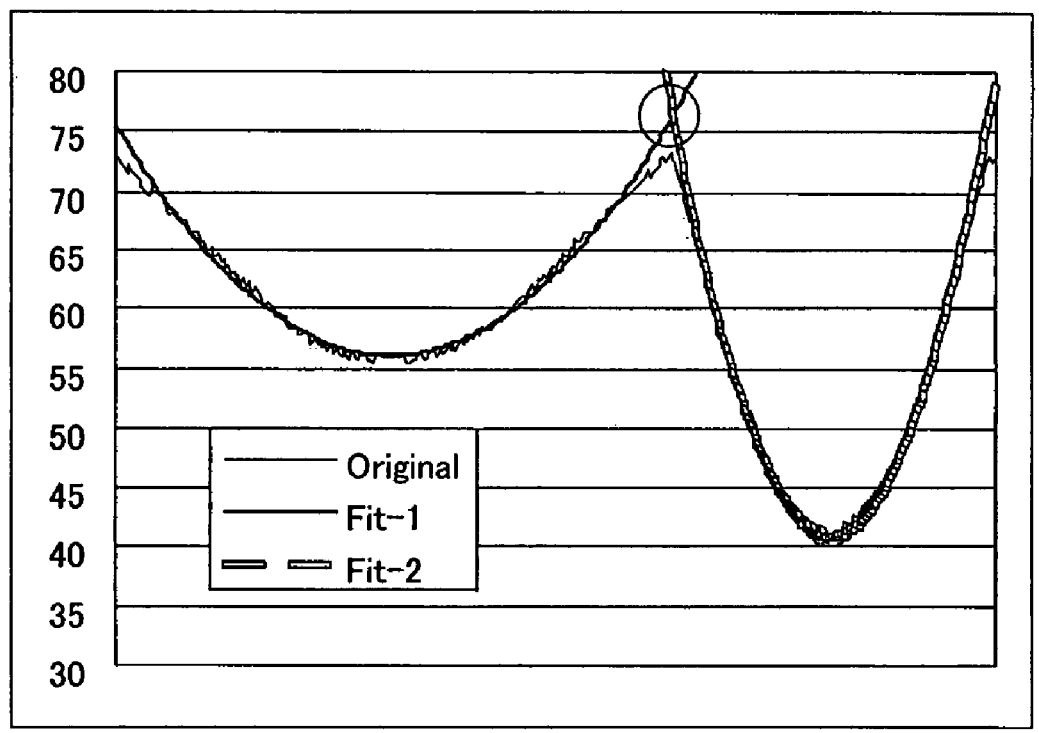

[fig39]
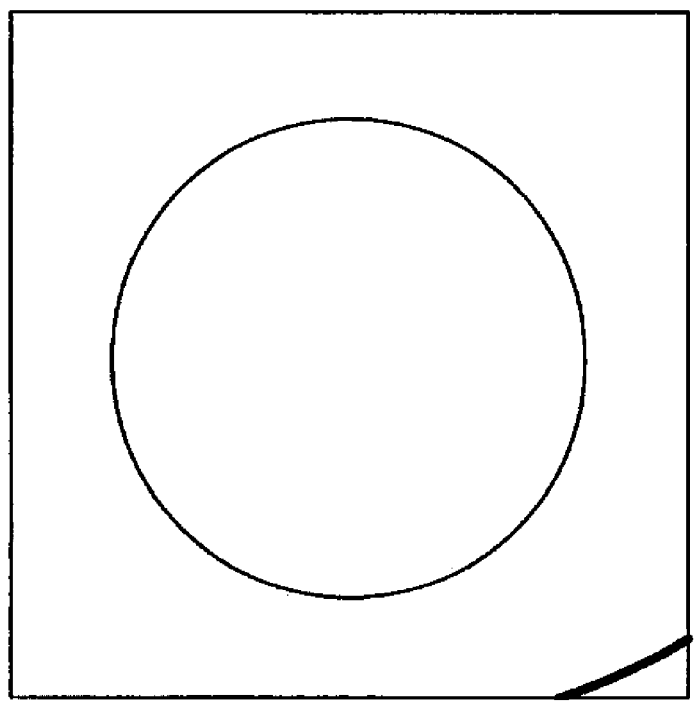

[fig40]
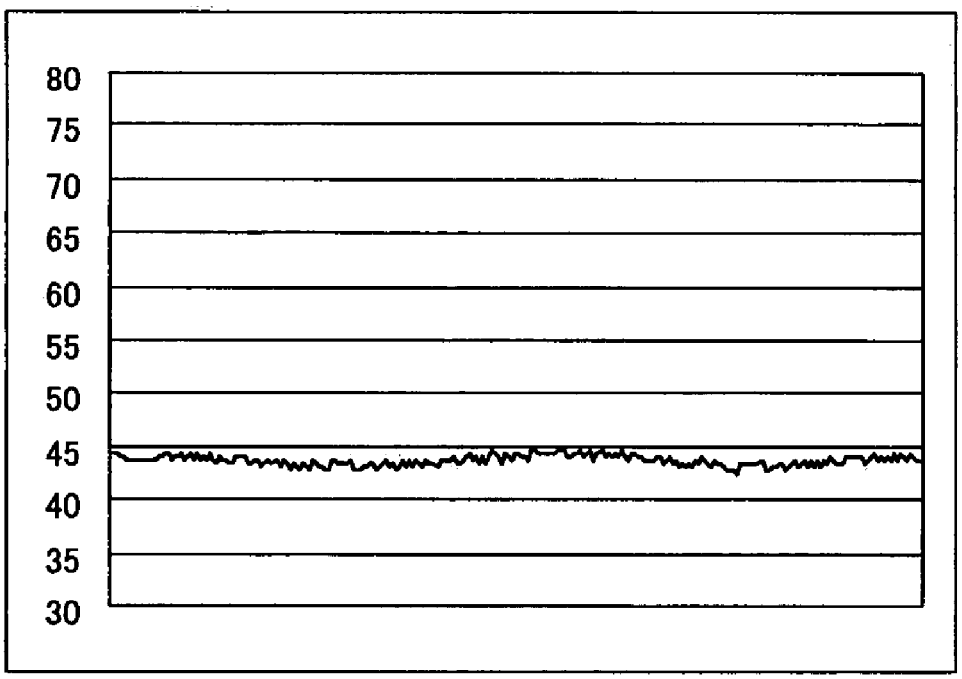

[fig41]
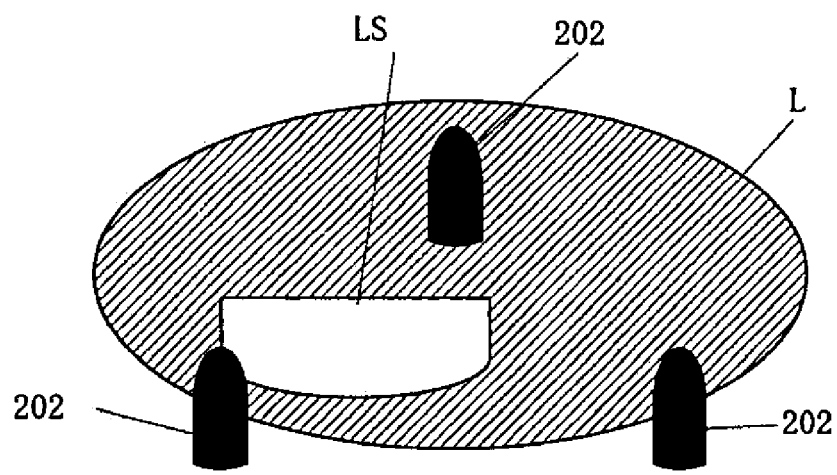

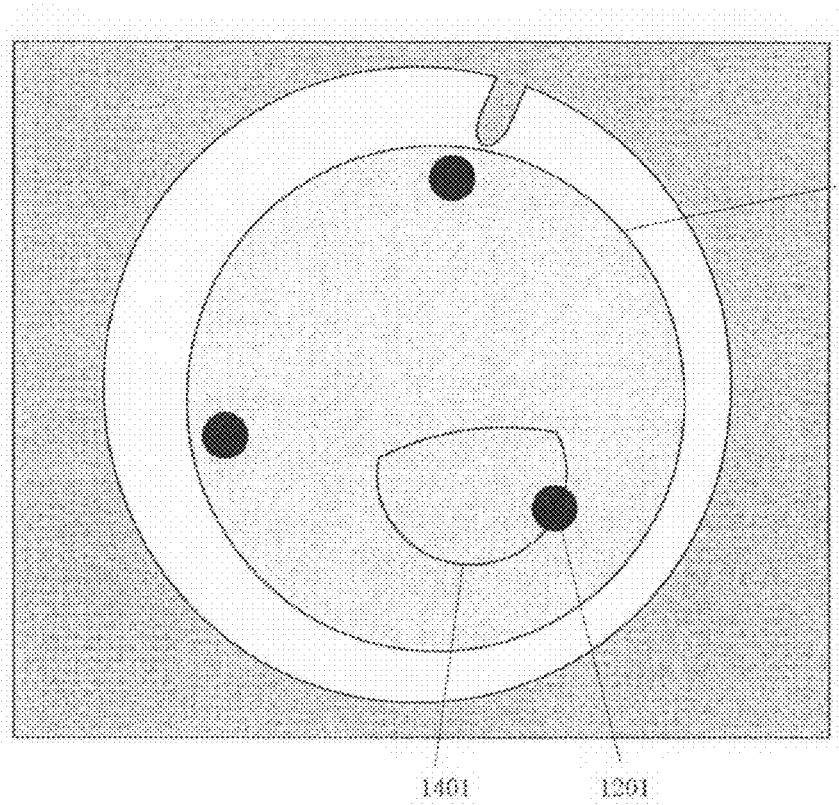
[fig42]

[fig43]
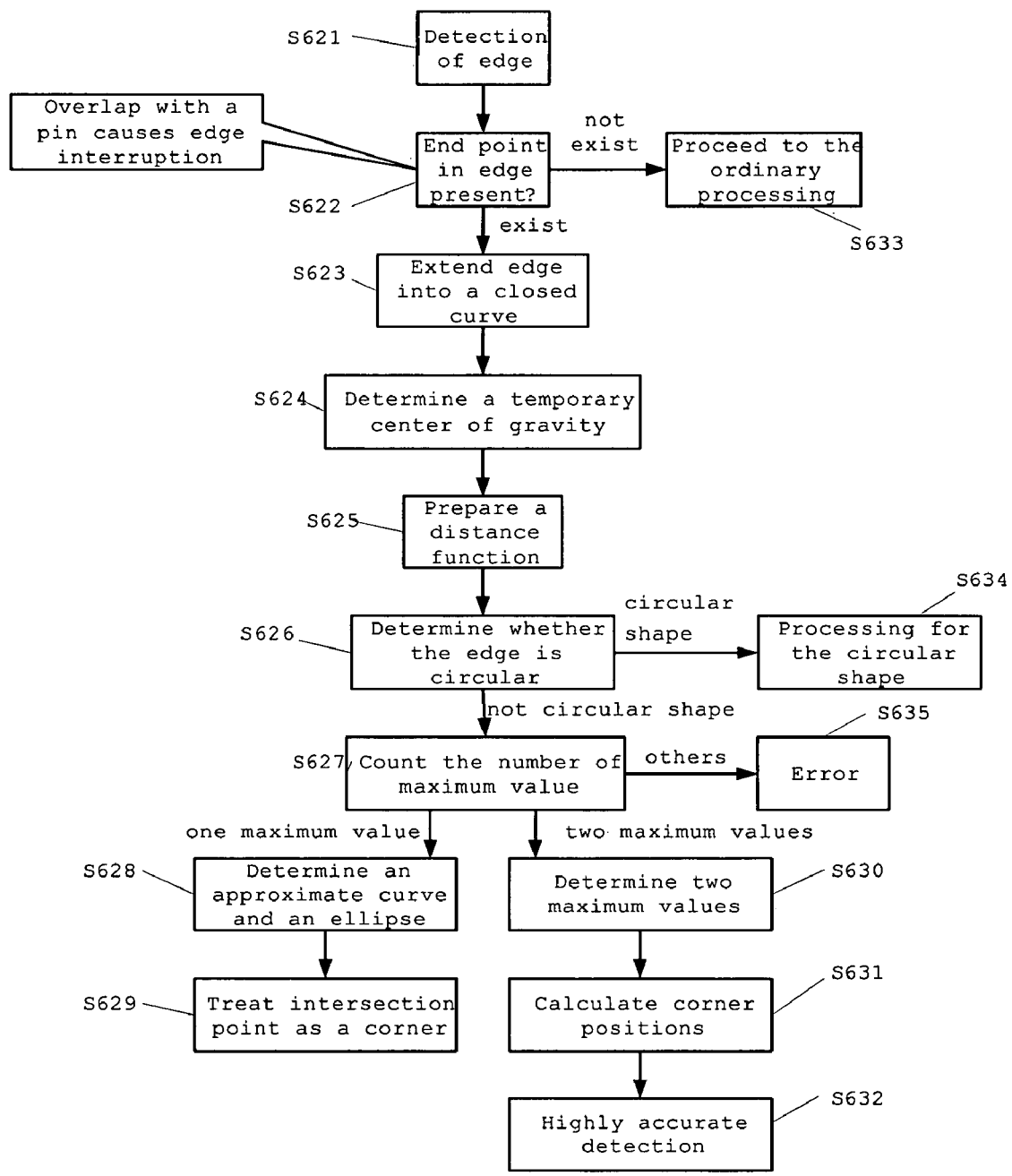

[fig44]
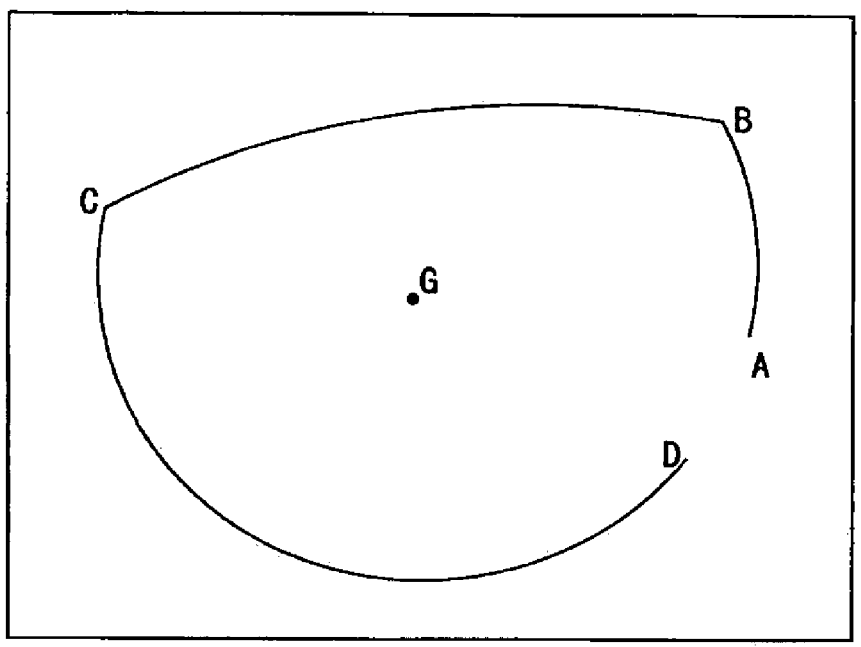

[fig45]
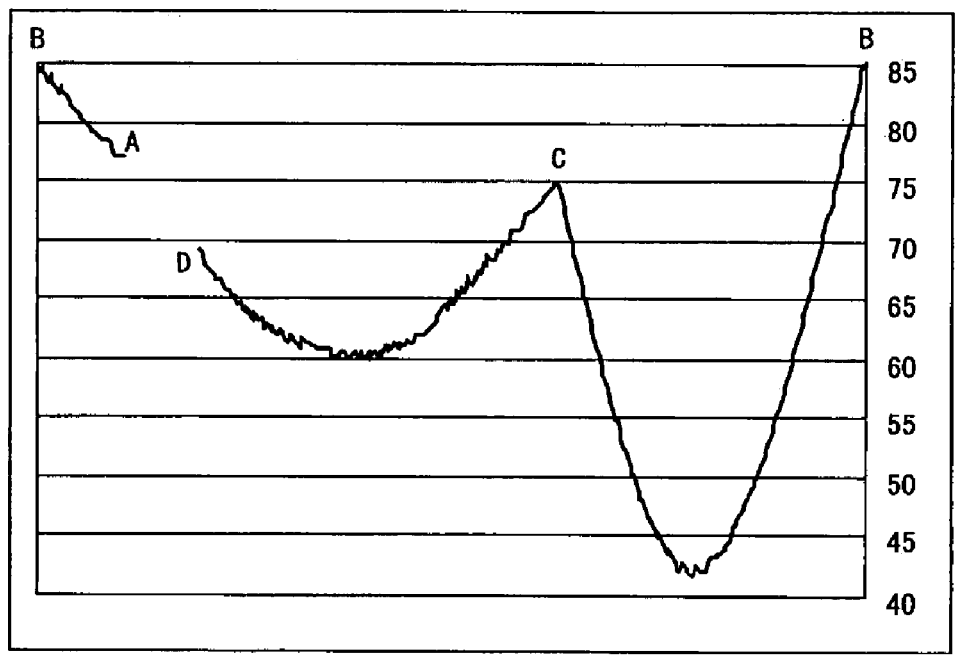

[fig46]
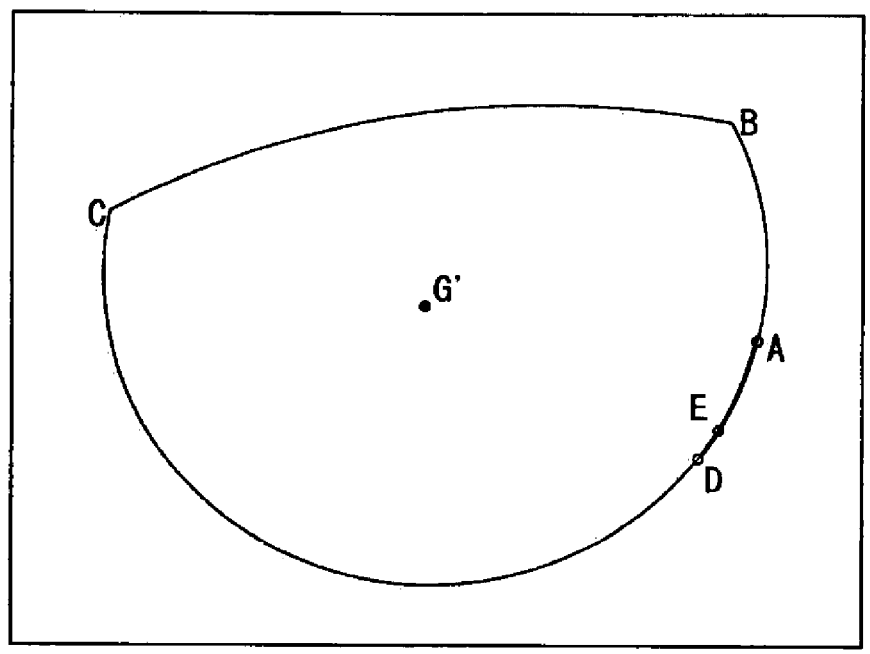

[fig47]
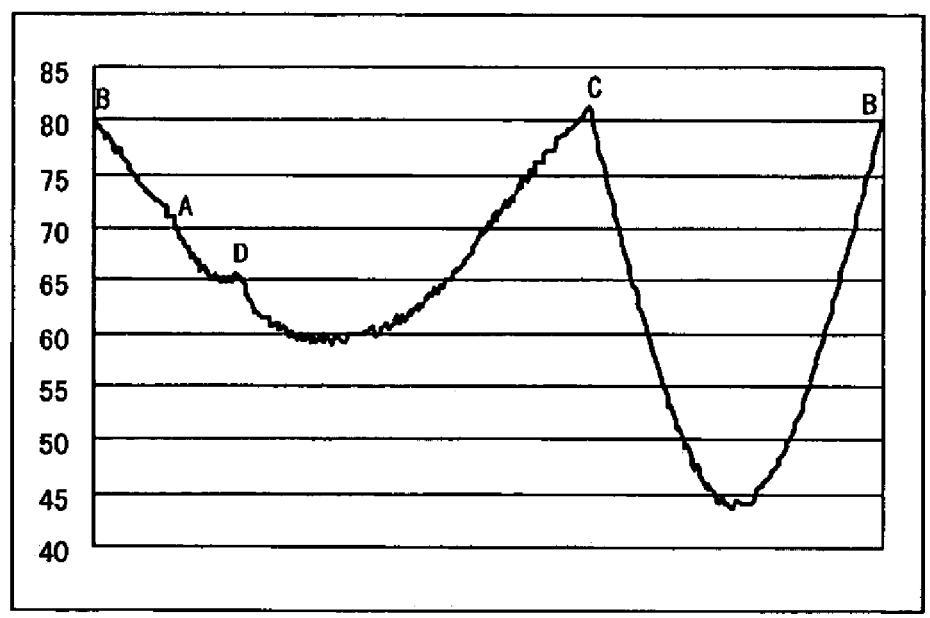

[fig48]
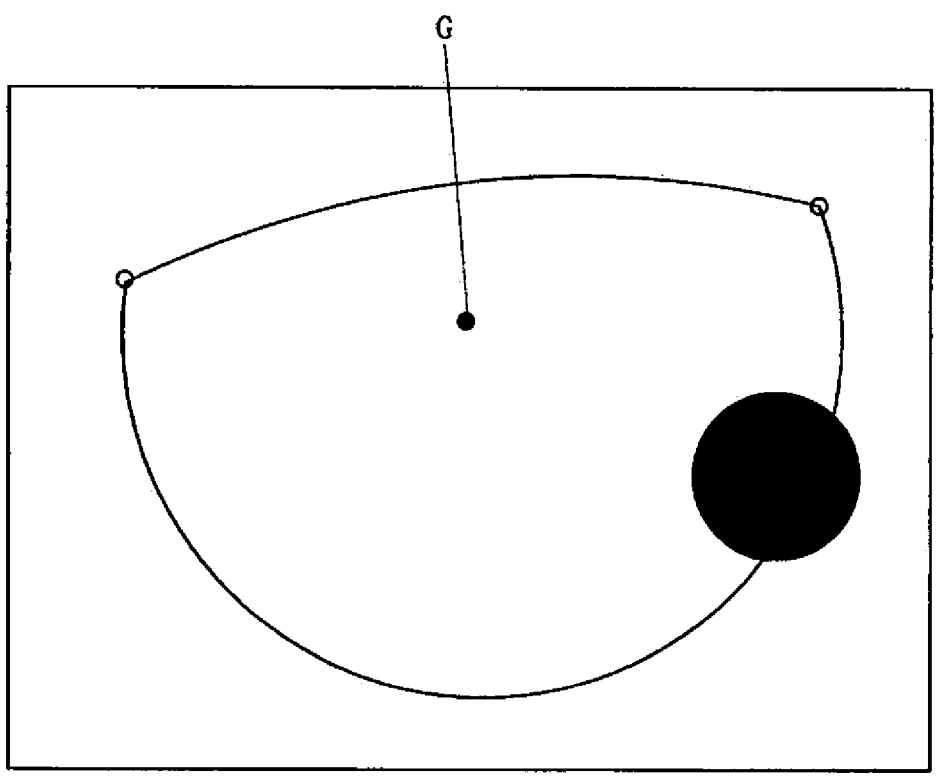

[fig49]
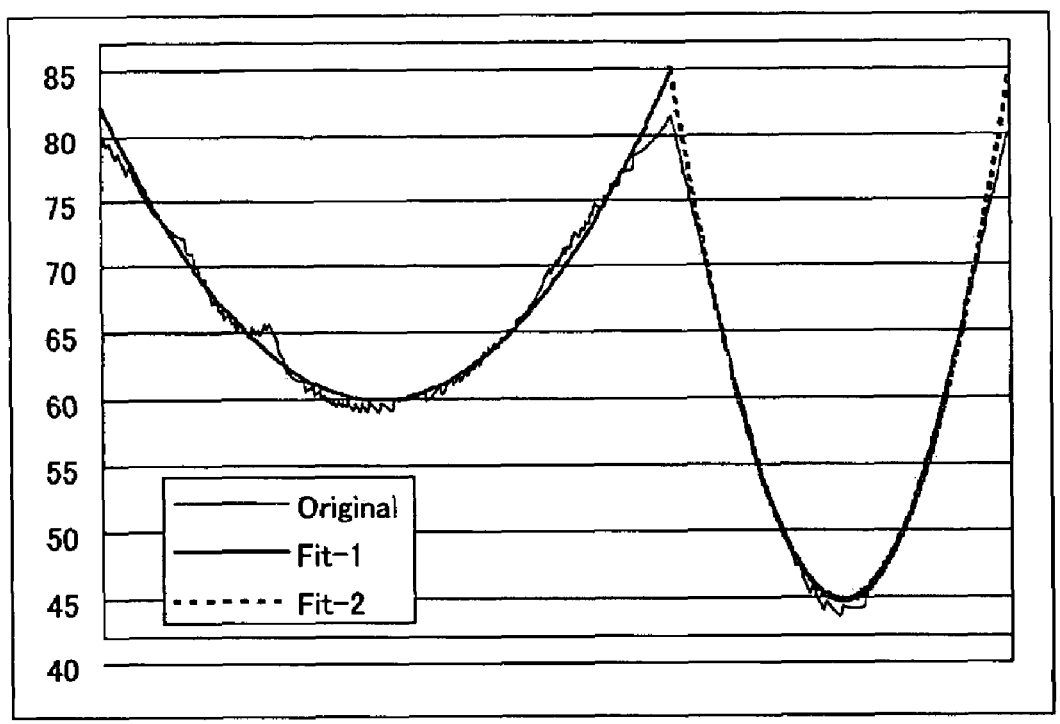

[fig50]
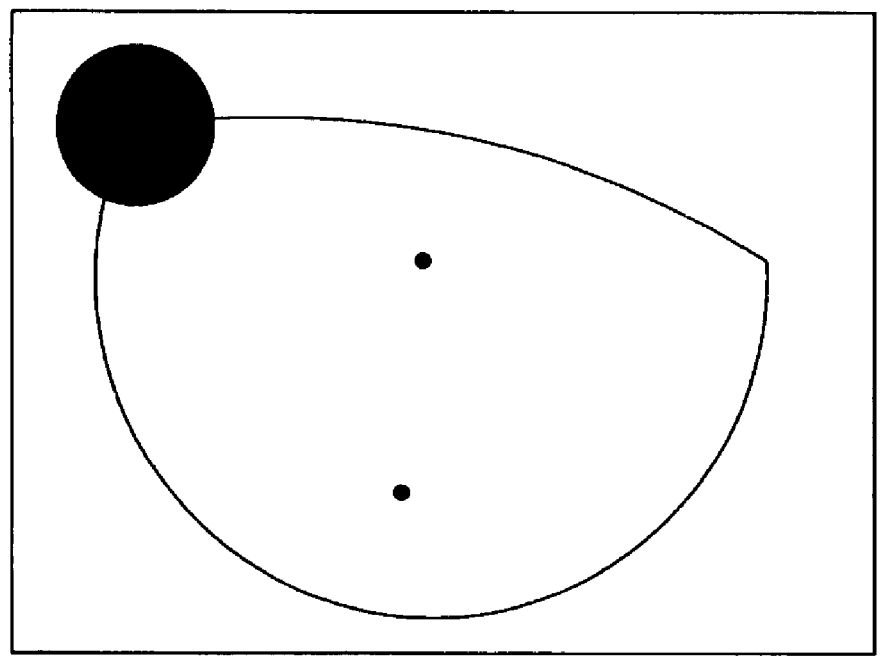

[fig51]
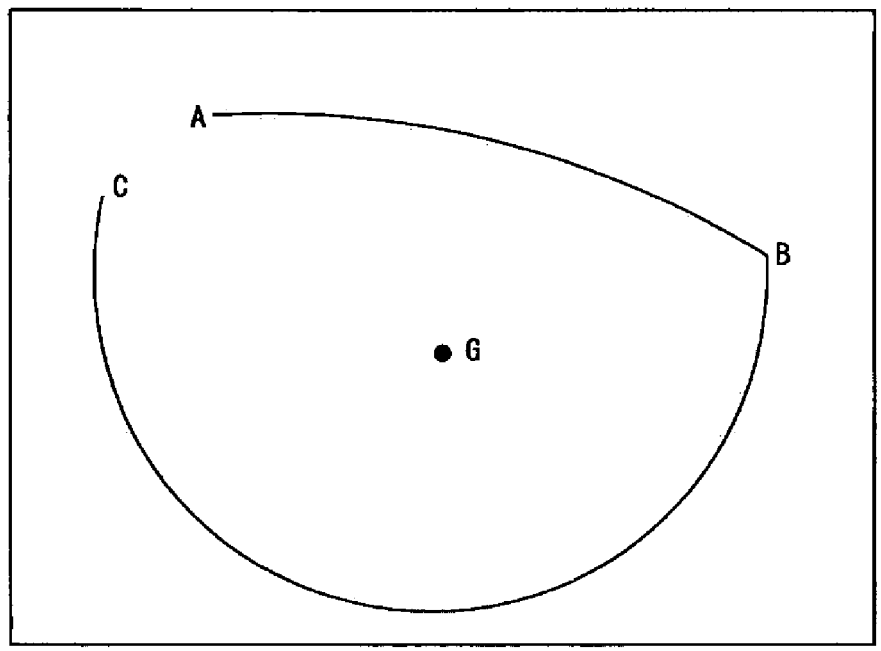

[fig52]
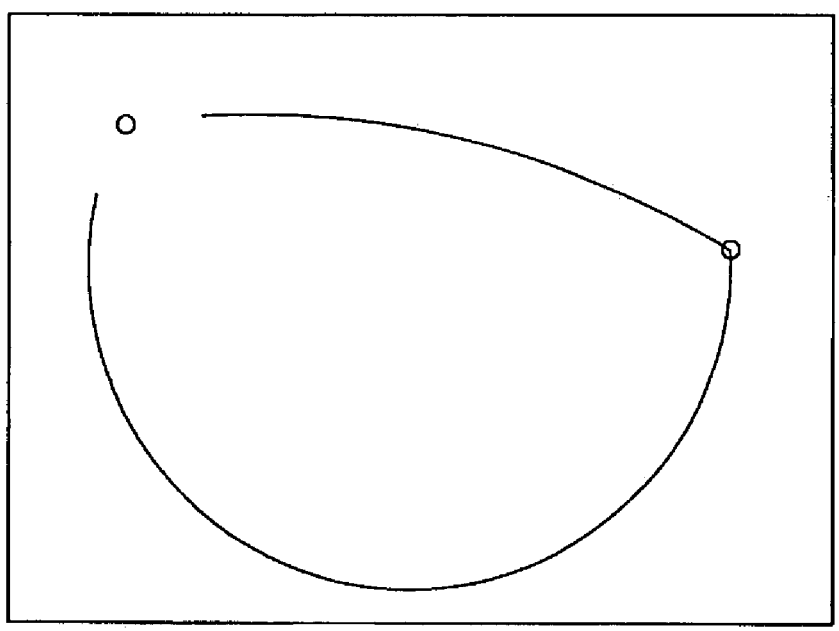

[fig53]
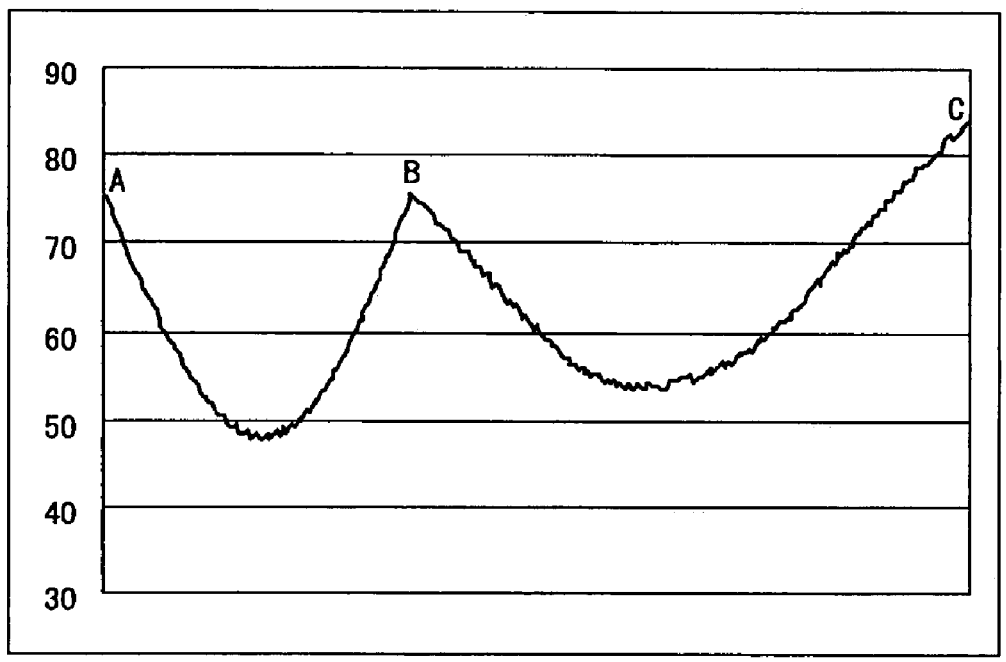

[fig54]
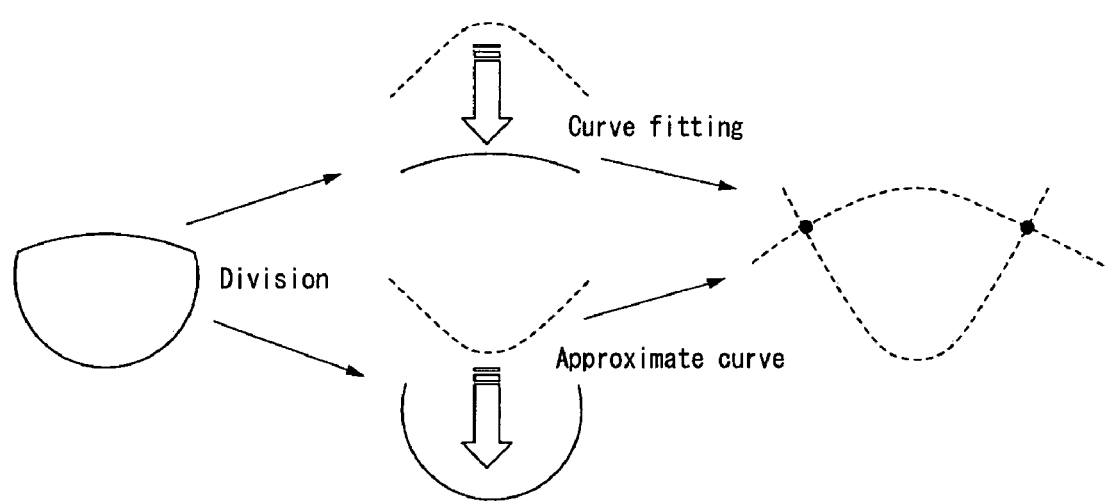

[fig55]
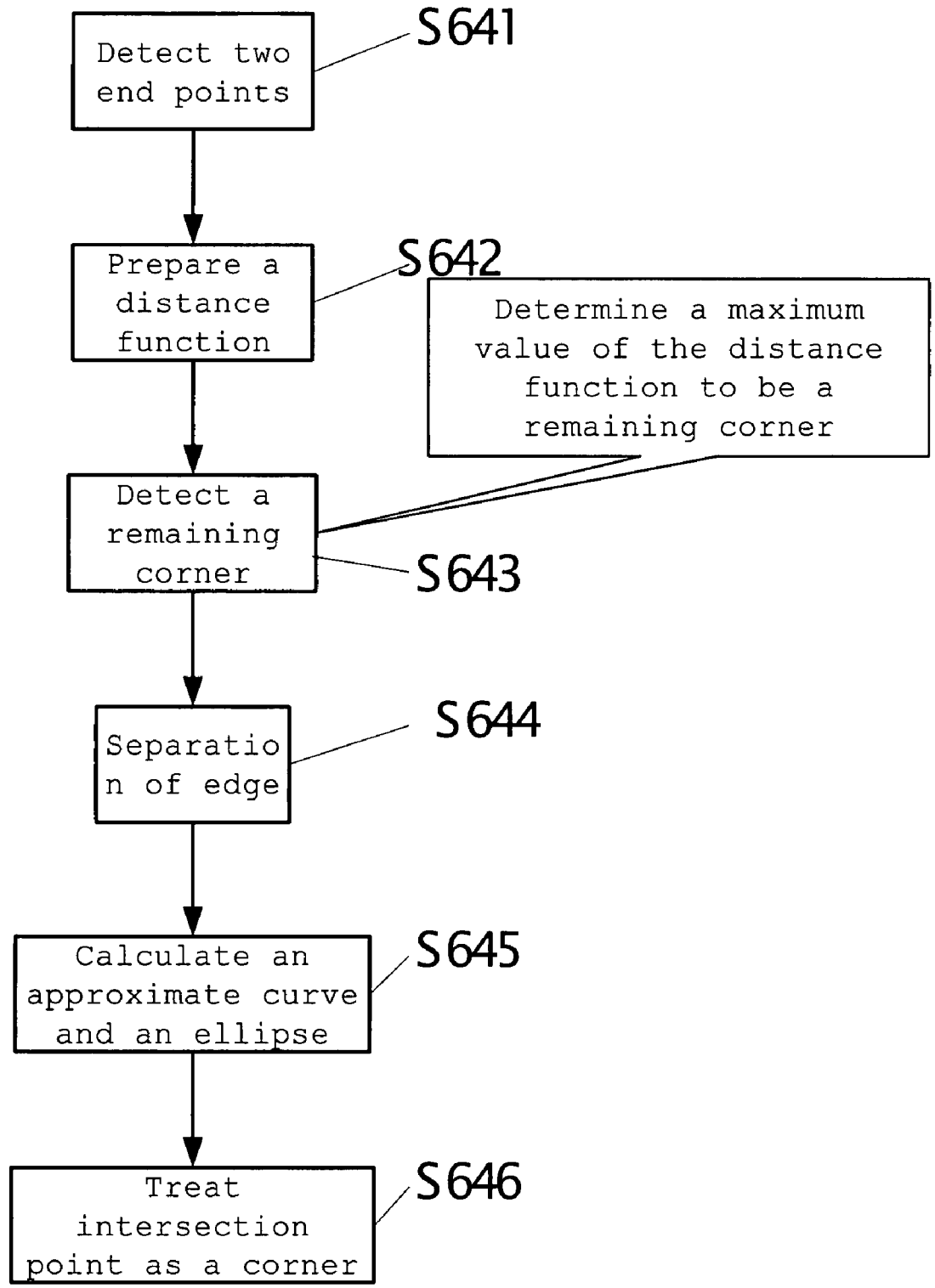

[fig56]
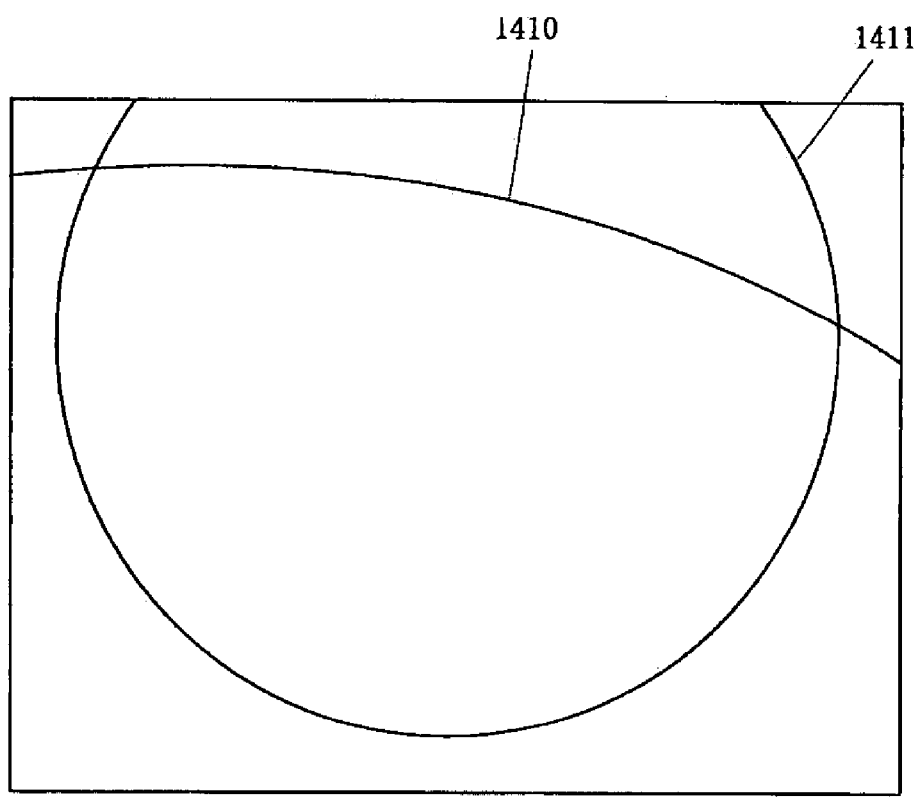

[fig57]
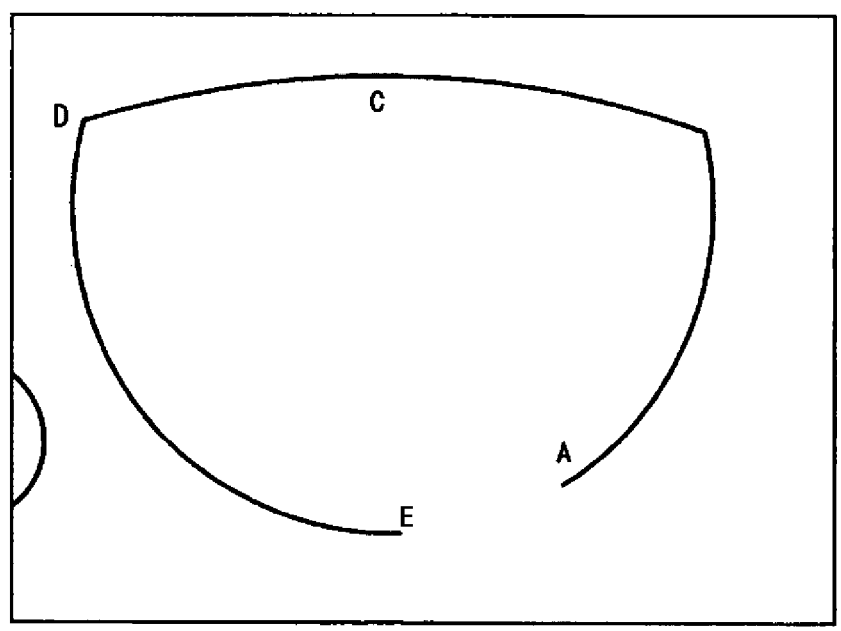

[fig58]
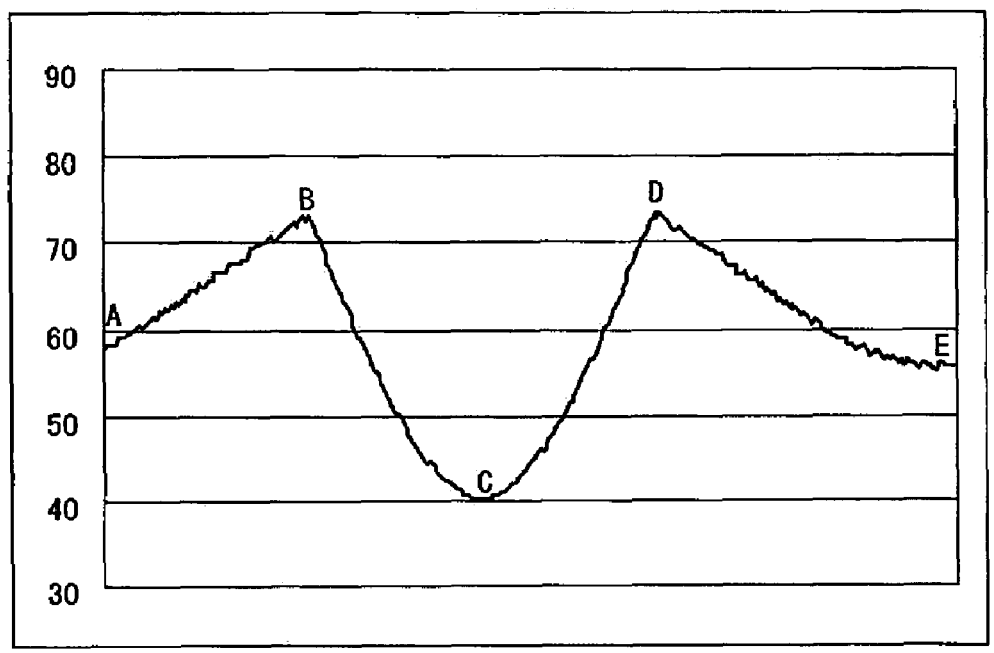

[fig59]
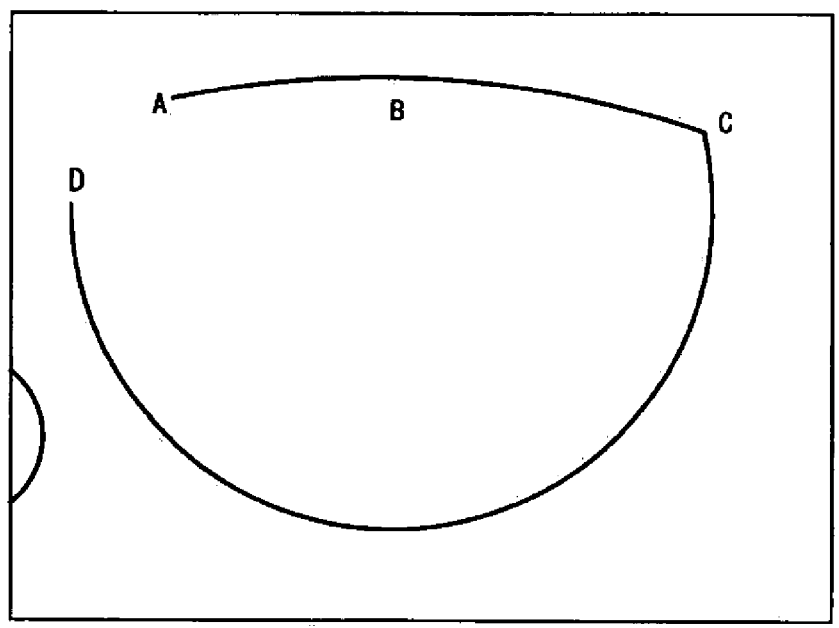

[fig60]
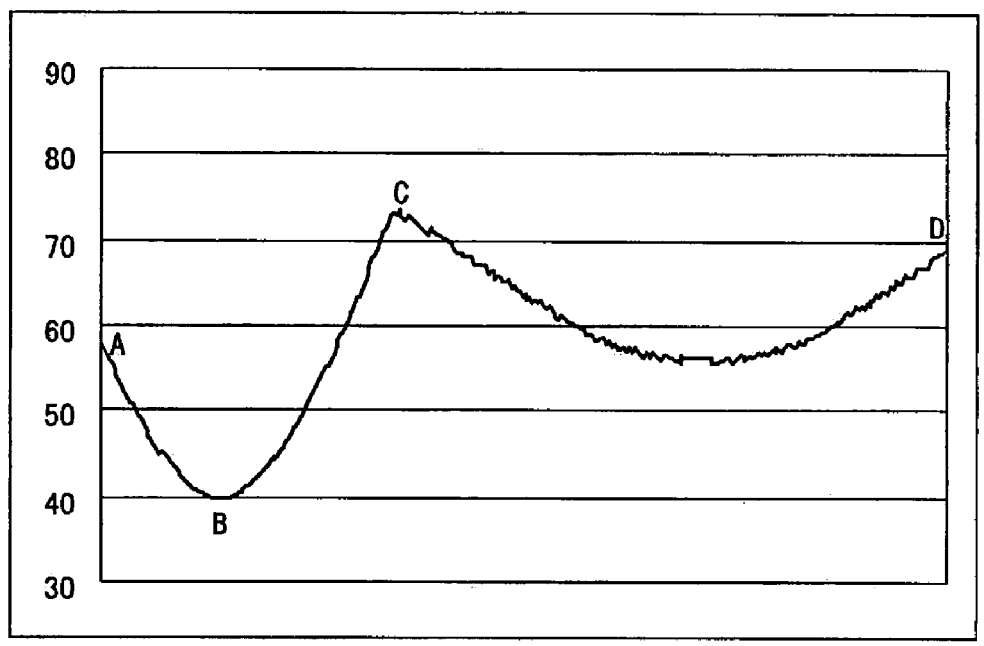

[fig61]
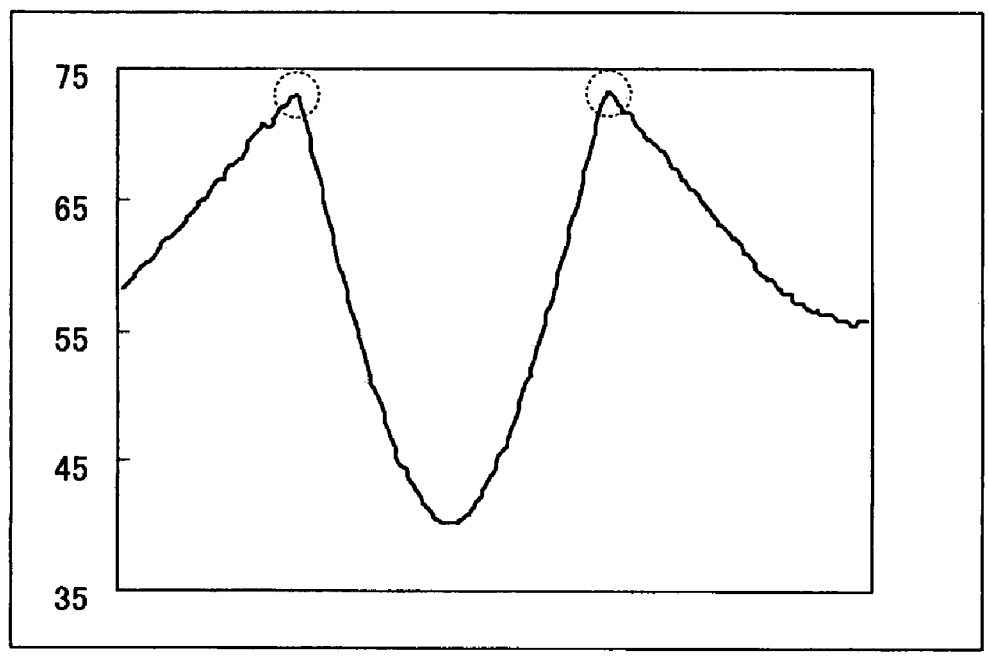

[fig62]
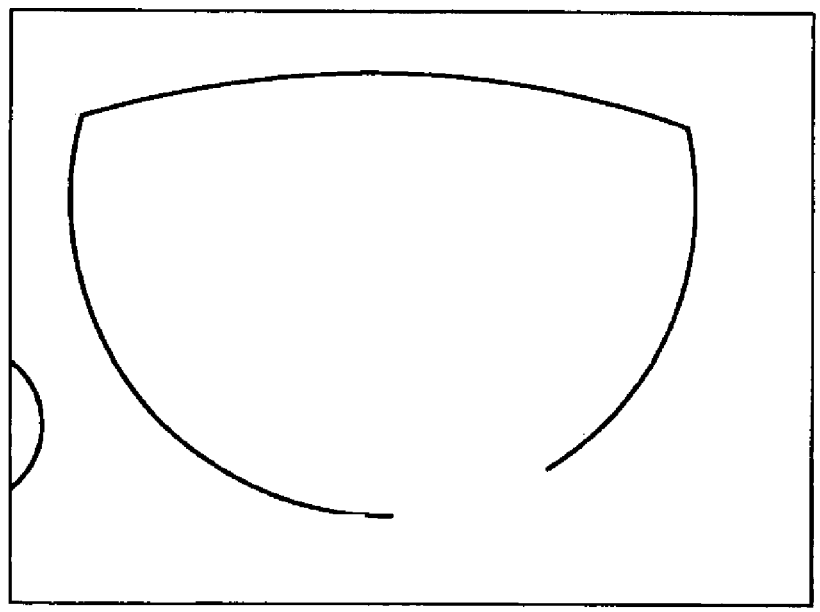

[fig63]
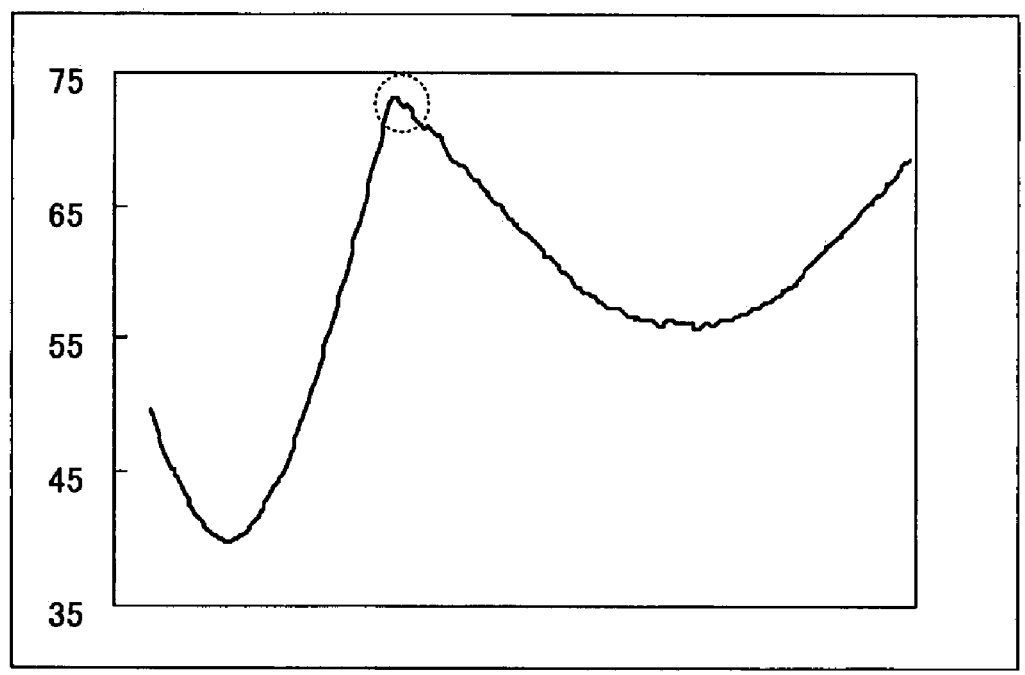

[fig64]
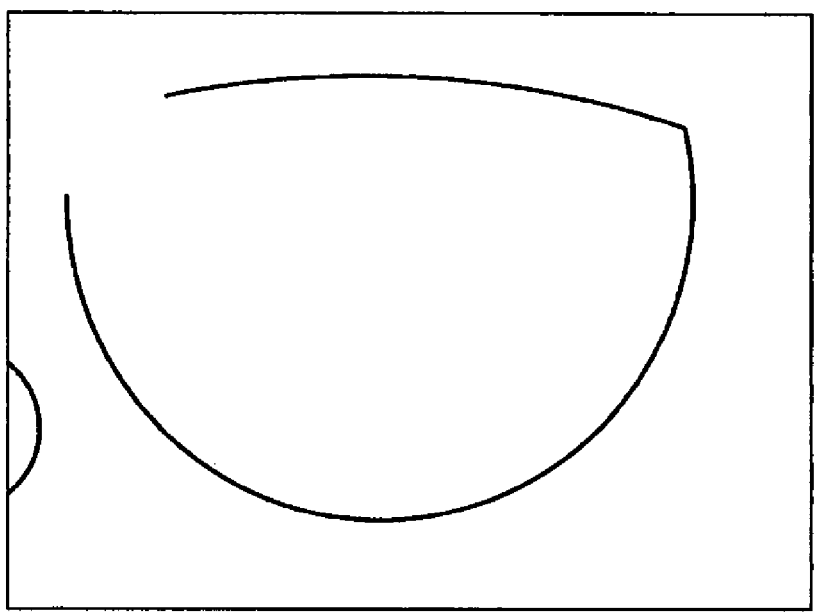

[fig65]
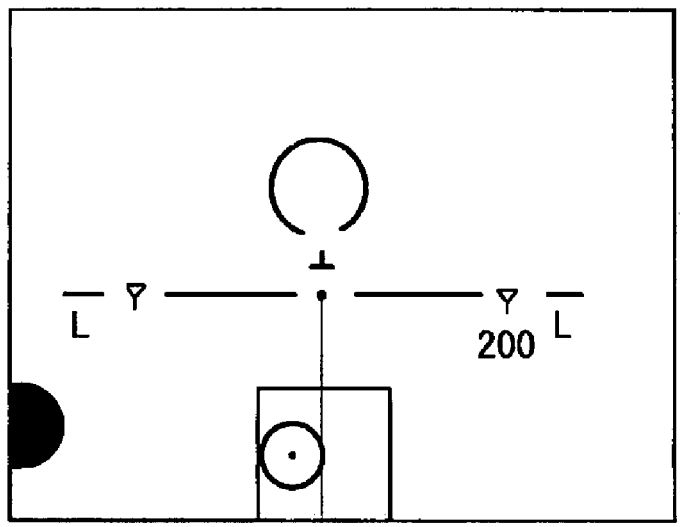

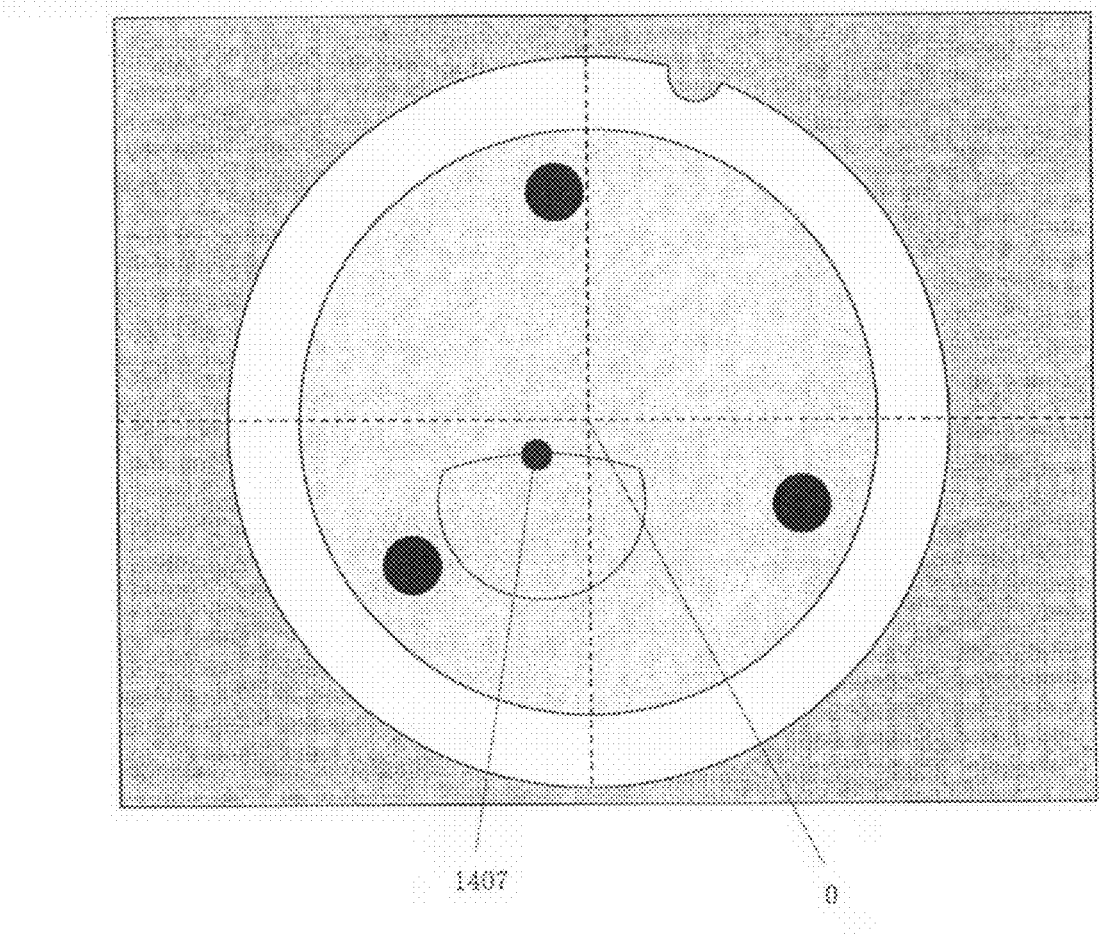
[fig66]

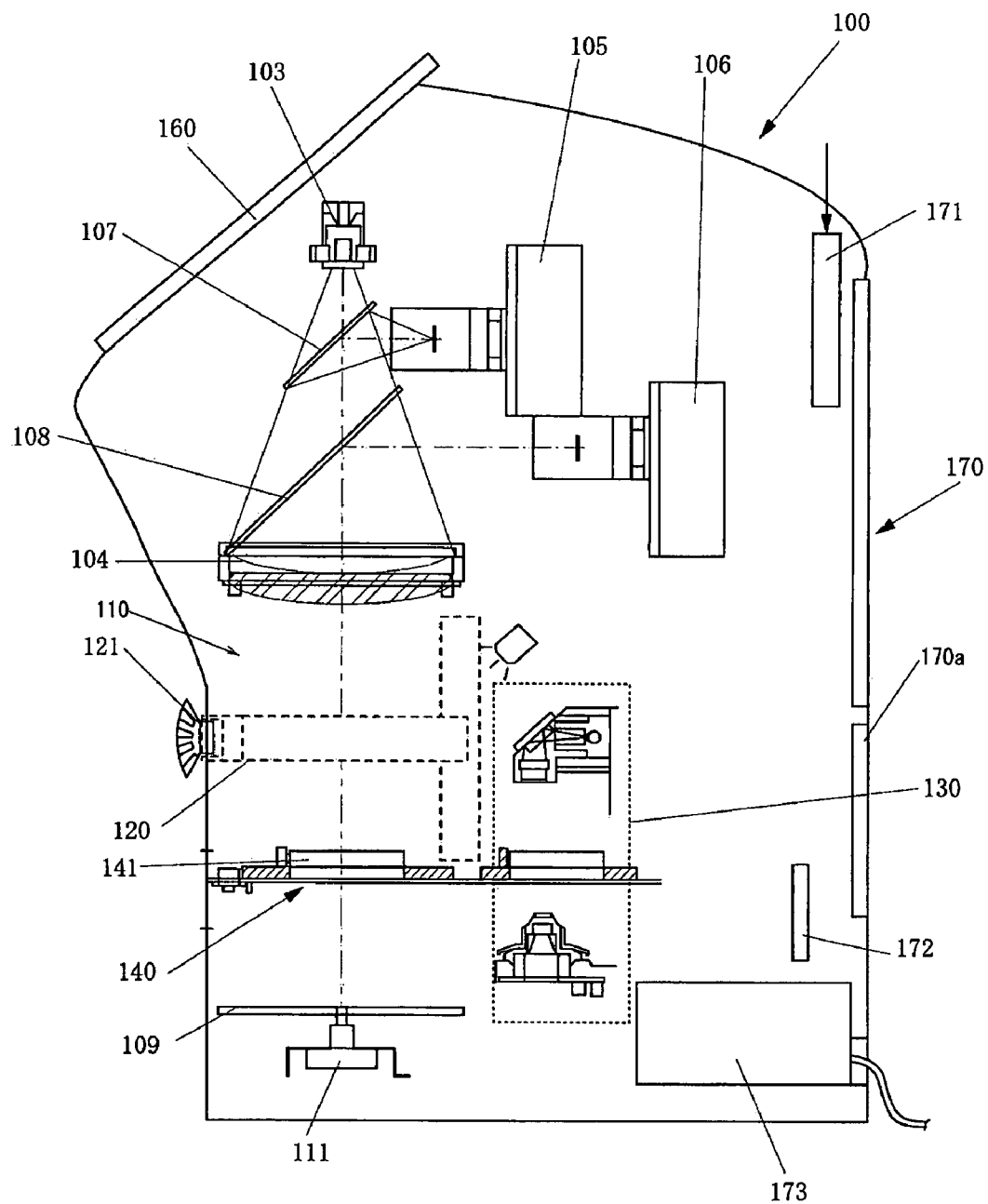
[fig67]

[fig68]
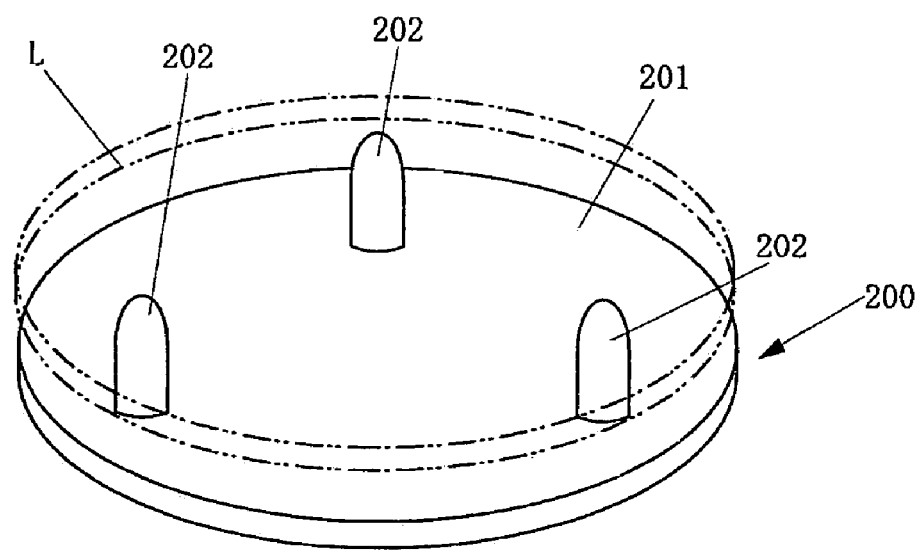

[fig69]
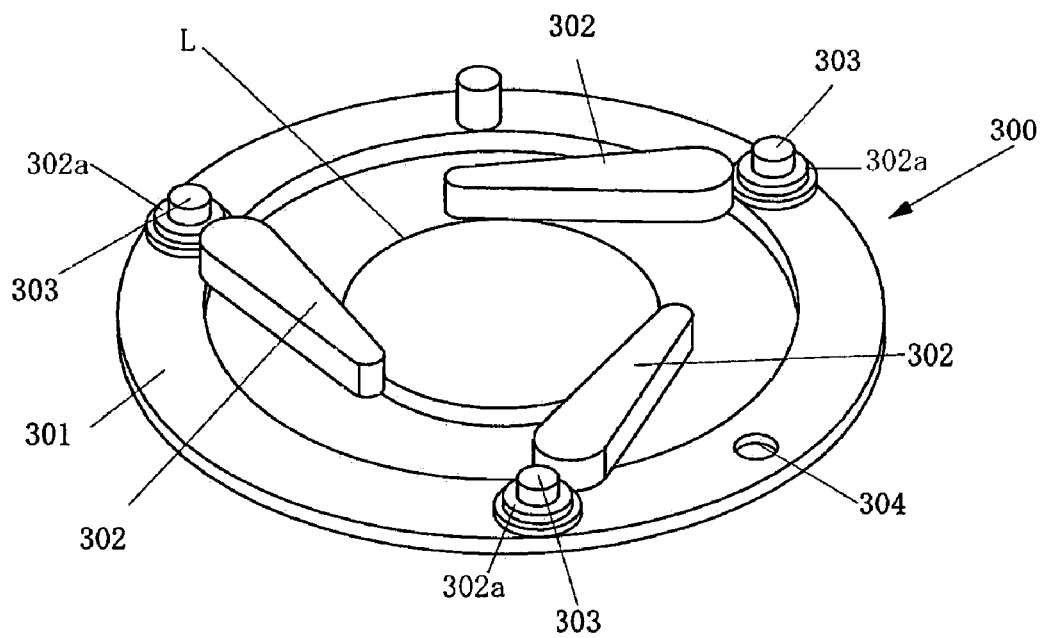

US 7,648,237 B2

DEVICE FOR INSTALLING SUCTION JIG FOR EYEGLASS LENS AND METHOD FOR DETERMINING SUCTION JIG INSTALLATION POSITION

TECHNICAL FIELD

The present invention relates to a glasses lens chucking jig mounting system and a method for determining a glasses lens chucking jig mounting position. In particular, the present invention is concerned with a glasses lens chucking jig mounting system comprising a loading table permitting plural types of holding means to be disposed within an aperture, the holding means being for holding a glasses lens at the peripheral edge or the back side of the lens; an image pickup means for picking up an image of the glasses lens placed in the aperture, a position determining * means for specifying a chucking jig mounting position on the basis of the picked-up image of the glasses lens, and a loading means for disposing a chucking jig in the glasses lens mounting position, as well as a method for determining a chucking jig mounting position.

BACKGROUND ART

Various techniques have been proposed in connection with a glasses lens chucking jig mounting method involving picking-up an image of the surface of any of various unmachined glasses lenses using an image device, subjecting the image to image processing, judging whether a figure is present or not, and loading a chucking jig such as a chucking cup automatically in accordance with the type of the glasses lens.

In connection with a raw lens having a hidden mark such as a progressive multifocal lens, or a glasses lens having a printed dot mark, or a glasses lens having a segment (small sphere) such as a bifocal lens, there is known a system in which a graphic image of a reference marker is picked up using a hidden mark, a printed mark or a segment as the reference marker, and a chucking jig such as a chucking cup is loaded to a chucking position (optical center) of a glasses lens which is geometrically related to the reference marker (Patent Documents 1 to 6). By the printed dot mark is meant a dot mark printed on a glasses lens with use of a lens meter or the like.

Also, a system is known which picks up a graphic image of a glasses lens, binarizes an image signal and detects a hidden mark or the like stamped or printed on the surface of the glasses lens or detects unevenness or damage on the lens surface (Patent Documents 1 to 3 and 5 to 7).

Patent Documents:
1. Japanese Patent Laid-Open Publication No. 2002-296144
2. Japanese Patent Laid-Open Publication No. 2000-19058
3. Japanese Utility Model Registration No. 3077054
4. DE3829488A1
5. Japanese Patent Laid-Open Publication No. 2002-139713
6. Japanese Patent Laid-Open Publication No. 2002-1638
7. EP856728A2

DISCLOSURE OF THE INVENTION

Problems to be Solved by the Invention

However, a glasses lens to which a chucking jig such as a chucking cup is to be loaded may be a glasses lens already machined for replacement of an associated glasses frame or may be a non-circular glasses lens. In the case of loading a chucking jig such as a chucking cup to a circular glasses lens L, the glasses lens L is placed on three (or four) lens holding rods 202 erected on a transparent acrylic board 201 of a lens holder 200 (shown in FIGS. 67 and 68) which is disposed within a glasses lens chucking jig mounting system. However, such operations are not applicable when loading the chucking jig to a non-circular glasses lens.

For a non-circular lens, it is necessary to use such a non-circular lens-dedicated frame replacement lens holder 300 as shown in FIG. 69. In this case, unlike the case of the aforesaid ordinary unmachined circular glasses lens, lens holding arms 302 secured pivotably to an annular board 301 through pivot shafts 303 may erroneously come into contact with the frame replacement lens holder 300. To prevent such an error, it is necessary that the operation for loading a chucking jig of a special glasses lens such as a machined glasses lens or a non-circular glasses lens be carefully performed compared with the loading operation for an ordinary unmachined, circular glasses lens.

Accordingly, it is an object of the present invention to provide a glasses lens chucking jig mounting system and a method for determining a glasses lens chucking jig mounting position. In the system and the method according to the present invention, graphic images of a glasses lens and of the vicinity of an aperture in a loading table are picked up by an optical element. Further, it is detected that a frame replacement lens holder is mounted on the loading table based on the picked-up graphic image of the vicinity of the aperture. Furthermore, the operation is shifted to a mounting operation in a frame replacement mode. This makes it possible to prevent an erroneous contact between the frame replacement lens holder and a lens holding arm.

Means for Solving the Problems

Means for solving the above-mentioned problems is described as follows. According to the present invention defined in claim 1, a glasses lens chucking jig mounting system comprises: a loading table permitting plural types of holding means to be disposed within an aperture, the holding means being for holding a glasses lens at the peripheral edge or the back side of the lens; an image pickup means for picking up an image of the glasses lens placed in the aperture; a position determining means for specifying a mounting position of a chucking jig on the basis of the picked-up image of the glasses lens; and a loading means for loading the chucking jig to the mounting position on the glasses lens. The glasses lens chucking jig mounting system further comprises: a determining means for determining the type of a holding means disposed on the loading table on the basis of an image of the inside of the aperture picked up by the image pickup means; and a position determining means for determining a loading position of the chucking jig on the glasses lens disposed in a frame replacement holder on the basis of the image of the inside of the aperture picked up by the image pickup means.

According to the present invention defined in claim 2, in the glasses lens chucking jig mounting system defined in claim 1, the determining means determines whether, on the basis of the image of the inside of the aperture picked up by the image pickup means, the holding means is a frame replacement lens holder for holding either a machined glasses lens or a non-circular glasses lens.

According to the present invention defined in claim 3, in the glasses lens chucking jig mounting system defined in claim 1 or 2, the frame replacement lens holder has a marker portion in a predetermined position, and the determining means detects the marker portion on the basis of the image picked up by the image pickup means and determines whether the holding means is the frame replacement lens holder.

According to the present invention defined in claim 4, in the glasses lens chucking jig mounting system defined in claim 1 or 3, the image pickup means picks up an enlarged image of a predetermined position and the determining means determines the marker portion from the enlarged image.

According to the present invention defined in claim 5, a method for determining a glasses lens chucking jig mounting position is provided. The glasses lens chucking jig mounting system comprises: a loading table permitting plural types of holding means to be disposed within an aperture, the holding means being for holding a glasses lens at the peripheral edge or the back side of the lens; an image pickup means for picking up an image of the glasses lens placed in the aperture; a position determining means for specifying a mounting position of a chucking jig on the basis of the picked-up image of the glasses lens; and a loading means for loading the chucking jig to the mounting position on the glasses lens. The method for determining a glasses lens chucking jig mounting position comprises the steps of: determining the type of a holding means disposed on the loading table on the basis of an image of the inside of the aperture picked up by the image pickup means; and determining a loading position of the chucking jig in the glasses lens disposed in a frame replacement holder on the basis of the image of the inside of the aperture picked up by the image pickup means.

According to the present invention defined in claim 6, in the method for determining a glasses lens chucking jig mounting position defined in claim 5, the determining step determines whether, on the basis of the image of the inside of the aperture picked up by the image pickup means, the holding means is a frame replacement lens holder for holding either a machined glasses lens or a non-circular glasses lens.

According to the present invention defined in claim 7, in the method for determining a glasses lens chucking jig mounting position defined in claim 5 or 6, the frame replacement lens holder has a marker portion in a predetermined position, and the determining means detects the marker portion on the basis of the image picked up by the image pickup means and determines whether the holding means is the frame replacement lens holder.

According to the present invention defined in claim 8, in the method for determining a glasses lens chucking jig mounting position defined in claim 5 or 7, an enlarged image of a predetermined position is acquired and the marking portion is determined from the enlarged imaged.

Effect of the Invention

According to the present invention, a graphic image of a glasses lens or of the inside of an aperture in the loading table is picked up by an image pickup means. Further, on the basis of the picked-up graphic image of the vicinity of the aperture, it is detected that the frame replacement holder has been mounted on the loading table, whereby the mounting operation in the frame replacement mode can be performed smoothly and it is possible to avoid contact between the frame replacement holder and the lens holding arms.

BRIEF DESCRIPTION OF THE DRAWINGS

FIG. 1 is a flow chart showing entire processing for a glasses lens chucking jig mounting system according to an embodiment of the present invention.

FIG. 2 is a flow chart showing processing for detecting a frame replacement lens holder in the glasses lens chucking jig mounting system according to the embodiment of the present invention.

FIG. 3 is a diagram showing the processing for detecting the frame replacement lens holder in the glasses lens chucking jig mounting system according to the embodiment of the present invention.

FIG. 4 is a flow chart showing processing for determining if a lens is present or absent in the glasses lens chucking jig mounting system according to the embodiment of the present invention.

FIG. 5 is an image obtained in the processing for determining if a lens is present or absent in the glasses lens chucking jig mounting system according to the embodiment of the present invention.

FIG. 6 is a flow chart showing the processing for determining if a lens is present or absent in the glasses lens chucking jig mounting system according to the embodiment of the present invention.

FIG. 7 is an image obtained in detecting a frame replacement lens holder in the glasses lens chucking jig mounting system according to the embodiment of the present invention.

FIG. 8 is an image obtained in detecting the frame replacement lens holder in the glasses lens chucking jig mounting system according to the embodiment of the present invention.

FIG. 9 is an image obtained in detecting the frame replacement lens holder in the glasses lens chucking jig mounting system according to the embodiment of the present invention.

FIG. 10 is an image obtained in lens detection during loading of the frame replacement lens holder in the glasses lens chucking jig mounting system according to the embodiment of the present invention.

FIG. 11 is an image obtained in lens detection during loading of the frame replacement lens holder in the glasses lens chucking jig mounting system according to the embodiment of the present invention.

FIG. 12 is an image obtained in lens detection during loading of the frame replacement lens holder in the glasses lens chucking jig mounting system according to the embodiment of the present invention.

FIG. 13 is a flow chart showing steps for determining a lens in the glasses lens chucking jig mounting system according to the embodiment of the present invention.

FIG. 14 is a flow chart showing steps for determining a bifocal lens in the glasses lens chucking jig mounting system according to the embodiment of the present invention.

FIG. 15 is an image obtained upon determination of a bifocal lens in the glasses lens chucking jig mounting system according to the embodiment of the present invention.

FIG. 16 is a diagram showing the center of gravity upon determination of the bifocal lens in the glasses lens chucking jig mounting system according to the embodiment of the present invention.

FIG. 17 is an image obtained upon determination of a progressive multifocal lens in the glasses lens chucking jig mounting system according to the embodiment of the present invention.

FIG. 18 is an image for detecting an edge obtained upon determination of the progressive multifocal lens in the glasses lens chucking jig mounting system according to the embodiment of the present invention.

FIG. 19 is an image obtained after the removal of noises upon determination of the progressive multifocal lens in the glasses lens chucking jig mounting system according to the embodiment of the present invention.

FIG. 20 is an image for determining the radius upon determination of the progressive multifocal lens in the glasses lens chucking jig mounting system according to the embodiment of the present invention.

FIG. 21 is an image for detection of a horizontal line upon determination of the progressive multifocal lens in the glasses lens chucking jig mounting system according to the embodiment of the present invention.

FIG. 22 is an enlarged image for detection of a horizontal line in the glasses lens chucking jig mounting system according to the embodiment of the present invention.

FIG. 23 is an image for hidden mark detection upon determination of the progressive multifocal lens in the glasses lens chucking jig mounting system according to the embodiment of the present invention.

FIG. 24 is an image for hidden mark detection upon determination of the progressive multifocal lens in the glasses lens chucking jig mounting system according to the embodiment of the present invention.

FIGS. 25(a) to 25(c) show enlarged images for hidden mark detection upon determination of the progressive multifocal lens in the glasses lens chucking jig mounting system according to the embodiment of the present invention.

FIGS. 26(a) and 26(b) show enlarged images for hidden mark detection and paint mark detection upon determination of the progressive multifocal lens in the glasses lens chucking jig mounting system according to the embodiment of the present invention.

FIGS. 27(a) and 27(b) show enlarged images for detection of the center of gravity of a hidden mark and that of a paint mark upon determination of the progressive multifocal lens in the glasses lens chucking jig mounting system according to the embodiment of the present invention.

FIG. 28 is a template for hidden mark detection upon determination of the progressive multifocal lens in the glasses lens chucking jig mounting system according to the embodiment of the present invention.

FIG. 29 is an enlarged image for detection of the center of a hidden lens upon determination of the progressive multifocual lens in the glasses lens chucking jig mounting system according to the embodiment of the present invention.

FIG. 30 is a flow chart showing processing for detecting a segment in the bifocal lens in the glasses lens chucking jig mounting system according to the embodiment of the present invention.

FIG. 31 is an image for detection of a segment of the bifocal lens in the glasses lens chucking jig mounting system according to the embodiment of the present invention.

FIG. 32 is an image for detection of a segment of the bifocal lens in the glasses lens chucking jig mounting system according to the embodiment of the present invention.

FIG. 33 is an image for detection of a segment of bifocal lens in the glasses lens chucking jig mounting system according to the embodiment of the present invention.

FIG. 34 is an image explaining a distance function for detection of a segment of the bifocal lens in the glasses lens chucking jig mounting system according to the embodiment of the present invention.

FIG. 35 is a flow chart showing processing for detecting a segment of the bifocal lens in the glasses lens chucking jig mounting system according to the embodiment of the present invention.

FIG. 36 is an image for detection of a segment corner of the bifocal lens in the glasses lens chucking jig mounting system according to the embodiment of the present invention.

FIG. 37 is an image for detection of a segment corner of the bifocal lens in the glasses lens chucking jig mounting system according to the embodiment of the present invention.

FIG. 38 is a graph of a distance function for detection of a segment corner of the bifocal lens in the glasses lens chucking jig mounting system according to the embodiment of the present invention.

FIG. 39 is an image for detection of a segment of the bifocal lens in the glasses lens chucking jig mounting system according to the embodiment of the present invention.

FIG. 40 is a graph of a distance function for detection of a segment of the bifocal lens in the glasses lens chucking jig mounting system according to the embodiment of the present invention.

FIG. 41 is a perspective view showing a state where the bifocal lens is placed on the glasses lens chucking jig mounting system according to the embodiment of the present invention.

FIG. 42 is an image for detection of a segment corner of the bifocal lens in the glasses lens chucking jig mounting system according to the embodiment of the present invention.

FIG. 43 is a flow chart showing the whole processing for detecting a segment corner of the bifocal lens in the glasses lens chucking jig mounting system according to the embodiment of the present invention.

FIG. 44 is an image for detection of a segment corner of the bifocal lens in the glasses lens chucking jig mounting system according to the embodiment of the present invention.

FIG. 45 is a graph of a distance function for detection of a segment corner of the bifocal lens in the glasses lens chucking jig mounting system according to the embodiment of the present invention.

FIG. 46 is an image for detection of a segment corner of the bifocal lens in the glasses lens chucking jig mounting system according to the embodiment of the present invention.

FIG. 47 is a graph of a distance function for detection of a segment corner of the bifocal lens in the glasses lens chucking jig mounting system according to the embodiment of the present invention.

FIG. 48 is an image for detection of a segment corner of the bifocal lens in the glasses lens chucking jig mounting system according to the embodiment of the present invention.

FIG. 49 is a graph of a distance function for detection of a segment corner of the bifocal lens in the glasses lens chucking jig mounting system according to the embodiment of the present invention.

FIG. 50 is an image for detection of a segment corner of the bifocal lens in the glasses lens chucking jig mounting system according to the embodiment of the present invention.

FIG. 51 is an image for detection of a segment corner of the bifocal lens in the glasses lens chucking jig mounting system according to the embodiment of the present invention.

FIG. 52 is an image showing the result of detection of a segment corner of the bifocal lens in the glasses lens chucking jig mounting system according to the embodiment of the present invention.

FIG. 53 is a graph of a distance function for detection of a segment corner of the bifocal lens in the glasses lens chucking jig mounting system according to the embodiment of the present invention.

FIG. 54 is a graph showing curve fitting for detection of a segment corner of the bifocal lens in the glasses lens chucking jig mounting system according to the embodiment of the present invention.

FIG. 55 is a flow chart showing the processing for detecting a segment corner of the bifocal lens in the glasses lens chucking jig mounting system according to the embodiment of the present invention.

FIG. 56 is a diagram showing curve fitting for detection of a segment corner of the bifocal lens in the glasses lens chucking jig mounting system according to the embodiment of the present invention.

FIG. 57 is an image for detection of a segment corner of the bifocal lens in the glasses lens chucking jig mounting system according to the embodiment of the present invention.

FIG. 58 is a graph of a distance function for detection of a segment corner of the bifocal lens in the glasses lens chucking jig mounting system according to the embodiment of the present invention.

FIG. 59 is an image for detection of a segment corner of the bifocal lens in the glasses lens chucking jig mounting system according to the embodiment of the present invention.

FIG. 60 is a graph of a distance function for detection of a segment corner of the bifocal lens in the glasses lens chucking jig mounting system according to the embodiment of the present invention.

FIG. 61 is a graph of a distance function, showing the result of detection of a segment corner of the bifocal lens in the glasses lens chucking jig mounting system according to the embodiment of the present invention.

FIG. 62 is an image for detection of a segment corner of the bifocal lens in the glasses lens chucking jig mounting system according to the embodiment of the present invention.

FIG. 63 is an image showing the result of detection of a segment corner of the bifocal lens in the glasses lens chucking jig mounting system according to the embodiment of the present invention.

FIG. 64 is an image for detection of a segment corner of the bifocal lens in the glasses lens chucking jig mounting system according to the embodiment of the present invention.

FIG. 65 is an image for determining the right and left of the progressive multifocal lens in the glasses lens chucking jig mounting system according to the embodiment of the present invention.

FIG. 66 is an image for determining the right and left of the bifocal lens in the glasses lens chucking jig mounting system according to the embodiment of the present invention.

FIG. 67 is a diagram showing a schematic construction of the glasses lens chucking jig mounting system according to the embodiment of the present invention.

FIG. 68 is a perspective view showing a lens loading unit in the glasses lens chucking jig mounting system according to the embodiment of the present invention.

FIG. 69 is a perspective view showing a frame replacement lens holder in the glasses lens chucking jig mounting system according to the embodiment of the present invention.

DESCRIPTION OF NUMERALS 105, 106 . . . CCD camera (image pickup means)
120 . . . Chucking jig conveyance unit (a part of loading means)
121 . . . Chucking jig
140 . . . Lens loading unit (loading table)
141 . . . Aperture
150 . . . X-Y stage (a part of loading means, a part of loading position determining means)
170 . . . Arithmetic and control circuit (mark detecting means, a part of loading position determining means)
200 . . . Lens holder (loading table)
1503 . . . Shadow indicating a hidden mark
1505 . . . Shadow (fitting mark) indicating an eye point
L . . . Glasses lens
F1 . . . Function key (switching means)

BEST MODE FOR CARRYING OUT THE INVENTION

An embodiment of a glasses lens chucking jig mounting system and a method for determining a glasses lens chucking jig mounting position according to the present invention will be described in the order of the following items with reference to the drawings.

A. Constructions of each portion of the system
B. Processing of graphic images of glasses lens A. Construction of each Portion of the System FIG. 67 is a diagram depicting a schematic construction of a glasses lens chucking jig mounting system 100 according to the present invention. In this embodiment, the glasses lens chucking jig mounting system 100 includes an entire optical system 110, a chucking jig conveyance unit 120, a lens meter optical system (CL optical system) 130, a lens loading unit 140, an X-Y stage 150 for moving the lens loading unit 140 from front to back and from side to side, a liquid crystal display portion 160, and an arithmetic and control circuit (arithmetic and control means) 170 and ROM 170a as image processing means having an image processing function.

The ROM 170a stores image processing programs and programs for controlling the entire optical system 110, chucking jig conveyance unit 120, lens meter optical system 130, lens loading unit 140, X-Y stage 150, liquid crystal display portion 160 and the like. In accordance with the programs stored in the ROM 170a, the arithmetic and control circuit 170 is adapted to execute the image processing programs and control the entire optical system 110, chucking jig conveyance unit 120, lens meter optical system 130, lens loading unit 140, X-Y stage 150, liquid crystal display portion 160 and the like.

In the arithmetic and control circuit 170, a CPU reads out and executes the image processing programs stored in the ROM 170a and thereby to realize image processing. The glasses lens chucking jig mounting system 100 provides a CF card input/output unit 171, an external connection interface unit 172 and a power supply unit 173 therein.

[Entire Optical System]

The entire optical system 110 includes a light emitting diode 103 (e.g., light with a wavelength of 860 nm), a collimator lens 104, two CCD cameras 105 and 106, two half mirrors 107 and 108 and a reflector plate 109. The light emitting diode 103 is used as an optical system for picking up graphic images of a glasses lens L and the inside of an aperture. The collimator lens 104 collimates divergent light emitted from the light emitting diode 103 and converges reflected light. The two CCD cameras 105 and 106 are used as image pickup devices. The two half mirrors 107 and 108 conducting reflected light to the image pickup devices. The reflector plate 109 is constituted by a retroreflection sheet which is rotated by a motor 111. In this embodiment, it should be noted that the CCD camera 105 picks up an image of the entire lens and the CCD camera 106 as an image pickup device picks up an image of a part of the lens on a larger scale (e.g., with a magnification of 2×). The reflector plate 109 is inclined, for example, 3° or so relative to a plane perpendicular to the shaft of the motor 111 in order to irradiate the lens uniformly.

In the illustrated optical system, light emitted from the light emitting diode 103 is collimated through the collimator lens 104, and reflected light from the reflector plate 109 is captured by the CCD cameras through the collimator lens 104 and half mirrors 107, 108, whereby graphic images of the glasses lens are picked up. In the case of an unmachined circular glasses lens or an already machined glasses lens, there are found a printed dot mark added by a lens meter, a stamped hidden mark or a printed mark. In the case of a bifocal lens, a semicircular segment (BF lens) is found. Therefore, the optical system is disposed so as to pick up an image of the vicinity of the glasses lens surface.

[Lens Loading Section]

An aperture 141 is formed at the center of the loading stage and a lens holder 200 is provided in the aperture 141 and includes an acrylic board 201 and three lens holding rods 202 on the acrylic board 201 which hold the glasses lens, as shown in FIG. 68.

In the aperture 141, as shown in FIGS. 17 and 67, three pins (two pins in FIG. 67 for the reason relating to the section) 142 are provided which are adapted to pivot in interlock with one another, thereby grippingly hold a side face of the glasses lens L or a frame replacement lens holder 300 shown in FIG. 69. The pins 142 are pivoted by a single belt for interlocked and simultaneous rotation.

Since the three pins (holding pins) not shown correspond to the reference numeral 1302 in FIG. 17, their reference numerals for explanation are attached correspondingly to the portions indicated at 1302 for the convenience of illustration.

Further, a ring-like flat plate covers the three holding members located close to the aperture and a pawl is formed in part of the flat plate. The pawl crosses an optical switch portion and shuts off light, thereby calibrating the origin of the system.

[Frame Replacement Lens Holder]

In the case of an unmachined circular glasses lens, it suffices to place the lens on the holder over the transparent plate. To place such a lens as a machined glasses lens or a non-circular glasses lens onto the holder, however, a frame replacement holder 300 is used. The reason is that, when the glasses wearer wants to replace the glasses frame, a chucking jig 180 is attached to an already machined glasses lens in order to fit the machined glasses lens into a new glasses frame.

As shown in FIG. 69, the frame replacement lens holder 300 is provided with lens holding arms 302 whose base end portions are pivotably secured to an annular board 301 through shafts 303. With coiled springs 302a, free end portions of the lens holding arms 302 are biased pivotally toward the center of the annular board 301.

A light transmitting hole 304 for detection of the frame replacement lens holder 300 is formed in the annular board 301. The frame replacement lens holder 300 is attached to the aperture 141 as a substitute for the lens holder 200 attached to the aperture of the lens loading table.

[X-Y Stage]

The X-Y stage 150 causes the lens loading unit 140 to move in X direction (advanced/retracted direction) and Y direction (lateral direction), thereby causing the glasses lens L to move to a lens take-out position, an image pickup position, a mounting position of a chucking jig 121, or a lens meter optical system measurement position. In the image pickup position, the position of the glasses lens L picked up by the CCD cameras 105 and 106 is shifted in X and Y directions to change the image pickup position.

[Chucking Jig Conveyance Unit]

The chucking jig conveyance unit 120 is constituted by a chucking cup conveyance unit comprising a cylindrical grooved portion and a driving motor. Like the entire optical system, the chucking cup conveyance unit is fixed to the flat plate. A conveyance arm provided with a cup receptacle portion for receiving a chucking cup is attached to the cylindrical portion of the chucking cup conveyance unit. The cup receptacle portion is provided at a lower end of the conveyance arm. With operation of the driving motor, the conveyance arm moves down so that a chucking surface of the chucking cup secured to the cup receptacle portion faces down. The conveyance arm pivots just above the surface of the glasses lens placed on the loading state (loading table). The cylindrical portion, the arm portion, the cup receptacle portion and the driving motor constitute a chucking mechanism of the chucking cup.

The structure of the cup receptacle portion is as illustrated in the drawings. Conventionally, a base portion of the chucking cup is grippingly held only by wire springs incorporated in upper and lower positions within the cup receptacle portion. Therefore, for example, in the case of loading the chucking jig to a waterproofed glasses lens, it is difficult that the chucking cup is disengaged from the cup receptacle portion, and a problem has arisen in that the glasses lens is lifted through the chucking cup. To avoid this inconvenience, an engaging plate portion for engagement with a pin projecting from a moving portion of the cup receptacle portion to an outer side face thereof is provided on the outer side face of the cup receptacle portion. When the lens conveyance arm moves down so that the glasses lens surface to be chucked by the chucking cup, the pin becomes disengaged from the engaging plate portion through a pushing force to the cup receptacle portion. According to this construction, the glasses lens remains chucked by the chucking cup.

After the chucking, the moving portion of the cup receptacle portion moves to release the light blocking state of the optical switch disposed at a rear end of the moving portion. Passing of light in the optical switch causes the switch to be turned OFF and an arithmetic processing circuit formed in the system determines whether the chucking operation is terminated. Then, the conveyance arm returns to an upper rest position and the lens loading table returns to its initial position (in the state where the lens loading table is outside the system aperture).

[Lens Meter Optical System]

The lens meter optical system 130 is a system for optically detecting characteristics of a glasses lens and is used for a glasses lens that cannot detect a graphic image such as an unmachined circular lens without a printed dot, a hidden mark, printed mark, or BF lens (segment). In the case of such a glasses lens, since it is impossible to specify a chucking position of the chucking jig, the lens loading table is moved in Y axis direction up to the position of the CL optical system. As illustrated in the drawings, the CL optical system is provided with a light emitting portion on the upper side and a light receiving portion on the lower side, each faces with each other vertically. An optical system is disposed at a rear end of the light emitting portion.

[Operation]

B. Processing of Graphic Images of Glasses Lens (i) Outline of Glasses Lens Image Processing Next, a description will be given about processing of graphic images of a glasses lens executed by the arithmetic and control circuit 170 in the glasses lens chucking jig mounting system 100 shown in FIG. 67. FIG. 1 is a flow chart showing entire image processing executed in the glasses lens chucking jig mounting system according to the embodiment of the present invention.

In this embodiment, the arithmetic and control circuit 170 acquires an entire image in the entire optical system 110 (S1) and determines whether the frame replacement lens holder 300 for loading a non-circular lens is present or not (S2). Next, the arithmetic and control circuit 170 determines whether a glasses lens L is present or not (S3) and further determines the type of the lens (S4).

In the case where the lens is a progressing multifocal lens, the arithmetic and control circuit 170 executes processing for the progressive multifocal lens such as leveling of the lens in step S5, acquisition of an enlarged image in step S9 and detection of a hidden mark (chucking point and inclination) in step S10.

In the case where the lens is a lens (bifocal lens) with a segment (small sphere), the arithmetic and control circuit 170 executes processing for the lens with a segment (small sphere) such as segment detection (chucking point and inclination) (S6) and leveling of the lens (S6a).

In the case where the lens is a lens with a printed dot, the arithmetic and control circuit 170 executes processing for the lens with a printed dot such as printed dot detection (chucking point and inclination) (S7) and leveling of the lens (S6a).

Further, in the case where the lens is a lens without a mark, the arithmetic and control circuit 170 controls the operation of the X-Y stage 150, causing the glasses lens L to move to a measurement portion of the lens meter optical system 130, and executes processing for a lens without a mark such as chucking point detection (S8).

After the end of the processing, the glasses lens L is moved to a mounting position (block stand-by position) of the chucking jig 121 (S11) and it is determined whether it is possible to solve dimensional relations such as the radius of the lens, the shape of the frame, and pupil-to-pupil distance of the glasses wearer (radius data comparison processing) (S12). Further, it is checked that the lens is for the right eye or the left eye (S13) and processing for chucking the chucking jig 121 (block chucking execution processing) (S14) is executed, followed by removing of the lens. Now, a series of processing steps are completed.

(ii) More Detailed Explanation of the Image Processing (i) Executed by the Arithmetic and Control Circuit 170

A more detailed description will be given below about the acquisition of an image based on the foregoing flow chart of FIG. 1.

Step S1 (Acquisition of the Entire Image)

In step S1, when an entire image of the aperture 141 in FIG. 67 and the glasses lens L on the lens holder 200 in the aperture 141 is picked up by the CCD camera 105, the following shadows are picked up: a shadow 1100 of the glasses lens L, shadows 1302 of the pins 142 for holding the glasses lens L, shadows 1201 of the lens holding rods 202, a paint mark shadow 1500, a shadow 1501 of a center mark for a lens for distance, a shadow 1502 of a center mark for a lens for reading, a shadow of a hidden mark indicating an eye point.

In the case of using the frame replacement lens holder 300 in step S1, images of a shadow of the lens L, a shadow of the annular board 301 (not shown) and shadows 1301 (see FIGS. 7 to 12) of the lens holding arms 302 are picked up.

Step S2 (Determining Whether the Frame Replacement Lens Holder is Present or not)

In the processing of step S2 it is detected whether the frame replacement lens holder 300 which is used in case of the lens concerned being an already machined lens or a non-circular lens is present or not. That is, it is detected whether the frame replacement lens holder 300 has been loaded to the aperture 141 instead of the lens holder 200.

In this embodiment, the determination as to whether the frame replacement lens holder is present or not is performed by detecting the light transmitting hole 304 formed in the surrounding portion of the frame replacement lens holder 300.

Steps S21 to S23 (See FIGS. 2 and 3)

Specifically, the following processing is executed. First, in the case of the frame replacement lens holder 300 being loaded to the aperture 141 instead of the lens holder 200, a processing area Sa of 35×35 pixels shown in FIG. 3 is set with its center at a position where the light transmitting hole 304 shown in FIG. 69 is estimated to be present, and is extracted as shown in FIG. 3(b) (S21). Then, the entire processing area is searched to determine a maximum luminance value, and this value is set as an upper limit of the luminance value, while the value 0 is set as a lower limit of the luminance value. Further, the contrast is raised as shown in FIG. 3(c) (S22), and a threshold value is set. Furthermore, an image of the processing area is binarized to clarify the contrast as shown in FIG. 3(d) (S23). When there is an image of the light transmitting hole 304, an image 304a is obtained as shown in FIGS. 3(c) and 3(d).

Steps S24 to S26 (See FIGS. 2 and 3)

Next, using such a binarized template image of a hole provided in advance, as shown in FIG. 3(e), a difference from the binarized image as shown in FIG. 3(d) is obtained. The number of pixels corresponding to the difference of 0 is counted (the number of pixels corresponding to the same value is counted) (S24). It the total number of such pixels is equal to or more than the threshold value, it is determined that a hole is formed in the processing area concerned and that the frame replacement lens holder is installed (S25, S26). If the total number is below the threshold value, it is determined that the frame replacement lens holder 300 is not installed.

Step S3 (Determining Whether the Lens is Present or Not)

In this step, it is determined whether the glasses lens L lies on the stage or not. Although processing differs depending on whether the frame replacement lens holder 300 is present or not. Basically, if there is anything on the stage, it is determined that there is a lens.

If it is determined that the frame replacement lens holder 300 is not present in step S2, the determination is made on the basis of not only the outer shape of the glasses lens L but also whether there is anything (e.g., paint mark, segment, hidden mark, or lens) other than a noise within the processing area.

Steps S301 to S305 (See FIGS. 4 and 5)

The determination is performed in accordance with the steps in the flow chart of FIG. 4. First, as shown in FIG. 5, a processing area 1106 is extracted from the center of the stage up to an edge in one direction where any one of the three pins on the stage is not overlapped (S301). Next, pixels whose values are below a predetermined threshold value present in the area 1106 are binarized, the entire processing area is searched, and the number of pixels whose values are below the threshold value is counted (S302). If the counted number of pixels is above a predetermined value, it is determined that a lens is present (S303, S304), whereas if it is below the threshold value, it is determined that a lens is not present (S305).

If it is determined in step S2 that the frame replacement lens holder 300 is present, a two-step determination is made.

In this case, if the glasses lens L has been inserted and held in the frame replacement lens holder 300, it is considered that the lens holding arms (indicated with reference numeral 1301 in the picked-up image) is open to a certain degree. Therefore, it is first determined whether there is an arm at the center of the stage. Next, search is performed in six directions from the center of the stage. When an edge of the stage at least in one direction cannot be detected, it is determined that the lens is neither inserted nor held.

Steps S311 to S323

This determination processing as to whether the frame replacement lens holder 300 is present or not is performed in accordance with the flow chart of FIG. 6. First, an area 1107 located at the center of the stage is designated and extracted (S311, FIG. 7) and the whole of the extracted processing area is searched. The number of pixels whose values are below a predetermined threshold value is counted (S312). If the counted number of pixels is below a threshold value, it is determined that the lens holding arms 302 are not present in that area, then the processing flow proceeds to the next determination step (S313, FIGS. 8 and 9). Then, if the number of pixels is above the threshold value, it is determined that the arms are present in the area (S320, S321), and the processing is ended.

Next, as shown in FIG. 10, the outer shape of the lens is searched. More specifically, pixels are searched from the center of the stage toward both sides of bases of the shafts 303 of the lens holding arms 302 (S314). As shown in the same figure, this search is performed in a total of six directions positioned on both sides of the bases of the shafts 303 of the three lens holding arms 302. In this processing, the position of the next pixel is calculated from the present pixel (S315), then a difference between the luminance of that point and the luminance of the previous position is calculated (S316). When the difference value is not larger than a predetermined value and that point is not close to the stage (S317, S318), it is determined that there is a lens (S317, FIG. 11). This processing is performed in all the directions (S324). When the difference at a position near the stage in at least one direction is large, it is determined that there is no lens (S322, S323, and FIG. 12). Then, the processing is ended.

Steps S4 and S5 (Determining the Type of a Lens and Leveling of the Lens)

Next, the determination of the lens type in steps S4 and S5 will be described below in more detail in accordance with the flow chart of FIG. 13.

First, as shown in FIG. 13, an entire image is obtained (S401). In the case of a progressive multifocal lens, an image shown in FIG. 17 is obtained, while in the case of a bifocal lens, an image containing a segment LS is obtained, which is shown in FIG. 15.

Next, to make the image clearer, both maximum and minimum values of luminance are set, and the luminance values of all the pixels are changed in the range from the maximum to the minimum so as to obtain 256 gray scales. For a pixel larger than the maximum value, the luminance value is set to 255, whereas for a pixel smaller the minimum value, the luminance value is set to 0, whereby the contrast is enhanced.

Then, LOG (Laplacian of Gaussian) filter is applied to the entire image to extract the outer shape of the lens and the outlines of the paint mark and the segment. According to the LOG filter, the luminance values of the pixel concerned and nearby pixels are multiplied by a weight determined by a Gaussian function for image smoothing and further multiplied by a Laplacian value for extracting an edge.

Further, with respect to the values of each pixel determined by the filter processing, values which are above a given threshold value are converted to a luminance value of 255, whereas values which are below the threshold value are converted to a luminance value of 0, and binarization is performed (S402). As a result, for example such a binary image as shown in FIG. 18 is obtained. This is an example in which the progressive multifocal lens has been subjected to binary processing.

A large number of noises other than noises in the outer shape of the required lens and paint mark are also extracted in the image formed in step S402. Labeling is performed to eliminate fine noises (S403). The labeling is known processing in which the same label number is affixed to coupled pixels for distinction.

If a total number of the pixels to which the same number is affixed are small, noises in the pixels are eliminated. At this time, it is necessary to give a threshold value thereof so that a printed dot is not regarded as a noise. As a result of the noise eliminating processing, an image as shown in FIG. 19 is obtained.

Next, a geometrical center of the glasses lens L in FIGS. 67 and 68 is determined. As shown in FIG. 20, three points P1 to P3 located at the lower left, lower right and upper positions, respectively, are selected from the shadow 1100 of the outer shape of the glasses lens L. Then, the center of a circle contacting the three points P1 to P3 is determined and the central position thereof is regarded as a temporary center O of the lens. This is used to determine a search area for detection of a line and the accuracy of the center is not required to be stringent. As indicated by arrow A1 to A3 in FIG. 20, search is performed in the lateral direction as to the lower left and lower right positions and in the vertical (downward) direction as to the upper position from the outermost side of a shadow 141a of the aperture 141, and the first edge is regarded as the edge of the lens.

Next, an area (300×60 pixels, the area shown in FIG. 21) centered at the temporary center (temporary geometrical center) O of the lens determined in the above processing is regarded as an extraction processing area PA of a horizontal paint line and is extracted. Within an image extracted by the extraction (slant calculation) of a horizontal paint mark in the area shown in FIG. 22, a straight line with the largest number of pixels of the luminance value 255 is determined (Hough transformation) and is regarded as a horizontal paint mark 1500 (consisting of four paint marks 1500a to 1500d). However, if the number of pixels with the luminance value of 255 on the extracted straight line is small, there is a possibility that the straight line may be a printed dot; therefore, the straight line is regarded as not being a horizontal point mark. Further, the inclinations of the horizontal paint marks 1500a to 1500d are calculated. A lens in which the horizontal paint marks 1500a to 1500d are confirmed is determined to be a progressive multifocal lens (S406).

Next, with respect to the lens determined to be a progressive multifocal lens by the above processing, detection of hidden marks is performed. In this processing, a position of a hidden mark is detected and it is determined whether a paint mark is present or not in the position of the hidden mark (steps S5 to S10) this processing is performed for determining a chucking point by detecting a hidden mark.

First, the inclination of the lens is roughly corrected before obtaining an enlarged image (S5). Using the temporary geometric center of the lens and the inclination of the lens obtained in the lens type determination (S4), the stage is moved and rotated so that the horizontal paint mark of the lens becomes horizontal and the temporary geometric center becomes coincident with the center of the image.

Next, an enlarged image is obtained. At this time, an enlarged image of 2× is obtained with the CCD camera 106 for pick-up of an enlarged image so that a hidden mark can be checked visually. The image thus obtained is shown in FIG. 23. This image is obtained at the same gray scales as that of the image described above. In the image, the following shadows appear: a shadow 1201 of a lens holding rod 202, four horizontal paint marks 1500a to 1500d, the shadow 1501 of a center mark for a lens for distance, the shadow 1502 of a center mark for a lens for reading, shadows 1503 of two horizontal reference hidden marks positioned respectively between horizontal paint marks 1500a and 1500b and between horizontal paint marks 1500c and 1500d, a shadow 1504 of the center positioned between two horizontal paint marks 1500b and 1500c, and a shadow 1505 (fitting mark) of a hidden mark indicating an eye point.

Next, a hidden mark extraction area is set. With the general standard of the glasses lens L, it is possible to estimate that the horizontal reference hidden marks are positioned approximately 17 mm (approximately 170 pixels) away from the center of the image in the horizontal direction. Therefore, as shown in FIG. 24, rectangular frames 1600 each with a dimension of 50 to 70 pixels in height by 90 to 110 pixels in width, centered at the positions located approximately 17 mm away from the center of the image, are extracted as areas to search hidden marks.

First, binarization processing for image data is performed. The Canny operator is applied to a designated area and the edge is extracted. If the values of pixels are above the threshold value, the value of 255 is set, while if they are below the threshold value, the value of 0 is set, whereby the value of 255 is obtained at a position where the change of the luminance value is abrupt. Next, edges of the horizontal paint marks reaching the outer periphery of the area are removed (FIGS. 25(a) and 25(b)), followed by labeling to remove noises in coupled images whose number is small (FIG. 25(c)), and detection of the shadows 1503 of the horizontal reference hidden marks is performed. This is performed by making a frame of about 27×27 pixels, searching the frame area, and detecting an area in which the number of edges is the largest within the processing area.

Next, it is determined whether the detected marks are the horizontal reference hidden marks (horizontal paint marks 1500a to 1500d or shadows 1503) or other paint marks. That is, it is checked whether paint marks are included or not in the positions of the detected hidden marks. As shown in FIG. 26, for the range of the frame, a low threshold value (luminance value of about 100) is set and binarization is performed. As a result, if a pixel of the luminance value of 0 is present within the area, it is regarded that a paint mark is included, and a barycentric calculation is performed at the paint mark. FIG. 26(a) shows an example in which, after the above calculation, the detected marks are proved to be horizontal reference hidden marks (horizontal paint marks 1500a to 1500d). FIG. 26(b) shows another example in which, after the above calculation, the detected marks are proved to be paint VG different from the horizontal reference hidden marks.

Next, eye points are extracted.

A coordinate means of the pixels of the luminance value 255 in the range determined by the above processing is determined. The coordinate means is regarded as the center of gravity of the hidden marks. FIG. 27(a) shows an example in which the center of gravity G of the hidden marks is obtained. A coordinate means of the pixels of the luminance value 255 is determined from a binarized image obtained in the same manner as this processing, and that point is regarded as the center of gravity G of the paint mark VG, as shown in FIG. 27(b).

Further, the inclination of the lens is determined. The inclination and central position of the lens are determined from the coordinates of the two hidden marks thus obtained. Using such a cross mark template as shown in FIG. 28, matching is made at positions 0 mm, 2 mm and 4 mm above the horizontal paint marks in the vertical direction from the central position to calculate the correlation. The position of the highest correlation value is assumed to be the position where the cross mark indicating an eye point is present. If all the correlation values are below a certain value, it is assumed that there is no cross mark indicating an eye point. Processing to be performed in such a case is defined separately.

Next, a segment of the bifocal lens is detected and the mounting position of the chucking jig 121 is determined. First, an edge image of a segment is obtained. Here, the center of gravity for each label and the number of coupled pixels has been calculated in the foregoing labeling.

In the case of the image shown in FIG. 15, label 1, labels 2, 3 and 5 corresponding to the shadows 1201 of the lens holding rods 300 shown in FIGS. 67 and 68, and the area of a segment edge 1401 are allocated to the glasses lens L.

The label 1 in FIG. 15 represents the whole of the glasses lens L. In the case where the label 1 in FIG. 15 is the center of gravity of the glasses lens L, it is represented in FIG. 15 by a point surrounded with a circle 1410 nearly the center of the image surface. The center of gravity of the positions indicated by the labels 2, 3 and 5 of the lens L is represented by the point surrounded with a circle 1411. Further, the center of gravity of the area of the segment edge 1401 is represented by the point surrounded with a circle 1412.

These barycentric coordinates, number of coupled pixels, and sizes are shown in Table 1 below.

TABLE 1

| No. | | Barycentric Coordinates | Number of coupled pixels | Size |
| --- | --- | --- | --- | --- |
| 1 | Outline edge of lens | (306, 264) | 5562 | 390 × 395 |
| 2 | Edge of lens loading pin | (287, 113) | 304 | 35 × 36 |
| 3 | Edge of lens loading pin | (446, 329) | 299 | 36 × 38 |
| 4 | Edge of small sphere | (278, 321) | 948 | 140 × 100 |
| 5 | Edge of lens loading pin | (184, 361) | 323 | 36 × 35 |

Next, it is confirmed if the center of gravity of a label lies within the range of the input image (S413). In this processing, as shown in FIG. 16, a label whose center of gravity lies within a frame 1413 is a candidate for a segment. This is because it can be estimated that the center of gravity of a segment is surely present around the center of the lower half portion of the input image. Further, it is confirmed that the number of coupled pixels in the label is within a certain range (S414). Since it is confirmed beforehand that the number of coupled pixels in a segment is approximately 450 to 2000, an area with coupled pixels falling under this range is extracted as a segment. Further, the widths and the heights of each label are measured, like the values on the right side of the above table (S415). This is performed as shown in FIG. 33. Horizontal lines La1, La2 and vertical lines Lb1, Lb2 which are in contact with the segment edge (contour line) 1401 are drawn as shown in FIG. 33. The distance between the lines La1 and La2 and the distance between the lines Lb1 and Lb2 are the height and the width, respectively. The height and the width are detected. It has been confirmed that the width and the height are within the range of about 100×100 to 300×300 pixels even if the lens tilts.

When all the determinations (S413 to S415) are satisfied, the edge with the label concerned is regarded as a segment edge and it is determined that the lens is a bifocal lens (S416). After all the labels are checked, if there is no label that satisfies all the determinations, it is determined that the lens is not a bifocal lens and determination processing for another lens is performed.

As determination for another lens, it is determined whether the lens is a lens with a printed dot (S407). This processing is performed when the lens is neither a progressive multifocal lens nor a bifocal lens.

In the processing for a lens with a printed dot, first, a labeled, binarized image is obtained. Since each center of gravity has been determined in the labeling processing (step S403), the centers of gravity of two labels are extracted, and if there is a label having the center of gravity at its midpoint, they are regarded as three printed dots. If no printed dot is found after checking all the labels, the lens is determined to be a lens with no mark.

Next, processing for detecting a segment of the bifocal lens is performed (step S6). In this processing, a segment of the bifocal lens is detected and coordinates and inclinations of a chucking point are calculated. This processing is performed in accordance with the flow chart of FIG. 30.

A description will now be given in detail. As shown in FIG. 32, given that a line connecting two corner points 1402 and 1404 in the segment 1401 is denoted by Lc1 and a perpendicular bisector of the line Lc1 is 1406, a chucking position 1407 is a point of the intersection between the perpendicular bisector 1406 and an upper curved line of the segment edge 1401. The inclination θ of the lens, as shown in FIG. 31, is the inclination of the line connecting the two corner points 1402 and 1404. Next, the center of gravity is determined from the segment edge and the distance from the center of gravity to the edge is calculated, then a distance function is produced. A maximum value of the distance function is assumed to be a corner.

According to this procedure, first the edge 1401 is detected (S601, S631), as shown in FIG. 30. This processing has already been explained in the lens type determination (S4). On the basis of the thus-detected edge 1401, it is determined whether the segment is present or not (S602). The segment is located at a somewhat lower position with respect to the center of the lens, the size thereof falls under a certain range, and the edge image is already labeled. Therefore, by utilizing these points, the center of gravity, the number of coupled pixels and the size are determined for each labeled edge and are then compared with predetermined threshold values. An edge which satisfies these three conditions is regarded as the segment edge 1401. The threshold values were set as follows experimentally:

Center of gravity:
the range of 100×100 to 300×300 pixels near the center of the lower half of the lens image
Number of coupled pixels:
450 to 2000 pixels (the number of pixels of each label)
Size:
50 to 250 pixels in both height and width With respect to the size, the number of pixels in height and width of the segment edge 1401 is measured, as shown in FIG. 33.

Next, thinning of the edge is performed (S603). This is performed before determining the center of gravity of the segment edge. Regarding how to determine the center of gravity, it will be described later in connection with step S604, but if there is an offset (unevenness in edge width) in the formation of the edge, there is a possibility of a positional deviation of the center of gravity. Therefore, the detected edge is thinned to a single pixel width. In this example, the processing was performed in the vicinity of 8.

Next, the center of gravity of the segment is detected (S604). The center of gravity G of the segment was obtained with the thinned segment edge in accordance with the following equation:

$$g(x, y)=((\Sigma x_i)/n,(\Sigma y_i)/n) \quad \text{[Equation 1]}$$

where xi and yi indicate $i^{th}$ (i=0 to n−1) coordinates.

Further, a distance function is prepared (S605). The distance Ln from the center of gravity G determined in step S604 to each pixel on the segment edge is determined and pixels corresponding to one peripheral distance (360) from a predetermined point of the segment, e.g., one corner point, are arranged as a distance function.

Next, a corner portion is detected from the distance function (S606). Two maximum values are detected from the distance function determined in step S605. Those values were detected as corner portions 1402 and 1404.

FIG. 36 shows an image of a sample of the bifocal lens that have been subjected to the corner detection. The symbols A to D in the figure correspond to the symbols on the distance function. The center of gravity used in calculation is indicated by a point G.

The result obtained is shown by a circular mark shown in FIG. 37. To improve the accuracy, curve fitting is applied to the distance function. With point C in FIG. 36, the distance function was divided into two areas on the right and left sides, a quadratic function was fitted to the respective distance functions, and an edge corresponding to the point of intersection was extracted as a corner.

Within a certain range including a difference between maximum and minimum values of the distance function, the segment is determined to be circular. This is because there is the case where the segment is circular other than in a crescent shape referred to in the above experiments (see FIG. 39). In this case, unlike the case of a crescent segment, the distance function from the center of gravity is almost constant. Thus, when there is little difference between maximum and minimum values of the distance function, it is determined that the segment is circular, and the corner detection is not performed.

Next, the following description is provided about the detection of a corner in the case where the edge of the segment LS of the glasses lens L and a lens holding rod 202 overlap each other, as shown in FIG. 41. In application of this example, the overlap between a lens holding rod 202 and the segment LS is unavoidable for supporting various manufacturers' lenses. If an image is picked up in such an overlapped state, such an image as shown in FIG. 42 is obtained. If an edge is detected from this image, the detected edge is an edge 1401 of a segment including a shadow 1201 of the lens holding rod 202, thus affecting the preparation of the distance function from the center of gravity. In view of this point, processing capable of detecting a corner (estimating a corner if a corner disappears) is performed even in the above case. A rough procedure is shown in terms of a flow chart in FIG. 43.

In this example, an edge of the segment LS is detected (S621), and if the edge does not have an end point, the ordinary processing shown in FIG. 30 is performed (S633), whereas if an edge is hidden, the following processing is performed. First, a correction for edge extension is performed to make the edge into a closed curve (S623). Then, a temporary center of gravity of the edge as the closed curve is determined and a distance function is prepared (S624, S625). If the edge shape is circular, the processing applied in the case of a circular segment is performed (S626, S634). If the edge is not circular, the following processing is performed.

In the case of the edge being not circular, the number of remaining corners is calculated using the distance function. If the number of remaining corners is one, a curved line and an ellipse are fitted to the edge of a small sphere to determine an approximate edge (S628) and the point of the intersection of both lines is regarded as a corner (S629).

If there are two remaining corners, their positions are determined (S630) and corner positions are calculated (S632).

Next, a description will be given below about how to count the remaining corner(s).

A description will be made of which portion of the segment edge is overlapped with the lens holding rod 202 causing an interruption of the edge in the following two cases:
(a) The other portion than the corners is cut off (FIG. 57, two corners remain).
(b) Either the right or the left corner is cut off (FIG. 59, one corner remains).

Distance functions in both cases are shown in FIGS. 58 and 60. The number of inflection points as a maximum value of the distance function is calculated and is regarded to be the number of corners. However, as shown in FIGS. 58 and 62, since the distance function itself is very uneven, a weighted average of the distance function was obtained and an inclination for each certain section was used to determine the number of inflection points.

In this way, distance functions and inflection points of the images shown in FIGS. 58 and 62 were determined. The results obtained are shown in FIGS. 61 and 63. In these figures, the portions indicating inflection points as maximum values are shown with circular marks. It can be confirmed that there are two maximum values in the distance function of FIG. 63 and one maximum value in the distance function of FIG. 67. Although not shown here, it was confirmed that the number of maximum value could be obtained also in other images using this method.

Next, a description will be given about the detection of a remaining corner and the estimation of the position in the case of a corner hidden. Since the position of the lens holding rod 202 in the image is determined in advance, the position of the lens holding rod 202 was masked and the detection of an edge was performed. With the size of three lens holding rods 202 and the size of the segment, it was confirmed that only one lens holding rod 202 could be masked. Therefore, the distance function is calculated in the following two cases:
(a) In the case of the lens holding rod 202 being overlapped with the segment edge at a portion other than the corners.
(b) In the case of the lens holding rod 202 being overlapped with the segment edge at one of the corners.

(a) In the case of the lens holding rod 202 being overlapped with the segment edge at a portion other than the corners.

Processing was performed for the image shown in FIG. 45. A distance function prepared from the center of gravity G obtained is shown in FIG. 46. From this result, it could be confirmed that maximum values were obtained near the corners even if the edge was interrupted by the lens holding rod 202. However, since the edge disappears in the portion overlapped with the lens holding rod 202, the center of gravity G obtained from the edge is offset to point C in FIG. 45. Consequently, it is possible to confirm that there is a difference in size between two maximum values (B and C) indicating the vicinities of corners in comparison with the distance function (see FIG. 37) obtained in the absence of overlap with the lens holding rod 202. As a result, even in the case of the edge being interrupted, it is possible to extract the vicinity of a corner by fitting of the distance function to a quadratic function.

However, in the abovementioned distance function, since the barycentric position is deviated, the point of intersection of quadratic functions after fitting may be deviated from the proper corner position. Therefore, straight lines are extended from points A and D in FIG. 44 to form a pseudo edge of a segment. Then, a temporary center of gravity G' is determined and a distance function is calculated therefrom. An arithmetic expression related to the straight lines extended from end points A and D is determined by the least square method on the basis of five-point coordinates from the end points. The results are shown in FIG. 46 and the distance function obtained is shown in FIG. 47. Lines AE and ED in FIG. 46 are added lines and the reference mark G' is a temporary center of gravity determined from the pseudo edge.

The result of corner detection from the pseudo-edge thus prepared is shown with a circular mark in FIG. 48 and the result of fitting of the distance function to a quadratic function is shown in FIG. 49.

(b) In the case of the lens holding rod 202 being overlapped with the segment edge at one of the corners.

A rough processing procedure is shown in the flow chart of FIG. 5. In this processing, two end points are detected from image edges (S641) and a distance function is prepared (S642). Then, a remaining corner is detected (S643). At this time, a maximum value of the distance function is determined to be a remaining corner. Next, the edge is separated into two upper and lower edges (S644). Further, an approximate curve or an ellipse is calculated with respect to each edge and the points of intersections between the two lines are calculated as a corner (S646).

The steps in the above processing procedure were performed using the image shown in FIG. 51. In this image, however, a shadow of a lens holding rod 202 was added to the segment that is not overlapped with the lens holding rod 202 for the purpose of making comparison of detected positions in subsequent accuracy verification. The result of edge detection is shown in FIG. 51 and the associated distance function is shown in FIG. 53. First, the result obtained is shown by preparing a distance function from the center of gravity in case of a lens holding rod 202 overlapping with a segment edge.

From the distance function obtained (FIG. 53), it is understood that the position of a remaining corner (point B) can be detected by obtaining a maximum value. However, as to the other corner, it is impossible to obtain an edge because it is hidden by a lens holding rod 202, and thus it is impossible to detect the corner. Therefore, as shown in FIG. 54, the corner position hidden by a lens holding rod 202 is estimated. That is, the segment shape is paid attention to and the edge is separated into upper and lower curves with the corner as a boundary, approximate curves or approximate ellipses are applied thereto, and the points of intersections between the two lines are determined to be a corner.

First, the edge is separated (S641). On the basis of the distance function shown in FIG. 53, data of the edge is separated with a rough position (point B) of the remaining corner as a boundary. After the separation of the edge, equations of approximate curves or ellipses of the respective edges are determined. The result of these approximations is shown in FIG. 56.

The image obtained by this method is an image with the lens holding rod 202 added to the original image. Thus, in order to confirm where the result appears on the original image, the result was digitized on the original image.

The corner position obtained is shown in FIG. 63. From this result, it is confirmed that, even when a corner is overlapped with a lens holding rod 202 and disappears the position of the corner can be estimated by obtaining approximate curves or ellipses and obtaining the points of intersections between the two lines.

A description has been given above about a countermeasure against the case where an interruption of the edge of the segment LS occurs due to a lens holding rod 202. First, by using the algorithm of "counting the number of remaining corner(s) from the distance function" it is possible to confirm which portion of the segment is overlapped with the lens holding rod 202 causing the interruption of the edge. If the number of remaining corner(s) is two, the positions of the corners are detected from a maximum value of the distance function, whereas if the number of remaining corners is one, the segment edge is approximated into curves or ellipses and points of intersections between both lines are detected as a corner. It follows that chucking points of all types of lenses L have become clear. Next, the X-Y stage 150 is moved to move the glasses lens to the position where the chucking jig 121 is to be installed by the chucking jig conveyance unit 120 (step S12). Further, the lens for the right eye or the left eye is determined (step S13).

(a) In the Case of Progressive Multifocal Lens

After the lens chucking point has been determined, it is checked by image processing whether the selection of right or left lens which was made by the user upon the Start in the flow chart is correct or not. The lens is determined to be for the right or the left depending on what the center of gravity of a paint mark for a lens for reading of the progressive multifocal lens lies on the right side or the left side of a hidden mark midpoint.

In this processing, as shown in FIG. 65, an area to be processed is extracted on the basis of the midpoint of two hidden marks derived in the hidden mark detection. Next, the inside of the thus-extracted processing area is searched and a pixel whose value is above a preset threshold value is regarded as a paint mark. Then, coordinate values of the pixel are determined. Further, an average value of the coordinates, i.e., the center of gravity, is determined. The lens is determined to be for the right or the left depending on the center of gravity is on the right side or the left side of the midpoint of the hidden marks.

(b) In the Case of Bifocal Lens

In this processing, as shown in FIG. 66, horizontal and vertical lines are extracted from a picked-up image of a segment shape, then a comparison is made between the geometric center of the outline of the lens and a chucking point. The right/left lens determination is made on the basis of the direction detected, i.e., a positional relation between a geometric center O of the lens outline and the chucking point 1407. It is determined that the lens is a left lens when the geometric center lies on the left side of the chucking point, whereas the lens is a right lens when the geometric center lies on the right side of the chucking point.

In this example, after the end of the above processing, the chucking jig 121 is placed on the chucking point 1407 of the glasses lens L by the chucking jig conveyance unit 120 and the glasses lens L is conveyed to the outside of the system by the conveyance unit 120. A series of processing steps are now ended.

That is, according this embodiment, search is performed for a shadow (the shadow 1505 shown in FIGS. 24 and 25 or the chucking point 1407 shown in FIGS. 32 and 66) of a hidden mark indicative of an eye point serving as a fitting mark. A chucking center data of the position where the shadow coincides with the center of a jig image Rp of the chucking jig 121 shown in FIG. 67 is calculated by the arithmetic and control circuit 170. On the basis of the chucking center data thus obtained, the arithmetic and control circuit 170 superimposes the jig image Rp on a lens shape Rs and causes this state to be displayed.

Thus, on the basis of the chucking center data obtained above, the arithmetic and control circuit 170 controls the operation of the X-Y stage 150 and the chucking jig conveyance unit 120 shown in FIG. 67, causes the center of the chucking jig 121 to be located at the position corresponding to the chucking center data, and loads the chucking jig 121 onto the glasses lens L (step S14).

The embodiment described above satisfies the present invention in connection with the following first to fourth other problems.

[First Other Problem]

In the above conventional glasses lens chucking jig mounting system, there is a problem in that various glasses lenses, e.g., a progressive multifocal lens, bifocal lens, and ordinary lenses, cannot be automatically distinguished to execute processing.

That is, an operator is required to determine the type of a lens to be processed (for acquiring an image of the glasses lens and subjecting it to image processing) and determine the chucking jig mounting position in accordance with the determined type of the glasses lens.

Accordingly, the solving means, which will be described below, aim at providing a glasses lens chucking jig mounting system and a method for determining a glasses lens chucking jig mounting position, whereby the type of a lens to be processed in the above embodiment can be automatically distinguished.

A first solving means is a glasses lens chucking unit mounting system comprising: a loading table permitting plural types of holding means to be disposed within an aperture; the holding means for holding a glasses lens at a peripheral edge or a back side of the lens; an image pickup means for picking up an image of the glasses lens placed in the aperture; a position determining means for specifying a mounting position of a chucking jig on the basis of the picked-up image of the glasses lens; and a loading means for loading the chucking jig to the mounting position on the glasses lens. The glasses lens chucking unit mounting system further comprises: a determining means for determining the type of the glasses lens disposed on the loading table on the basis of an image of the inside of the aperture picked up by the image pickup means; and a position determining means for determining a loading position of the chucking jig on the glasses lens disposed on the loading table on the basis of the image of the inside of the aperture picked up by the image pickup means.

According to a second solving means, in the glasses lens chucking jig mounting system of the above first solvent means, the determining means classifies the glasses lens into any one of a progressive multifocal lens, a bifocal lens, a lens with a printed dot, and a lens without a mark, on the basis of the image of the glasses lens picked up by the image pickup means.

According to a third solving means, in the glasses lens chucking jig mounting system of the above second solving means, when the determining means detects a hidden mark indicative of a-horizontal paint mark or a horizontal line in the image, it determines whether the glasses lens is a progressive multifocal lens.

According to a fourth solving means, in the glasses lens chucking jig mounting system of the above first or second solving means, when the determining means detects a segment contour in the image, it determines whether the glasses lens is a bifocal lens.

According to a fifth solving means, in the glasses lens chucking jig mounting system of the above second solving means, when the determining means detects a printed dot in the image, it determines whether the glasses lens is a lens with a printed dot.

A sixth solving means is a method for determining a glasses lens chucking jig mounting position in a glasses lens chucking jig mounting system. The glasses lens chucking jig mounting system comprises; a loading table permitting plural types of holding means to be disposed within an aperture; the holding means for holding a glasses lens at a peripheral edge or a back side of the lens; an image pickup means for picking up an image of the glasses lens placed in the aperture; a position determining means for specifying a mounting position of a chucking jig on the basis of the picked-up image of the glasses lens; and a loading means for loading the chucking jig to the mounting position on the glasses lens. The method comprises the steps of: determining the type of the glasses lens disposed on the loading table on the basis of an image of the inside of the aperture picked up by the image pickup means; and determining a loading position of the chucking jig on the glasses lens disposed on the loading table on the basis of the image of the inside of the aperture picked up by the image pickup means.

According to a seventh solving means, in the method for determining a glasses lens chucking jig mounting position of the above sixth solving means, the determining means classifies the glasses lens into any one of a progressive multifocal lens, a bifocal lens, a lens with a printed dot, and a lens without a mark, on the basis of the image of the glasses lens picked up by the image pickup means.

According to an eighth solving means, in the method for determining a glasses lens chucking jig mounting position of the above sixth or seventh means, when the determining means detects a hidden mark indicative of a horizontal paint mark or a horizontal line in the image, it determines whether the glasses lens is a progressive multifocal lens.

According to a ninth solving means, in the method for determining a glasses lens chucking jig mounting position of the above sixth or seventh solving means, when the determining means detects a segment contour in the image, it determines whether the glasses lens is a bifocal lens.

According to a tenth solving means, in the method for determining a glasses lens chucking jig mounting position of the above sixth or seventh solving means, when the determining means detects a printed dot in the image, it determines whether the glasses lens is a lens with a printed dot.

According to the above solving means, images of the glasses lens and the inside of the aperture of the loading table are picked up by the image pickup means, then the type of the lens to be processed is determined automatically on the basis of the picked-up graphic image of the vicinity of the aperture and it is possible to determine the chucking jig mounting position.

[Second Other Problem]

There is a case where a glasses lens has a stamped hidden mark that is indicative of positional information specific to the lens and that is difficult to be confirmed with the naked eye. There also is a case where a hidden mark is hidden by a paint mark. In both cases, it has so far been troublesome to specify the positions of such marks.

It is necessary to check whether a hidden mark is present or not and determine the chucking jig mounting position on the basis of the position of a hidden mark or a paint mark.

In view of this point, the solving means, which will be described below, aims at providing a glasses lens chucking jig mounting system and a method for determining a glasses lens chucking jig mounting position, which allow to check whether a hidden mark or a paint mark is present or not and, if a hidden mark is present, determine a chucking jig mounting position automatically on the basis of the position of the hidden mark.

A means for solving the above second other problem will be described below.

A first solving means is a glasses lens chucking jig mounting system comprising: a loading table permitting a glasses lens to be disposed within an aperture; an image pickup means for picking up an image of the glasses lens placed in the aperture; a position determining means for specifying a mounting position of a chucking jig on the basis of the picked-up image of the glasses lens; and a loading means for loading the chucking jig to the mounting position on the glasses lens. The position determining means comprises a mark detecting means for detecting the presence or absence and a position of at least one of a paint mark and a hidden mark of the glasses lens on the basis of an image of the inside of the aperture picked up by the image pickup means; and a loading position determining means for determining a loading position of the chucking jig on the glasses lens on the basis of the detected position.

According to a second solving means, in the glasses lens chucking jig mounting system of the above first solving means, the mark detecting means performs binarization processing for the image obtained by the image pickup means and noise eliminating processing therefor and acquires an edge image of the paint mark or hidden mark on the glasses lens.

According to a third solving means, in the glasses lens chucking jig mounting system of the above second solving means, the mark detecting means prepares an edge from the image obtained by the image pickup means and applies a template to the edge, thereby detecting the hidden mark.

According to a fourth solving means, in the glasses lens chucking jig mounting system of the above third solving means, the position determining means specifies the chucking jig mounting position on the basis of the position of the acquired hidden mark or paint mark image.

According to a fifth solving means, in the glasses lens chucking jig mounting system of the above fourth solving means, the position determining means specifies the chucking jig mounting position on the basis of the center of gravity of the acquired hidden mark or paint mark image.

A sixth solving means is a method for determining a glasses lens chucking jig mounting position in a glasses lens chucking jig mounting system. The glasses lens chucking jig mounting system comprises: a loading table permitting a glasses lens to be disposed within an aperture; an image pickup means for picking up an image of the glasses lens placed in the aperture; a position determining means for specifying a mounting position of a chucking jig on the basis of the picked-up image of the glasses lens; and a loading means for loading the chucking jig to the mounting position of the glasses lens. The method comprises the steps of: determining the presence or absence and position of at least one of a hidden mark and a paint mark of the glasses lens disposed on the loading table on the basis of an image of the inside of the aperture picked up by the image pickup means; and determining a loading position of the chucking jig on the glasses lens on the basis of the determined position.

According to a seventh solving means, in the method for determining a glasses lens chucking jig mounting position of the above sixth solving means, binarization processing and noise eliminating processing are performed for the image acquired by the image pickup means to obtain an edge image of the paint mark or hidden mark on the glasses lens.

According to an eighth solving means, in the method for determining a glasses lens chucking jig mounting position of the above seventh solving means, an edge is prepared from the image obtained by the image pickup means and a template is applied to the edge, thereby detecting the hidden mark.

According to a ninth solving means, in the method for determining a glasses lens chucking jig mounting position of the above eighth solving means, the chucking jig mounting position is specified on the basis of the position of the acquired hidden mark or paint mark image.

According to a tenth solving means, in the method for determining a glasses lens chucking jig mounting position of the above ninth solving means, the chucking jig mounting position is specified on the basis of the center of gravity of the acquired hidden mark or point mark image.

According to the above solving means, since a graphic image of a glasses lens is picked up by the image pickup means and the position of a hidden mark or paint mark on the glasses lens is detected on the basis of the picked-up graphic image of the vicinity of the aperture, it is possible to determine the chucking jig mounting position accurately and rapidly.

[Third Other Problem]

Out of conventional glasses lens chucking jig mounting systems, for example, in the system disclosed in Patent Document 7, an image of only the upper edge of a small sphere is extracted and thus it is impossible to improve the detection accuracy.

In view of this point, a solving means, which will be described below, aim at providing a glasses lens chucking jig mounting system and a method for determining a glasses lens chucking jig mounting position, thereby to attain simple processing and more accurate detection on the basis of an entire graphic segment image of a bifocal lens.

A means for solving the above problem is described below. First, a solving means is a glasses lens chucking jig mounting system comprising: a loading table permitting a glasses lens to be disposed within an aperture; an image pickup means for picking up an image of the glasses lens placed in the aperture; a position determining means for determining for specifying a mounting position of a chucking jig on the basis of the picked-up image of the glasses lens; and a loading means for loading the chucking jig to the mounting position of the glasses lens. The position determining means comprises: a corner detecting means for acquiring an image of a segment edge from a graphic image of the glasses lens picked up by the image pickup means, detecting two corners of the segment and specifying positions of the corners; and a loading position determining means for determining a loading position of the chucking jig on the glasses lens on the basis of the detected corner positions.

According to a second solving means, in the glasses lens chucking jig mounting system of the above first solving means, the corner detecting means performs processing including edge processing and binarization processing for the image obtained from the image pickup means and acquires a segment edge image of the glasses lens.

According to a third solving means, in the glasses lens chucking jig mounting system of the above second solving means, the corner detecting means specifies two corners' positions of the segment from the edge image and determines the inclination of the segment.

According to a fourth solving means, in the glasses lens chucking jig mounting system of the above second or third solving means, the position determining means specifies the chucking jig mounting position on the basis of two corner positions.

A fifth solving means is a method for determining a glasses lens chucking jig mounting position in a glasses lens chucking jig mounting system. The glasses lens chucking jig mounting system comprises: a loading table permitting a glasses lens to be disposed within an aperture; an image pickup means for picking up an image of the glasses lens placed in the aperture; a position determining means for specifying a mounting position of a chucking jig on the basis of the picked-up image of the glasses lens; and a loading means for loading the chucking jig to the mounting position of the glasses lens. The method comprises the steps of: acquiring a segment edge image from a graphic image of the glasses lens picked up by the image pickup means; detecting two corners of a segment; specifying the corners' positions; and determining a loading position of the chucking jig on the glasses lens on the basis of the detected corners' positions.

According to a sixth solving means, in the method for determining a glasses lens chucking jig mounting position of the above fifth solving means, processing including edge processing and binarization processing is performed for the image obtained by the image pickup means to acquire a segment edge image of the glasses lens.

According to a seventh solving means, in the method for determining a glasses lens chucking jig mounting position of the above sixth solving means, the corner detecting means specifies two corners' positions of the segment from the edge image and determines the inclination of the segment.

According to an eighth solving means, in the method for determining a glasses lens chucking jig mounting position of the above sixth or seventh solving means, the chucking jig mounting position is specified on the basis of the two corner positions.

According to the above solving means, edge processing is performed on the basis of a graphic image of an entire small sphere, two corners are detected as points, and the inclination of the small sphere and the chucking position are specified on the basis of coordinates of the small sphere. This makes it easier to perform the image processing and makes it possible to improve the detection accuracy.

[Fourth Other Problem]

In the conventional image processing technique in which a reference marker such as a hidden mark, a small sphere or a printed dot mark of a glasses lens, for example, a progressive multifocal lens or a bifocal lens is extracted from a graphic image of the glasses lens, there has been no method for determining whether a glasses lens is the right lens or the left lens on the basis of a graphic image of the glasses lens that has been subjected to image processing.

Such a determination has relied on a worker's visual determination. However, it may be erroneously judged whether a lens is the right or left lens. Thus, it has been desired to develop a system and a method capable of determining whether or not a glasses lens is for the right or left eye on the basis of a graphic image that has been subjected to image processing.

In view of this point, a solving means, which will be described below, aim at providing a glasses lens chucking jig mounting system and a method for determining a glasses lens chucking jig mounting position capable of specifying glasses lenses for the right and left eyes with image processing.

A means for solving the above fourth other problem is described below.

First solving means is a glasses lens chucking jig mounting system comprising: a loading table permitting a glasses lens to be disposed within an aperture; an image pickup means for picking up an image of the glasses lens placed in the aperture; a position determining means for specifying a mounting position of a chucking jig on the basis of the picked-up image of the glasses lens; and a loading means for loading the chucking jig to the mounting position of the glasses lens. The position determining means comprises a right/left lens determining means and a loading position determining means. The right/left lens determining means comprises the steps of: acquiring hidden marks from a graphic image of the glasses lens picked up by the image pickup means; determining whether the glasses lens is a progressive multifocal lens; specifying positions of the hidden marks; specifying a processing area in the vicinity of a portion of a lens for reading on the basis of a midpoint of two hidden marks; determining a barycentric position of a printed mark in the processing area; and comparing the midpoint with the barycentric position to determine whether the progressive multifocal lens is for the right or left lens; and a loading position determining means for specifying a loading position of the chucking jig in accordance with either the right or left progressive multifocal lens that has been determined.

A second solving means is a glasses lens chucking jig mounting system comprising: a loading table permitting a glasses lens to be disposed within an aperture; an image pickup means for picking up an image of the glasses lens placed in the aperture; a position determining means for specifying a mounting position of a chucking jig on the basis of the picked-up image of the glasses lens; and a loading means for loading the chucking jig to the mounting position of the glasses lens. The position determining means comprises a right/left lens determining means and a loading position determining means. The right/left lens determining means comprises the steps of: acquiring a segment contour from a graphic image of the glasses lens picked up by the image pickup means; determining whether the glasses lens is a bifocal lens; and comparing a segment position with a geometric center position of the glasses lens to determine whether the bifocal lens is for the right eye or left eye. The loading position determining means specifies a chucking position of the chucking jig in accordance with either the right or left bifocal lens that has been determined.

According to a third solving means, in the glasses lens chucking jig mounting system of the above first or second solving means, the right/left lens determining means performs processing including edge processing and binarization processing for the image obtained by the image pickup means and acquires an edge image of the glasses lens.

A fourth solving means is a method for determining a glasses lens chucking jig mounting position in a glasses lens chucking jig mounting system. The glasses lens chucking jig mounting system comprises: a loading table permitting a glasses lens to be disposed within a aperture; an image pickup means for picking up an image of the glasses lens placed in the aperture; a position determining means for specifying a mounting position of a chucking jig on the basis of the picked-up image of the glasses lens; and a loading means for loading the chucking jig to the mounting position of the glasses lens. The method comprises the steps of: acquiring hidden marks from a graphic image of the glasses lens picked up by the image pickup means; determining whether the glasses lens is a progressive multifocal lens; specifying positions of the hidden marks; specifying a processing area in the vicinity of a portion of a lens for reading on the basis of a midpoint of two hidden marks; determining a barycentric position of a printed mark in the processing area; comparing the midpoint with the barycentric position to determine whether the progressive multifocal lens is for the right eye or left eye; and specifying a chucking position of the chucking jig in accordance with either the right or left progressive multifocal lens that has been determined.

A fifth solving means is a method for determining a glasses lens chucking jig mounting position in a glasses lens chucking jig mounting system. The glasses lens chucking jig mounting system comprises: a loading table permitting a glasses lens to be disposed within an aperture; an image pickup means for picking up an image of the glasses lens placed in the aperture; a position determining means for specifying a mounting position of a chucking jig on the basis of the picked-up image of the glasses lens; and a loading means for loading the chucking jig to the mounting position of the glasses lens. The method comprises the steps of: acquiring a segment contour from a graphic image of the glasses lens picked up by the image pickup means; determining whether the glasses lens is a bifocal lens; comparing a segment position with a geometric center position of the glasses lens to determine whether the bifocal lens is for the right eye or the left eye; and specifying a chucking position of the chucking jig in accordance with either the right or left bifocal lens that has been determined.

According to a sixth solving means, in the method for determining a glasses lens chucking jig mounting position of the above fourth or fifth solving means, processing including edge processing and binarization processing is performed for the image obtained by the image pickup means to acquire an edge image of the glasses lens.

According to the above solving means, it is possible to accurately determine whether the glasses lens, e.g., a progressive multifocal lens or a bifocal lens, is for the right or left eye on the basis of a graphic image of the glasses lens that has been subjected to image processing, without erroneously attaching the chucking jig to the glasses lens for the right or left eye through an operator's vision.

The invention claimed is:

1. A glasses lens chucking jig mounting system comprising:
    a loading table permitting plural types of holding means to be disposed within an aperture, the holding means being for holding a glasses lens at a peripheral edge or a back side of the lens;
    an image pickup means for picking up an image of the glasses lens placed in the aperture;
    a position determining means for specifying a mounting position of a chucking jig on the basis of the picked-up image of the glasses lens; and
    a loading means for disposing the chucking jig to the mounting position of the glasses lens,
    a determining means for determining the type of holding means disposed on the loading table on the basis of an image of the inside of the aperture picked up by the image pickup means; and
    a position determining means for determining a loading position of the chucking jig on the glasses lens disposed in a frame replacement lens holder on the basis of the image of the inside of the aperture picked up by the image pickup means.

2. The system according to claim 1, wherein
the determining means determines, on the basis of the image of the inside of the aperture picked up by said image pickup means, whether the holding means is a frame replacement lens holder for holding a machined glasses lens or a non-circular glasses lens.

3. The system according to claim 2, wherein
the frame replacement lens holder has a marker portion in a predetermined position, and the determining means detects the marker portion on the basis of the image picked up by the image pickup means and determines whether the holding means is the frame replacement lens holder.

4. The system according to claim 3, wherein
the image pickup means picks up an enlarged image of a predetermined position and the determining means determines the marker portion from the enlarged image.

5. A method for determining a glasses lens chucking jig mounting position in a glasses lens chucking jig mounting system, the glasses lens chucking jig mounting system comprising:
a loading table permitting plural types of holding means to be disposed within an aperture, the holding means being for holding a glasses lens at a peripheral edge or a back side of the lens;
an image pickup means for picking up an image of the glasses lens placed in the aperture;
a position determining means for specifying a mounting position of a chucking jig on the basis of the picked-up image of the glasses lens;
a loading means for loading the chucking jig to the mounting position of the glasses lens; and wherein
the method comprises the steps of:
determining the type of holding means disposed on the loading table on the basis of an image of the inside of the aperture picked up by the image pickup means; and
determining a loading position of the chucking jig on the glasses lens disposed in a frame replacement lens holder on the basis of the image of the inside of the aperture picked up by said image pickup means.

6. The method according to claim 5, wherein
on the basis of the image of the inside of the aperture picked up by the image pickup means, it is determined whether the holding means is a frame replacement lens holder for holding a machined glasses lens or a non-circular lens.

7. The method according to claim 5 or claim 6, wherein
the frame replacement lens holder has a marker portion in a predetermined position, the marker portion is detected on the basis of the image picked up by said image pickup means, and it is determined whether the holding means is the frame replacement lens holder.

8. A method according claim 7, wherein
an enlarged image of a predetermined position is obtained and the marker portion is detected on the basis of the enlarged image.

* * * * *